(12) United States Patent
Nguyen et al.

(10) Patent No.: US 8,566,175 B1
(45) Date of Patent: Oct. 22, 2013

(54) COMMON PURCHASING USER INTERFACE

(75) Inventors: Linda K. Nguyen, Sunnyvale, CA (US); Michael G. Morrissey, Atlanta, GA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/434,324

(22) Filed: Mar. 29, 2012

Related U.S. Application Data

(60) Provisional application No. 61/471,586, filed on Apr. 4, 2011, provisional application No. 61/593,830, filed on Feb. 1, 2012.

(51) Int. Cl.
*G06Q 30/00* (2012.01)

(52) U.S. Cl.
USPC ............... 705/26.41; 705/26.1; 705/26.81; 705/27.1; 705/64; 705/67; 705/75; 709/224

(58) Field of Classification Search
USPC ............ 705/26.1, 75, 26.41, 26.81, 27.1, 64, 705/67; 709/224
See application file for complete search history.

(56) References Cited

U.S. PATENT DOCUMENTS

2012/0089521 A1* 4/2012 Abrevaya et al. ............... 705/75

OTHER PUBLICATIONS

'Android Developers' [online]. "Administering In-app Billing," 2011, [retrieved on Jan. 3, 2012]. Retrieved from the Internet: URL:http://developer.android.com/guide/market/billing/billing_admin.html>. 8 pages.

'Android Developers' [online]. "Implementing In-app Billing," 2011, [retrieved on Jan. 3, 2012]. Retrieved from the Internet: URL: <http://developer.android.com/guide/market/billing/billing_integrate.html>. 14 pages.

'Android Developers' [online]. "In-app Billing," 2011, [retrieved on Jan. 3, 2012]. Retrieved from the Internet: URL: < http://developer.android.com/guide/market/billing/index.html>. 2 pages.

'Android Developers' [online]. "In-app Billing Overview," 2011, [retrieved on Jan. 3, 2012]. Retrieved from the Internet: URL: <http://developer.android.com/guide/market/billing/billing_overview.html>. 8 pages.

'Android Developers' [online]. "In-app Billing Reference," 2011, [retrieved on Jan. 3, 2012]. Retrieved from the Internet: URL: <http://developer.android.com/guide/market/billing/billing_reference.html>. 4 pages.

(Continued)

*Primary Examiner* — Yogesh C Garg
(74) *Attorney, Agent, or Firm* — Fish & Richardson P.C.

(57) ABSTRACT

In general, the subject matter described in this disclosure can be embodied in methods, systems, and program products. A first third-party application program that was developed by a first entity receives a first request to purchase a first product for use within the first third-party application program. In response to receiving the first request, a purchasing user interface is customized to include first details that are specific to the first product. The purchasing user interface that includes the first details is displayed. A second request to purchase a second product for use within the second third-party application program is received from a second third-party application program that was developed by a second entity. In response to receiving the second request, the purchasing user interface is customized to include second details that are specific to the second product. The purchasing user interface that includes the second details is displayed.

22 Claims, 34 Drawing Sheets

(56) References Cited

OTHER PUBLICATIONS

'Android Developers' [online]. "New Merchandising and Billing Features on Android Market," 2011, [retrieved on Jan. 3, 2012]. Retrieved from the Internet: URL: < http://android-developers.blogspot.com/2011/02/new-merchandising-and-billing-features.html>. 3 pages.

'Android Developers' [online] "Security and Design," 2011, [retrieved on Jan. 3, 2012]. Retrieved from the Internet: URL: < http://developer.android.com/guide/market/billing/billing_best_practices.html>. 2 pages.

'Android Developers' [online]. "Testing In-app Billing," 2011, [retrieved on Jan. 3, 2012]. Retrieved from the Internet: URL: < http://developer.android.com/guide/market/billing/billing_testing.html>. 4 pages.

'BlackBerry Support' [online]. "Sample App-BlackBerry WebWorks Payment Service," 2011, [retrieved on Mar. 29, 2012]. Retrieved from the Internet: URL: < http://supportforums.blackberry.com/t5/tkb/articleprintpage/tkb-id/browser_dev@tkb/article-id-102>. 4 pages.

Hammonds, M. 'mobile tutsplus' [online]. "iPhone SDK: In-App Purchases," 2010, [retrieved on Mar. 29, 2012]. Retrieved from the Internet: URL: http://mobile.tutsplus.com/tutorials/iphone/iphone-sdk-in-app-purchases/>. 8 pages.

Kumar, M. 'MK blog' [online] "iPhone Tutorial-In-App Purchases," 2009, [retrieved on Mar. 29, 2012]. Retrieved from the Internet: URL: http://blog.mugunthkumar.com/coding/iphone-tutorial-%E2%80%93-in-app-purchases/>. 31 pages.

Lonescu, D. 'InfoWorld' [online]. "Apple enables in-app purchases from free iPhone apps," 2009, [retrieved on Mar. 29, 2012]. Retrieved from the Internet: URL: <http://www.infoworld.com/d/mobilize/apple-enables-in-app-purchases-free-iphone-apps-279>. 4 pages.

'Microsoft' [online]. "How to support in-app purchases," 2012, [retrieved on Mar. 29, 2012]. Retrieved from the Internet: URL: http://msdn.microsoft.com/en-us/library/windows/apps/hh694067.aspx>. 5 pages.

Ogasawara, T. 'Social Times' [online]. "Google vs. Apple: Android In-app Billing vs. iOS In-app Purchasing-Focus on Developers vs. Customers," 2011, [retrieved on Mar. 29, 2012]. Retrieved from the Internet: URL: < http://socialtimes.com/google-vs-apple-android-in-app-billing-vs-ios-in-app-purchasing-focus-on-developers-vs-customers_b12119>. 4 pages.

* cited by examiner

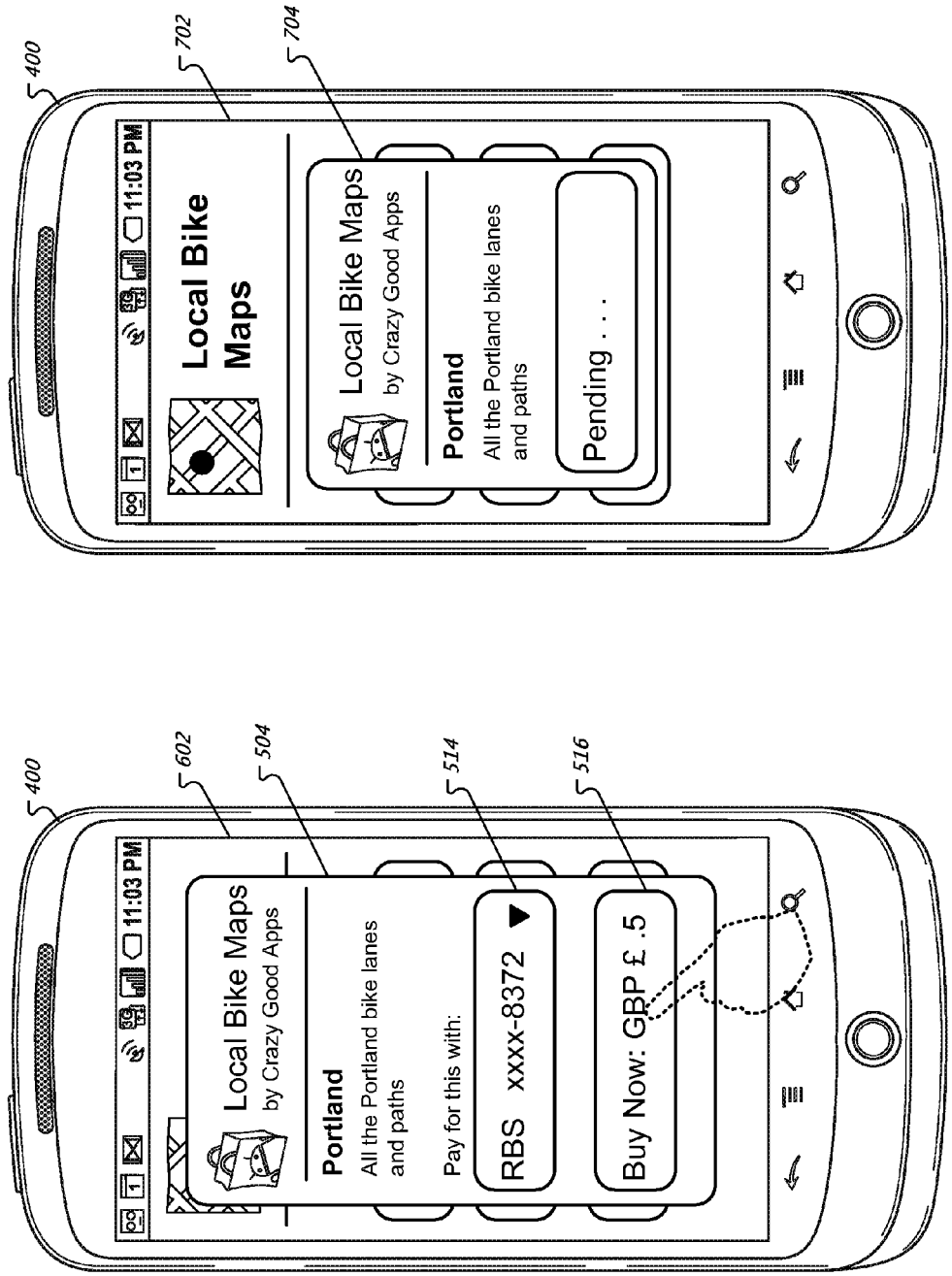

COMMON PURCHASING USER INTERFACE

CROSS-REFERENCE TO RELATED APPLICATIONS

This application claims priority to U.S. Provisional Application Ser. No. 61/471,586, filed on Apr. 4, 2011, entitled "In-Application Billing," and U.S. Provisional Application Ser. No. 61/593,830, filed on Feb. 1, 2012, entitled "Providing Multiple Purchase Prices for a Product," the entire contents of which are hereby incorporated by reference.

BACKGROUND

Distribution platforms for software application programs enable users of computing devices to browse listings of the application programs and to download certain application programs to their respective computing devices. Application distribution platforms provide users a convenient service through which the users can view those application programs that are available for installation and/or execution on their devices. In some examples, an application distribution platform is hosted by an organization that developed an operating system through which the application distribution platform may be accessed.

A user may register a credit card or other purchasing instrument with a distribution platform, permitting the user to download multiple application programs without repeatedly entering the credit card information. For example, the user may simply have to select a "download" interface element and provide a password in order to initiate purchase and download of an application program (and if the user has provided the password recently, it may be saved so that it need not be re-entered).

Application distribution platforms provide developers of application programs a convenient service through which to offer their application programs to end users. A developer may upload an application program to a distribution platform and may specify a title and description for the application program. The distribution platform may be responsible for promoting the uploaded application program to end users, and for delivery of the application program to those end users that request download of the application program. Application programs offered through an application distribution platform may have been developed using a common software development kit, or versions thereof. In other words, the application programs provided by an application distribution platform may be configured for execution by a single operating system.

An application program downloaded from an application distribution platform may include features that enable users of the application program to purchase digital software products (e.g., additional levels for a game). The application distribution platform may include components that process requests to purchase such in-app products and handle payment processing.

SUMMARY

This document describes techniques, methods, systems, and other mechanisms for purchasing content using application programs.

The details of one or more implementations are set forth in the accompanying drawings and the description below. Other features, objects, and advantages will be apparent from the description and drawings, and from the claims.

DESCRIPTION OF DRAWINGS

FIGS. 4-9 show a user interface presented by a computing device as a user purchases an in-app product.

Like reference symbols in the various drawings indicate like elements.

DETAILED DESCRIPTION

This document generally describes purchasing content using application programs. In general, an application program may provide a user interface that includes elements with which a user can initiate the purchase of one or more products. Example products include digital content (e.g., photos and videos) and additional functionality for the application (e.g., new levels or features for a game). Such purchases initiated from within an application are referred to herein as in-app purchases and such products are referred to herein as in-app products.

As described in greater detail throughout this disclosure, an in-app purchasing system supports the purchase of in-app products. The in-app purchasing system includes a market application program on a computing device that provides a common interface for in-app purchasing requests by multiple third-party application programs on the computing device.

The market application program may communicate with a market server system to implement purchase of the in-app product. The market server system can store information concerning in-app products (e.g., price, name, description), and can provide this information to the purchasing computing device. The computing device can generate a checkout user interface that includes elements with which the user can confirm that the user would like to purchase the in-app product at the specified price and complete the purchase. The in-app purchasing system is described in greater detail throughout this disclosure and with reference FIGS. 1-20C.

Distribution Platform Developer Site

Figure 1:
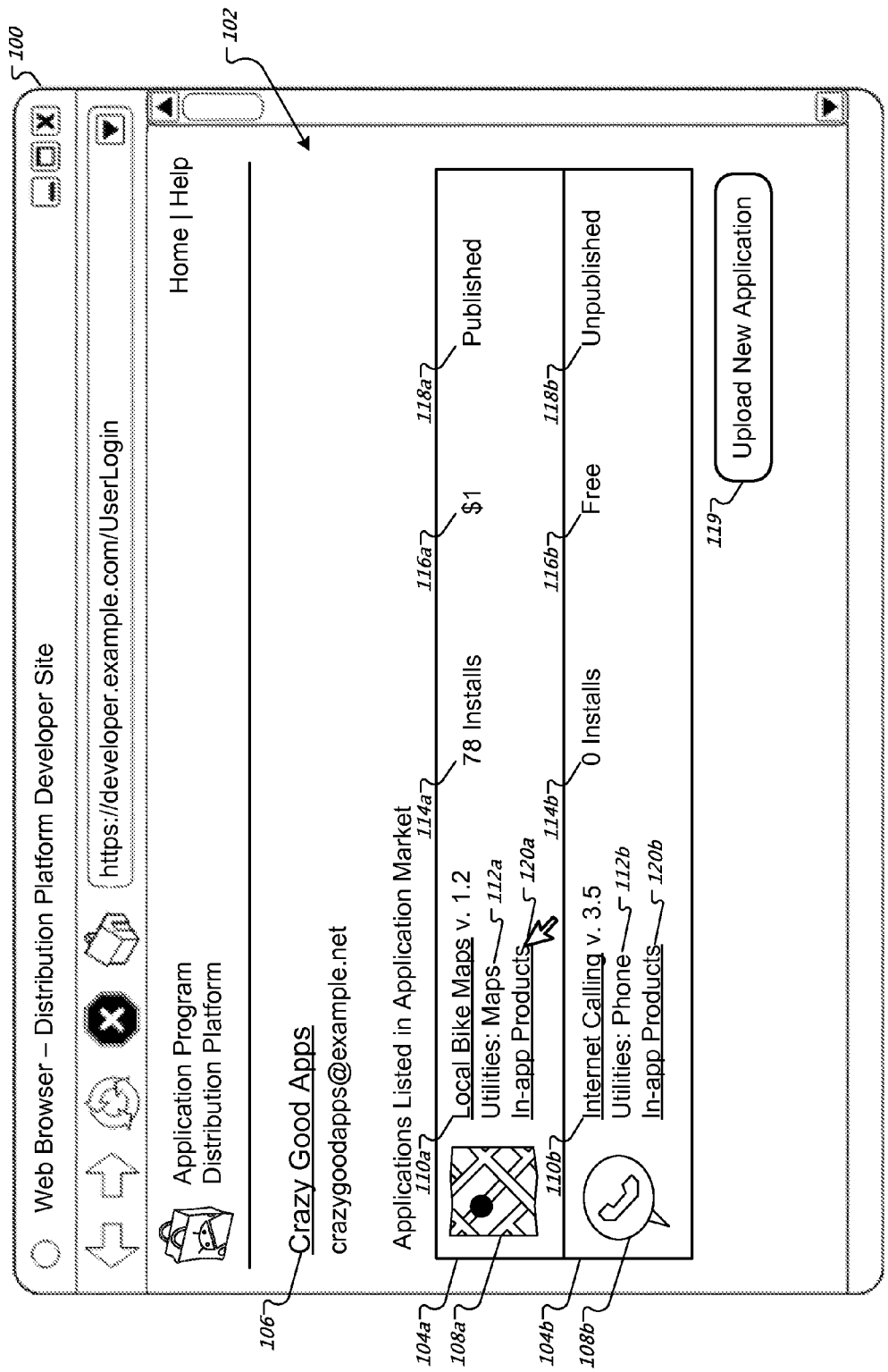
FIG. 1 shows a web browser that is displaying a web page with which a developer of an application program can upload applications to the application distribution platform and manage the uploaded applications.

FIG. 1 shows a web browser 100 that is displaying a web page 102 with which a developer of an application program can upload applications to the application distribution platform and manage the uploaded applications. A developer web site, of which web page 102 is a component, includes elements that enable the developer to manage the developer's presence on the application distribution platform. A developer may be a particular user, group of users, or entity that accesses the developer website and that is responsible for the promotion of one or more application programs, and that may have created the one or more application programs.

The developer website includes elements with which the developer can register the one or more application programs for promotion through the application distribution platform, and with which the developer can manage information displayed to end users in association with indications of the one or more application programs. The developer website also includes elements with which the developer can register one or more in-app products that can be purchased using certain of the one or more application programs.

Specifically, the web page 102 displays elements 104a and 104b, which identify application programs that developer "Crazy Good Apps" (as identified by element 106) has uploaded to the application distribution platform. In association with the element shown for each uploaded application program, the web page 102 displays elements that identify details of each respective application program, such as icons 108a and 108b, titles 110a and 110b, categories 112a and 112b, installation identifiers 114a and 114b, price identifiers 116a and 116b, and publication identifiers 118a and 118b.

The developer can view the web page 102 as a result of providing valid credentials (e.g., a user name and a password) for a user account of the developer with the distribution platform. Once logged in, the developer may view web page 102. The developer may modify the settings for each application program by selecting the title for the respective application program (e.g., title 110a or 110b). The title for each respective application program may be a selectable graphical interface element (e.g., a selectable link, button, or icon).

Web page 102 includes "In-app products" links 120a and 120b. User selection of one of the links 120a and 120b results in the display of a web page for managing any in-app products that end users can purchase through use of the respective application program. For example, user selection of the link 120a for the "Local Bike Maps" application program causes the web browser 100 to navigate to the display of the in-app purchasing webpage that is shown in FIG. 2.

Figure 2:
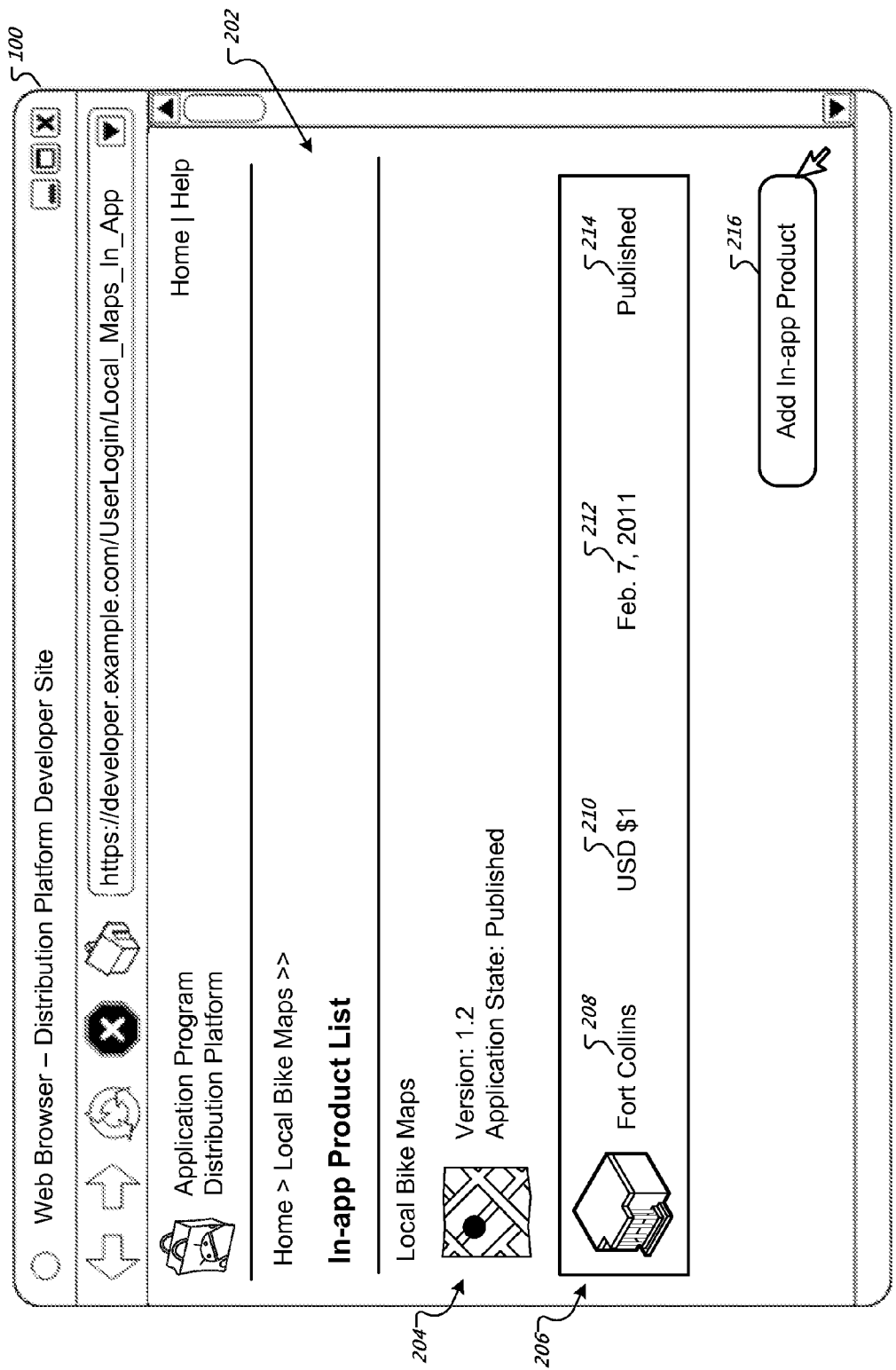
FIG. 2 shows a web browser that is displaying a web page for managing in-app products.

FIG. 2 shows a web browser 100 that is displaying a web page 202 for managing in-app products. The web page 202 may be displayed as a result of the user selecting link 120a, as shown in FIG. 1. Link 120a corresponds to the "Local Bike Maps" application program. As such, the web page 202 includes element 204 that identifies the "Local Bike Maps" application program. The web page 202 also includes element 206 of a single in-app product that the developer has specified as being available for purchase through use of the "Local Bike Maps" application. In this example, the in-app product includes bike maps for Fort Collins, Colo. The web page 202 includes elements that identify details of the Fort Collins bike map product, for example, a title 208, a price 210, a date added by the developer 212, and a publication identifier 214.

In this example, the developer would like to enable users of the "Local Bike Maps" application program to purchase a bike map for Portland. Accordingly, the developer selects an "Add In-app Product" element 216. As a result, the web browser 100 displays the web page that is shown in FIGS. 3A-C.

Figure 3A:
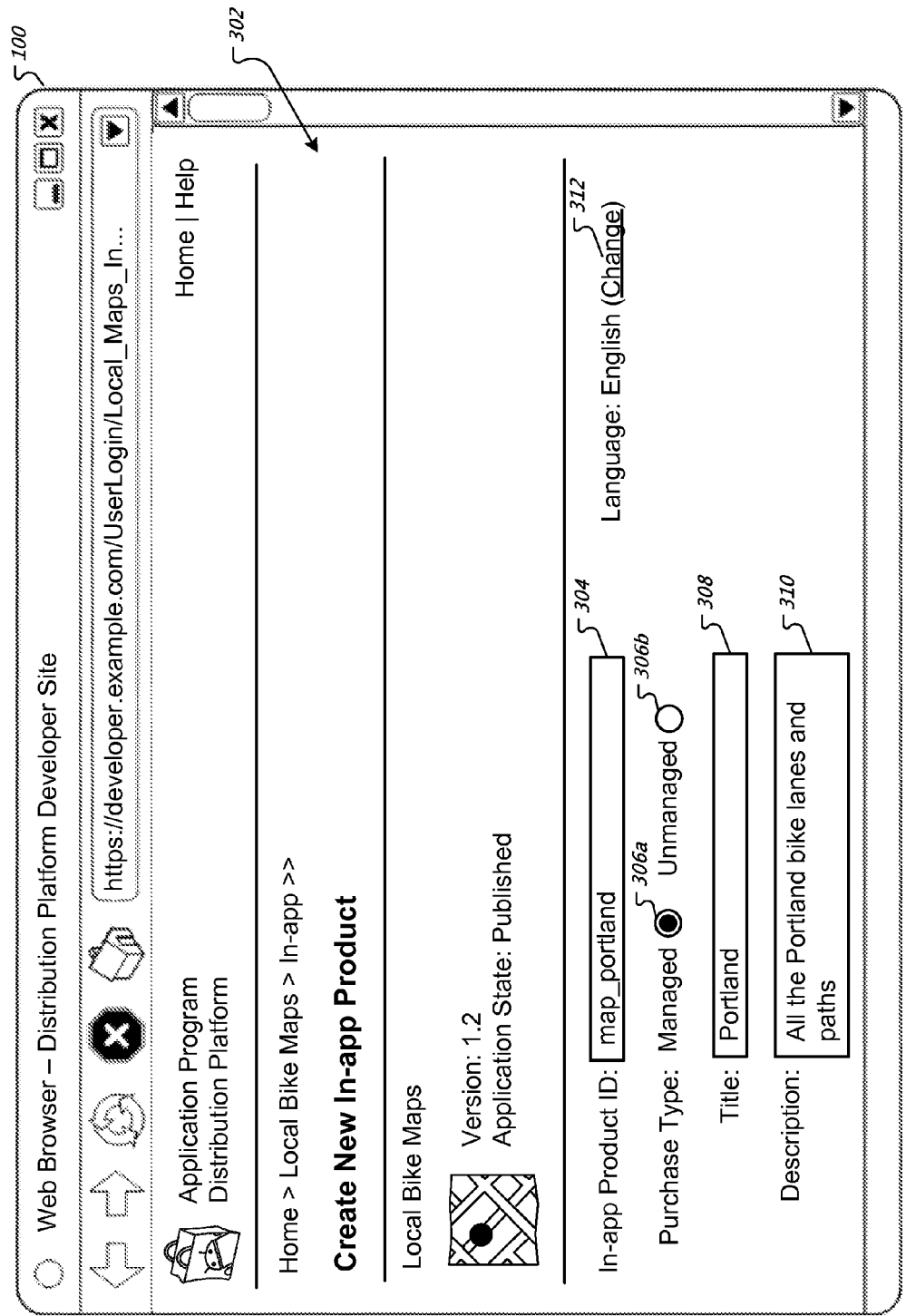
FIGS. 3A-C show a web browser that is displaying a web page that includes elements with which a developer can specify a new in-app product.
Figure 3B:
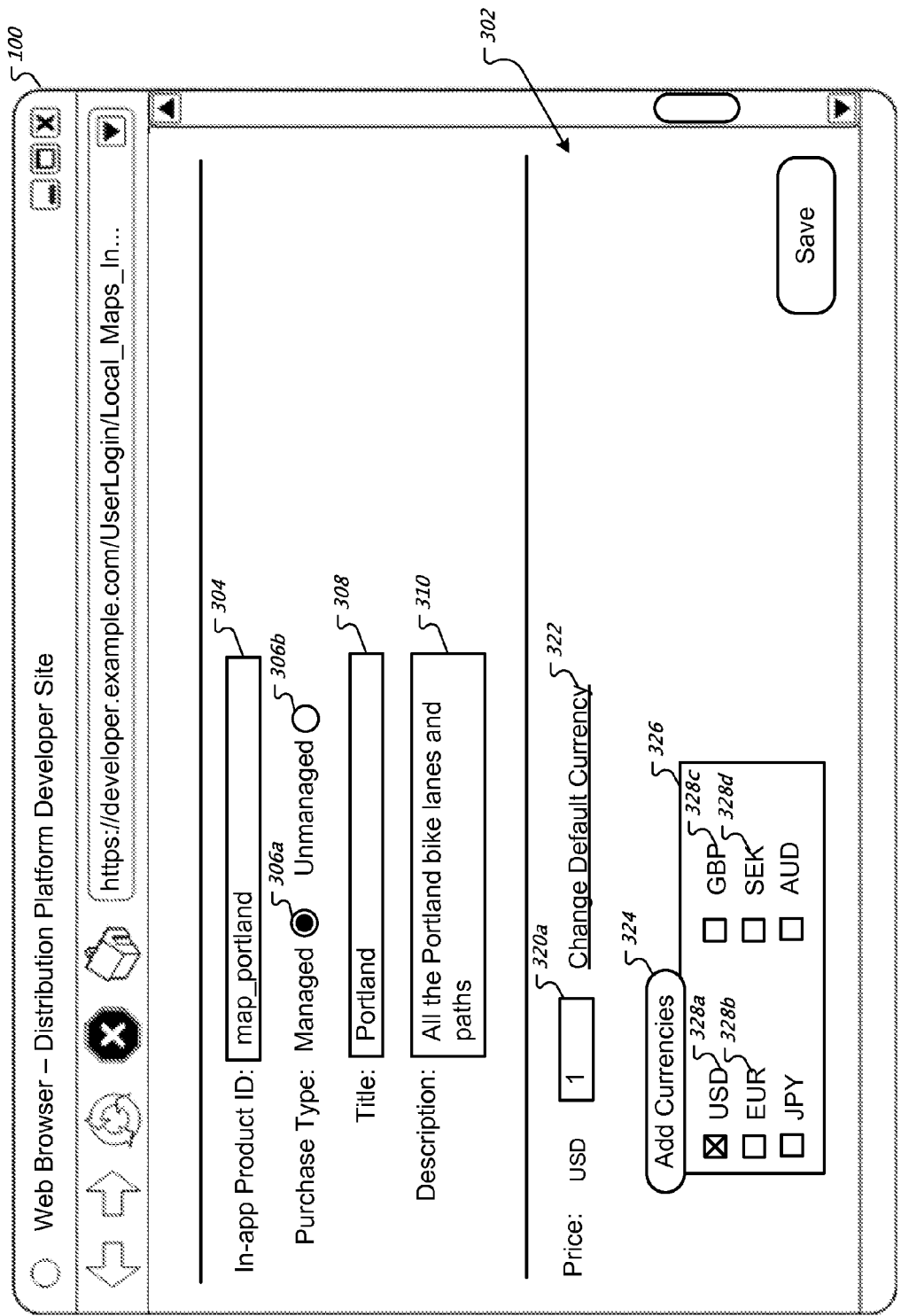
Figure 3C:
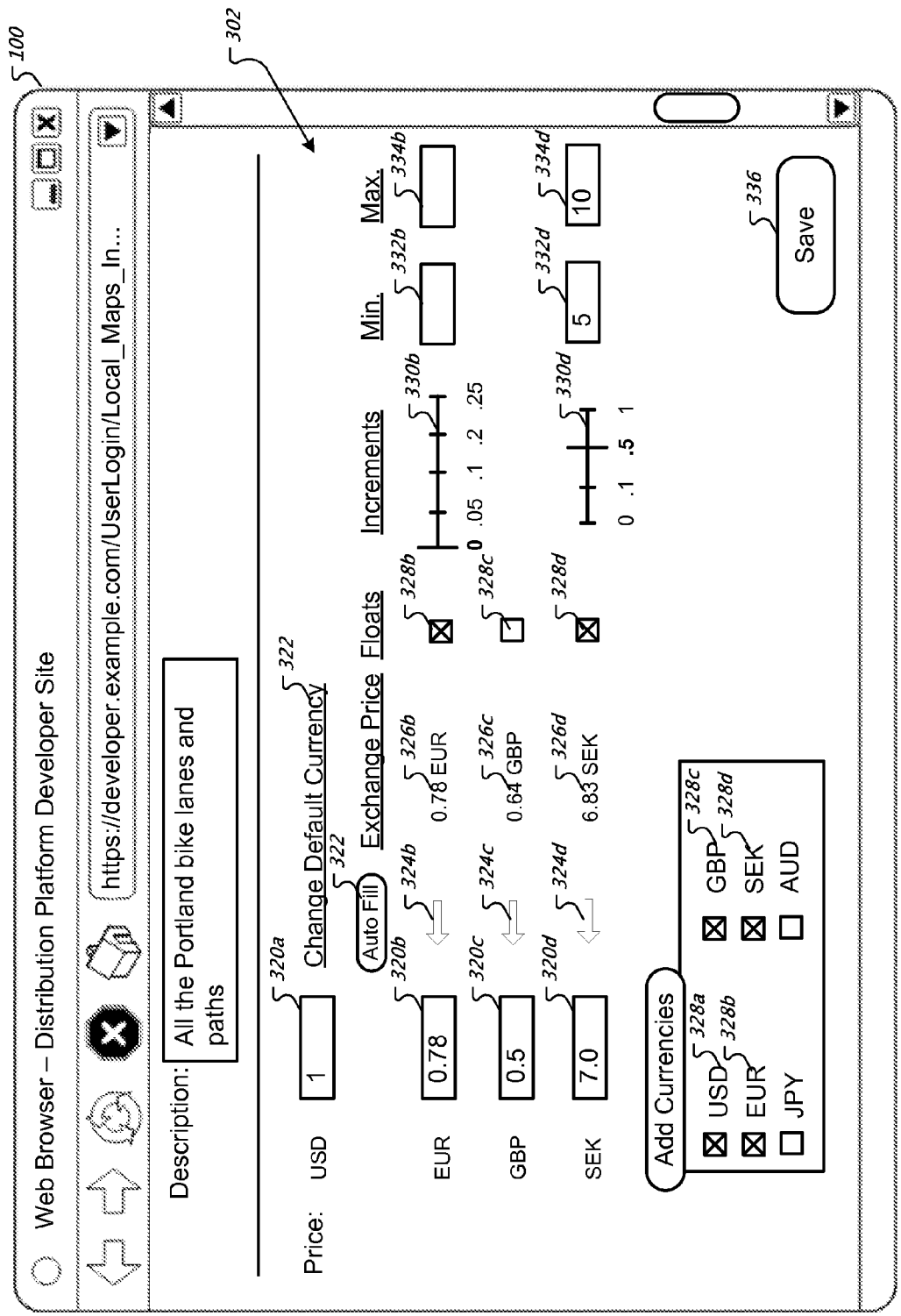

FIGS. 3A-C show a web browser 100 that is displaying a web page 302 that includes elements with which a developer can specify a new in-app product. In this illustration, the developer is using the web page 302 to add Portland bike maps as a new in-app element for the "Local Bike Maps" application. The web page 302 includes various user elements (e.g., fields and controls) with which the developer can specify the details of the new in-app product. For example, the developer provides input in the In-app Product ID field 304 to specify that the product identifier for the Portland bike in-app product is "map_portland." An application program uses the product identifier to request the purchase of the in-app product.

The web page 302 includes radio buttons 306a and 306b with which the developer can select whether the in-app product will be "Managed" or "Unmanaged" by the distribution platform. In some embodiments, products that are managed can be purchased only once per user account. When a product is managed, the in-app purchasing system permanently stores the transaction information for the product on a per-user basis. This enables an application to query the market server system and restore the products that the application program has previously downloaded. A managed product may be useful if a third-party application is selling products such as game levels or application features. These products are not transient and may be restored when a user reinstalls the application, wipes the data on their device, or installs an application on a new device.

In some embodiments, products that are unmanaged do not have their transaction information stored by the in-app billing system. The third-party application may be responsible for managing the transaction information of unmanaged products. Also, unmanaged products can be purchased multiple times as far as the in-app purchasing system is concerned. The "unmanaged" purchase type may be useful if the application program is selling consumable products, such as fuel or magic spells.

The web page 302 also includes a title field 308 and a description field 310. The developer can provide input into fields 308 and 310 to specify a title and a description for the in-app product. The developer can change the default language assigned to the in-app product by selecting link 312. The default language ("English" in this example) may be inherited from the parent application.

As shown in FIG. 3B, the web page 302 includes elements with which the developer can specify prices for the in-app product in different currencies. For example, the developer of the "Local Bike Maps" application program can select currencies in which an end user of the application may purchase the Portland bike map in-app product. The developer can elect to auto-populate prices for the selected currencies based on current currency exchange rates. The developer can elect whether prices should automatically change as the currency exchange rates change, and can specify increments in which an automatically changing price should jump.

More specifically, web page 302 includes field 320a for receiving developer input that specifies a price in the default currency (USD in this example). The default currency for an in-app product may be inherited from the parent application program (i.e., the "Local Bike Maps" application program). The developer may change the default currency by selecting the Change Default Currency link 322.

In this illustration, the developer would like to set prices for additional currencies. The developer selects an Add Currencies element 324. Dialog box 326 appears as a result. Dialog box 326 includes fields for different currencies, with a USD (United States dollars) field 328a having already been selected. The developer would also like to set prices in EUR (euro), GBP (British pound sterling), and SEK (Swedish Krona). As such, the developer selects the EUR field 328b, the GBP field 328c, and the SEK field 328d.

In this illustration, web page 302 displays additional elements as a result of the developer selecting fields 328b, 328c, and 328d. For example, the web page 302 may modify to the display of FIG. 3C.

Now with reference to FIG. 3C, web page 302 has changed to include fields 320b, 320c, and 320d in which the developer may specify prices in various currencies. Web page 302 also displays a current exchange price 326a, 326b, and 326c for each of the currencies based on the USD 1 default currency price. In some examples, the web page additionally or alternatively displays the current exchange rate for each currency (e.g., "EUR 0.78 to USD 1.00").

In some examples, the web page auto-populates fields 320b, 320c, and 320d with prices at current exchange rates. In other words, as a result of the user entering the value "1" in the USD field 320a, computing processes that support the web page may identify the current exchange rate for 1 USD in EUR, GBP, and SEK, and may automatically populate the EUR field 320b, the GBP field 320c and the SEK field 320d with prices based on the identified exchange rates. The developer may not provide input that specifies the values presented in the EUR field 320b, the GBP field 320c, and the SEK field 320d.

In some examples, after the user has entered the value "1" in the USD field 320a, the fields 320b, 320c, and 320d may not automatically populate with prices based on current exchange rates. Rather, the exchange prices may display as elements 326b, 326c, and 326d, and the developer can cause fields 320b, 320c, and 320d to auto populate with prices by selecting the "Auto Fill" user interface element 322. The developer can populate individuals ones of fields 320b, 320c, and 320d with individual ones of the exchange prices shown by elements 326b, 326c, and 326d by selecting respective interface elements 324b, 324c, and 324d.

The developer can select elements 328b, 328c, and 328d to specify whether the values stored in fields 320b, 320c, and 320d are fixed or can float with changes in currency exchange rates. Moreover, if a developer has specified that a particular price can float with changes in the appropriate currency exchange rate, the developer can identify increments of the appropriate currency between which the price is able to float. The developer can specify such increments using sliding elements 330b and 330d. Furthermore, a developer can specify a minimum value and a maximum value between which a price is permitted to float using user interface elements 332b, 332d, 334b, and 334d.

As an illustration of a developer's use of web page 302, the developer specifies the value "1" in USD field 320a (e.g., by typing the value "1" using a physical or virtual keyboard). In response, the system automatically generates the display of exchange prices 326b, 326c, and 326d without further user input. The developer selects interface element 324b to copy the current price 326b of "0.78 EUR" into field 320b. The developer wishes that this value change as the rate of exchange between the United States dollar and the euro changes and, as such, the developer selects the Floats element 328b. As a result, the web page 302 displays elements 330b, 332b, and 334b.

The developer moves the slider on element 330b to "0" to indicate that the price in euros is to change at the smallest domination of the currency (0.01 euro, in this example). The developer does not specify a minimum and maximum price in euro using the minimum and maximum fields 332b and 334b. As a result of this developer input, after the developer saves the prices (e.g., by selecting a "Save" element 336) the distribution platform may regularly change the price of the in-app product in euro without the developer's intervention.

Continuing with the illustration, the developer prefers to have a fixed price of "0.5" GBP and, as such, does not select element 324c and rather specifies the value "0.5" in GBP field 320c. The developer does not select the Floats element 328c for the GBP price.

The developer prefers that a price of the in-app product in SEK float, but in increments of 50 ore. As such, the developer selects element 324d to copy the current exchange price of 6.83 SEK into field 320d. The developer then selects the Floats element 328d and drags the slider element 330d to "0.5" SEK. As a result, the computational processing supporting the web page 302 rounds the value 6.83 SEK to the nearest 0.5 SEK (i.e., 7.0 SEK). Further, even after the developer leaves web page 302, the in-app purchasing system will continue to round the price in SEK to the nearest 0.5 SEK, even as the current exchange price changes.

The developer does not desire that the in-app purchasing system charge less than 5 SEK should the Swedish Krona strengthen and, as such, the developer specifies "5" SEK in minimum field 332d. The developer does not desire that the in-app purchasing system charge more than 10 SEK should the Swedish Krona weaken and, as such, the developer specifies "10" in maximum field 334d.

Once satisfied with the information that the developer has specified using web page 302, the developer selects the save interface element 336. In response, the in-app purchasing system may save information specified by the developer (e.g., the title, the description, and pricing rules). The in-app purchasing system may regularly calculate prices for the in-app product in various currencies, for example, upon each purchasing request by an end user or upon a regularly scheduled time interval (e.g., every hour).

Data Stored for Each In-App Product

As a result of the user selecting the save element 336, the in-app purchasing system stores a collection of information that specifies details of the newly-added in-app product. This collection of information includes the following fields:

(1) Application Name: The application name is set based on the application under which the in-app product was created. For example, the "Portland" bike map product is generated under the "Local Bike Maps" application program.

(2) In-app Product ID: The in-app product ID is specified by the user in product ID field 304. Product IDs may be unique across an application's namespace. In other words, upon a developer specifying a name in the product ID field (e.g., after the developer selects the save interface element 336), the in-app purchasing system may determine whether the value in field 304 is different than all previously-saved product IDs for a given application name. If the product ID has already been used, the developer may be prompted to enter a different product ID.

(3) Purchase type: The purchase type for an in-app product may be either "Managed" or "Unmanaged" as specified by radio buttons 306a and 306b. Other purchase types are possible.

(4) Publishing state: A product's publishing state can be "published" or "unpublished." An unpublished product may not be published, by the distribution platform, on a web page or other graphical user interface that lists in-app products. Requests to purchase unpublished items may return an error.

(5) Product Info History List: In-app products may be modified (e.g., a developer may change the description, title, and price), but a developer may not be able to change the product ID. Accordingly, the in-app purchasing system may store a "snapshot" of a product each time the product changes. Each snapshot may reference a different version of the product. Accordingly, the in-app purchasing system is able to identify the historical details of an in-app product at a given historical time. The following fields may be stored for each version of a product.

(5A) Language: The language for a given version of a product as set, for example, using link 312.

(5B) Title: The title is the short descriptor for the product, as set in field 308. Titles may be unique across an application's namespace and every in-app product may have a title. The title may be visible to users during checkout, for example, as element 510 in FIG. 5.

(5C) Description: The description is a long descriptor for the product as set in field 310. A description may not have to be unique across an application's namespace. The description may be visible to users during checkout, for example, as element 512 in FIG. 5.

(5D) Price: Every product may be assigned at least one price that is greater than zero. The price may be visible to users during checkout, for example, as element 516 in FIG. 5.

(5E) Price Currency: The price currency specifies the type of currency for a corresponding price. A product information history list can include multiple prices and corresponding price currencies.

(5F) Published Time: The published time can indicate the time at which the version of the in-app product was published, for example, a time at which the developer selected the save interface element 336.

(6) First Published Time: The first published time can indicate the time at which the earliest version of the in-app product was published.

(7) Current Version: The current version field identifies the most-recent version of the in-app product (e.g., the collection of language, title, description, price, currency, and published time).

(8) Transaction History: For in-app products that are "managed," the computing system may store the following items: (a) transaction identifier, (b) purchase price, (c) purchase time, and (d) purchase state. The transaction history information may be stored in the transaction information storage 1018. The above-described transaction history information may be stored for each purchase of a product. For example, the transaction information storage 1018 may store the above-described transaction identifier, purchase price, purchase time, and purchase state in association with an identifier for a user that purchased the product and an identifier for the purchased product.

Product Purchase from User Computing Device

Figure 4:
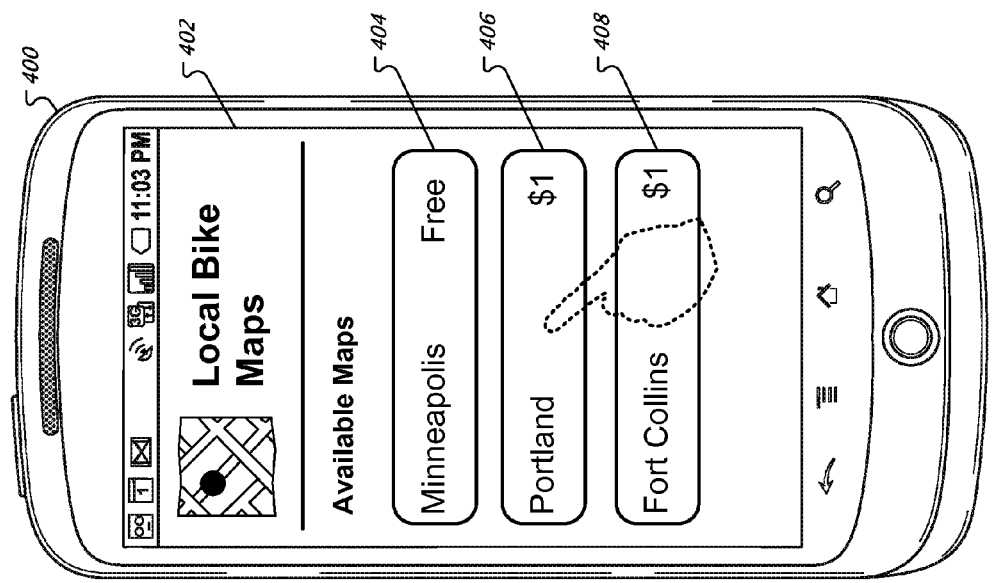

FIGS. 4-9 show a user interface presented by a computing device 400 as a user purchases an in-app product. In FIG. 4, a user has launched a Local Bike Maps application program. The user may have previously accessed an application program distribution platform and selected an element that initiated the download of the Local Bike Maps application program to the user's computing device 400. The computing device 400 may have presented an icon for the Local Bike Maps application on the desktop of the computing device 400, and the user may have selected the icon to launch the interface 402. The application, as downloaded, may include code that, when executed, results in the computing device 400 displaying the user interfaces depicted in FIGS. 4-9.

Interface 402 includes three interface elements 404, 408, and 410 that identify three different maps that the Local Bike Maps application program is able to display. The "Minneapolis" map is free and the user may cause the device 400 to display the Minneapolis map by selecting interface element 404. The "Portland" and "Fort Collins" maps, however, are not available for immediate display by device 400 and may be purchased for $1 each, as indicated by the text on interface elements 406 and 408.

In this illustration, the user decides to purchase the "Portland" map and, as such, selects the "Portland" element 406. As a result, the computing device 400 displays interface 502. Interface 502 includes a purchasing dialog box 504 that is shown as hovering over a background, although dialog box 504 may fill the entire display.

As described throughout this disclosure, dialog box 504 may be provided by components other than the Local Bike Maps application program. For example, the Local Bike Maps application may, as a result of user input selecting the interface element 406, request that a market application program 1050 (shown in FIG. 10A and discussed in further detail with reference thereto) generate the display of dialog box 504. The market application program 1050 may request, from a market server system 1010 (shown in FIG. 10A and discussed in further detail with reference thereto), content for presentation in the dialog box 504. For example, the application program title 506, the in-app product developer name 508, the in-app product title 510, and the in-app product description 512 may be retrieved from the market server system 1010. These items may have been specified by the developer (e.g., elements 110a and 106, and the values in fields 308 and 310).

The market application program 1050 may also request that the market server 1010 provide a list of the purchasing instruments that are valid for the user. A purchasing instrument can include credit card information, debit card information, or e-commerce payment information. The user of the computing device 400 may have previously registered two credit cards with the user's in-app purchasing system user account, a VISA credit card and an RBS credit card, in this example. Each of these purchasing instruments may have been assigned a default currency. For example, each credit card company may provide an indication of the default currency to the market server system 1010 during validation of the credit card with the in-app purchasing system.

In addition to receiving an indication of the purchasing instruments that are associated with the user, the market application 1050 may receive prices for the in-app product in the currencies that are assigned to the purchasing instruments (e.g, USD $1 for the VISA card and GBP £ 0.5 for the RBS card). The VISA purchasing instrument may be identified as a primary purchasing instrument and, as such, the market application 1050 initially displays an element 514 that identifies the VISA card purchasing instrument. The dialog box 504 also displays an element 516 that lists the price and currency of the product if purchased with the presently-selected purchasing instrument. The element 516, if selected, finalizes the purchase of the in-app product, at least from the standpoint of user input.

In this illustration, the user is interested in seeing the price at which the in-app product is sold if purchased in GBP with the user's RBS card. Accordingly, the user selects element 514. As a result, the computing device 400 presents a selectable list of the user's purchasing instruments (e.g., the VISA card and the RBS card), along with an option for adding a new purchasing instrument. The user selects the option for the RBS card and, as a result, the computing device 400 displays interface 602.

As shown in FIG. 6, interface 602 is similar to that of interface 502, except that element 514 has changed to identify the RBS credit card as selected, and element 516 has changed to identify the cost in GBP. Accordingly, as the user switches between purchasing instruments, the price for the in-app product may change. As described throughout this disclosure, each price may be specified by the developer as a fixed price, or, based on user-specified rules, may float without intervention from the developer as exchange rates change.

Although not shown in the figures, a user may add a purchasing instrument from the checkout interface. For example, the user may have selected the option to add a purchasing instrument from the pull down menu that displays upon selection of element 514. As a result, the computing device 400 may present a new interface (not shown). The new interface may include fields and control elements for specifying the details of a new purchasing instrument. The computing system 400 may request that a remote system confirm the details of the new purchasing instrument and, as a result of a positive confirmation, the user may be redirected back to an interface similar to that of interface 602 (although element 514 may identify the new purchasing instrument and element 516 may identify the price and currency if the in-app product is purchased with the new purchasing instrument).

Figure 12A:
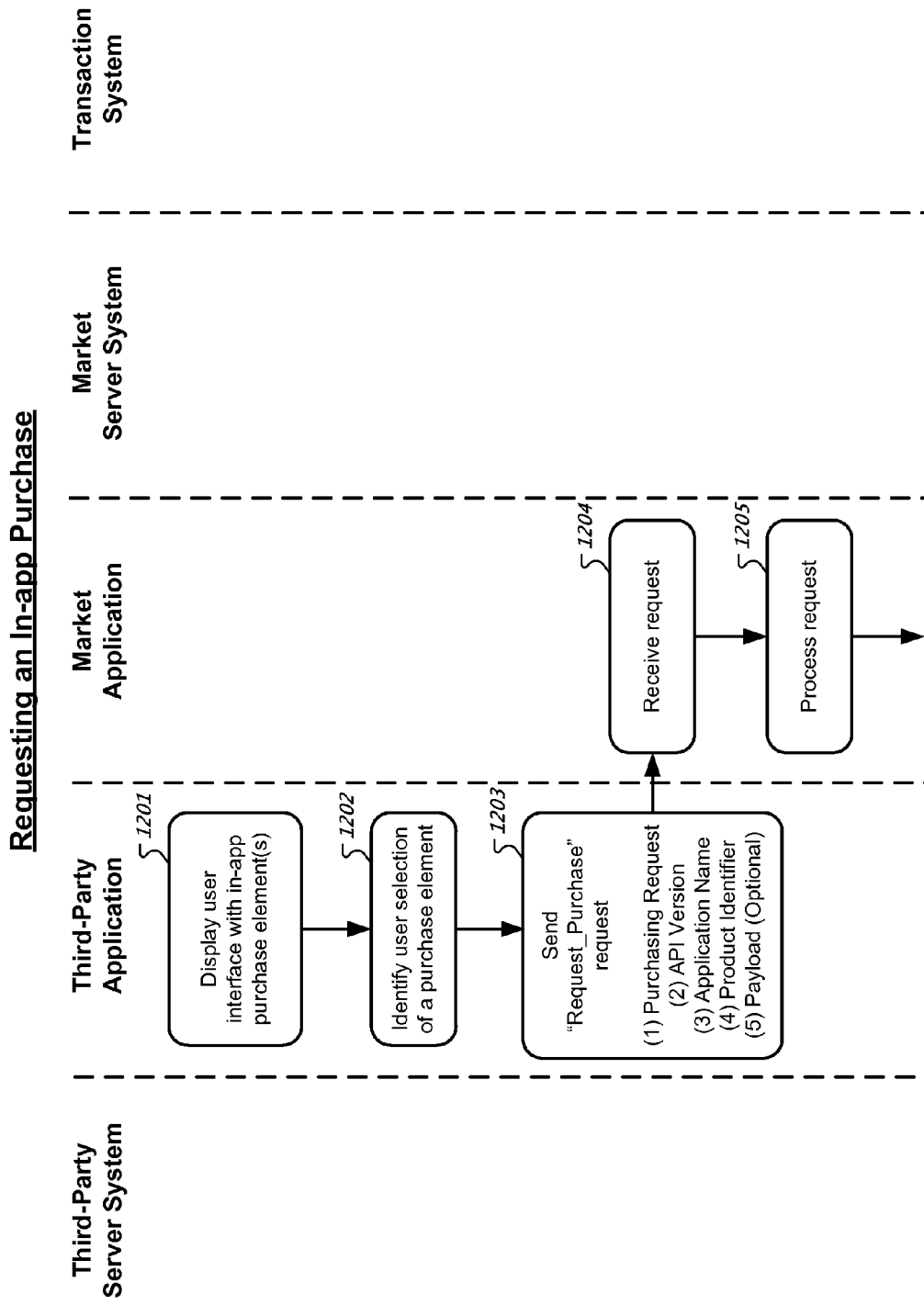
FIGS. 12A-H show a diagram of a process for requesting an in-app purchase.
Figure 12B:
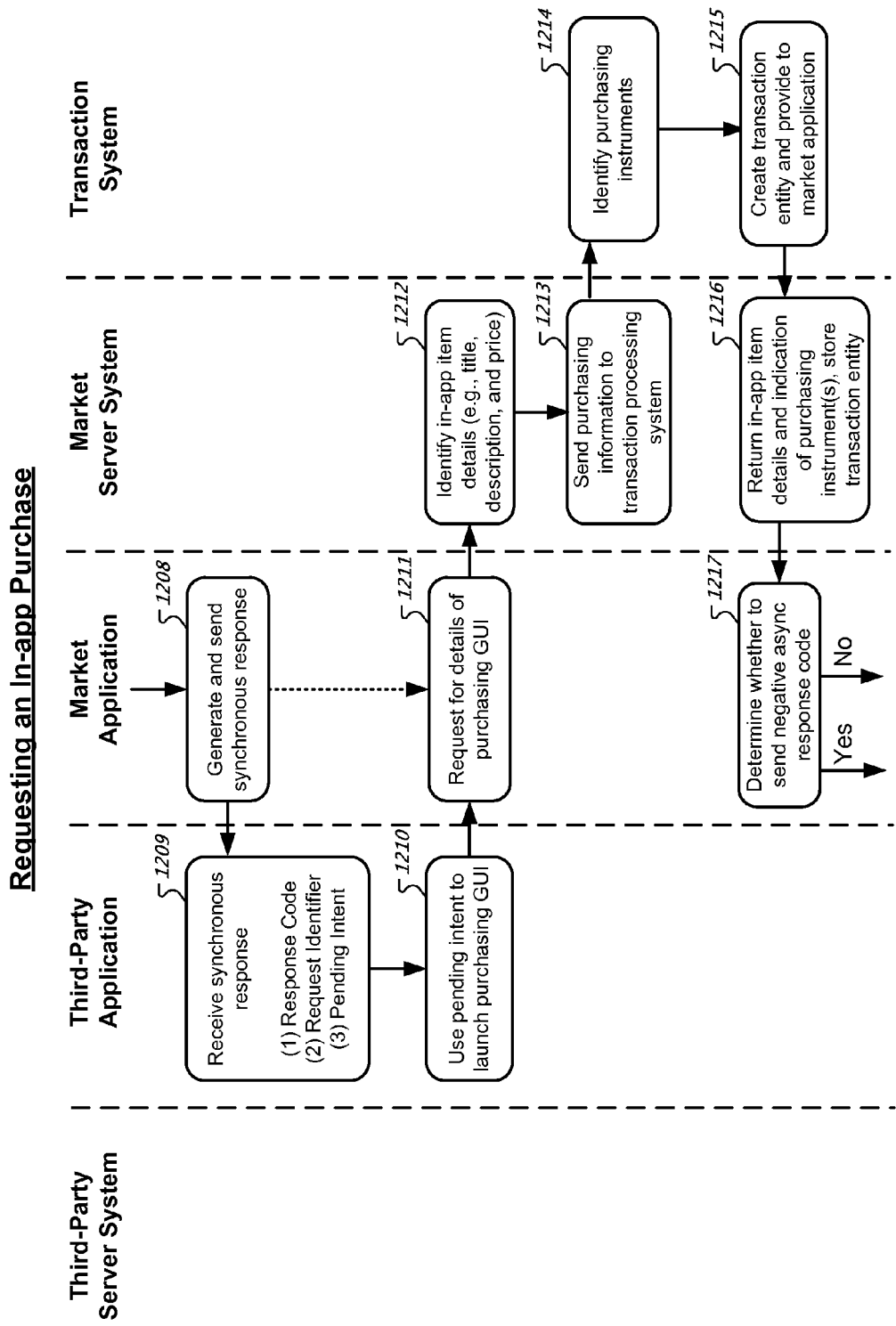
Figure 12C:
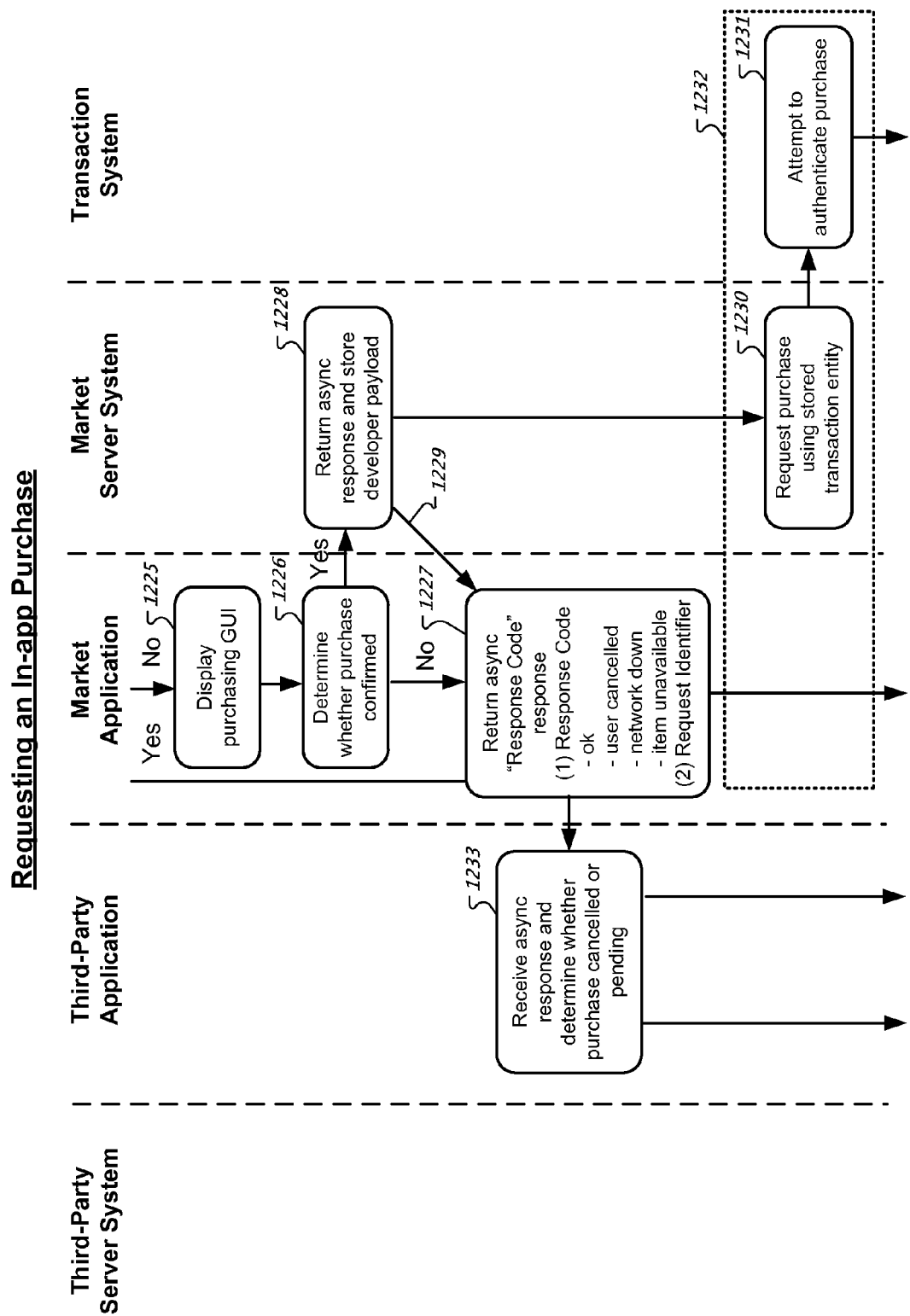
Figure 12D:
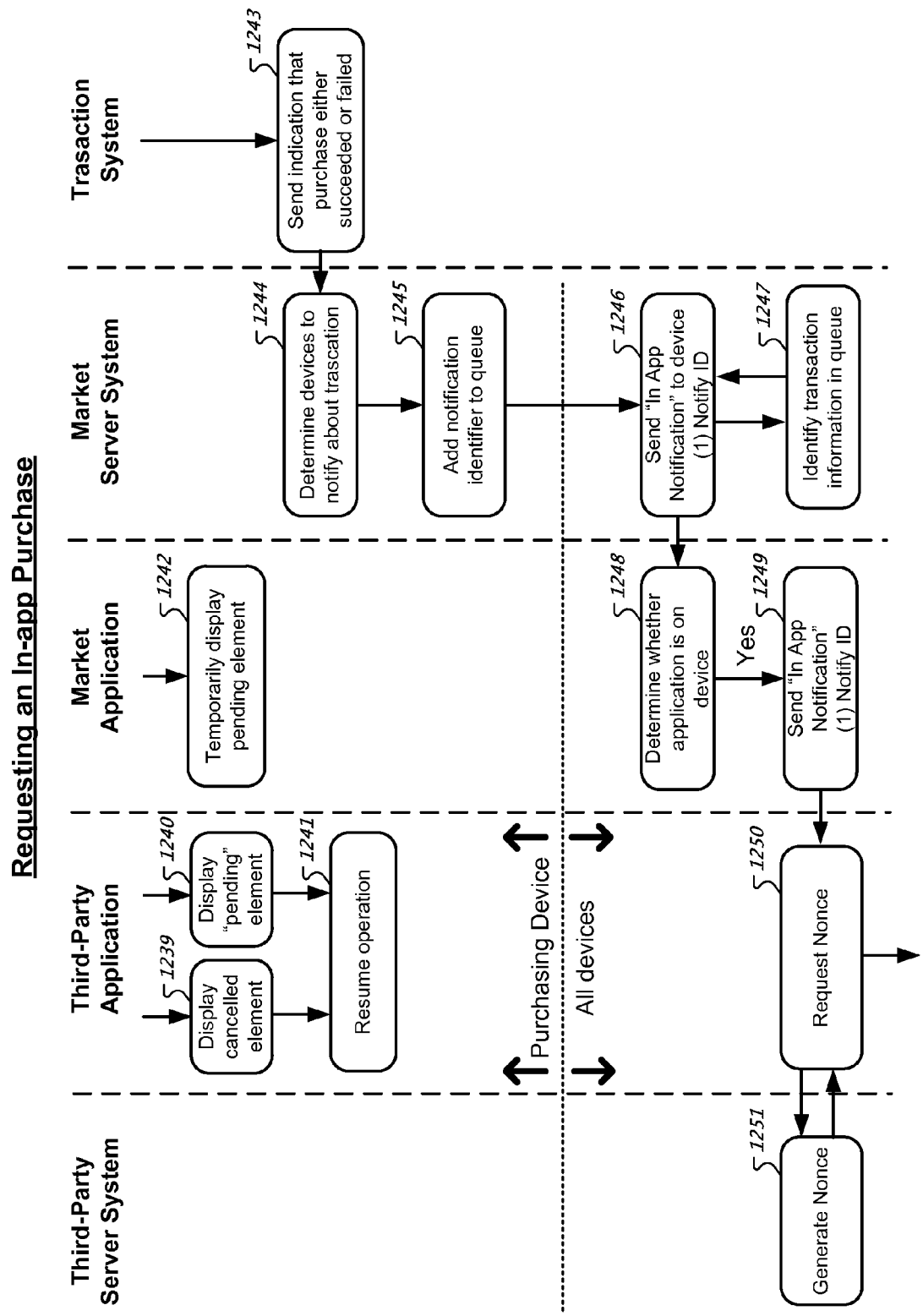
Figure 12E:
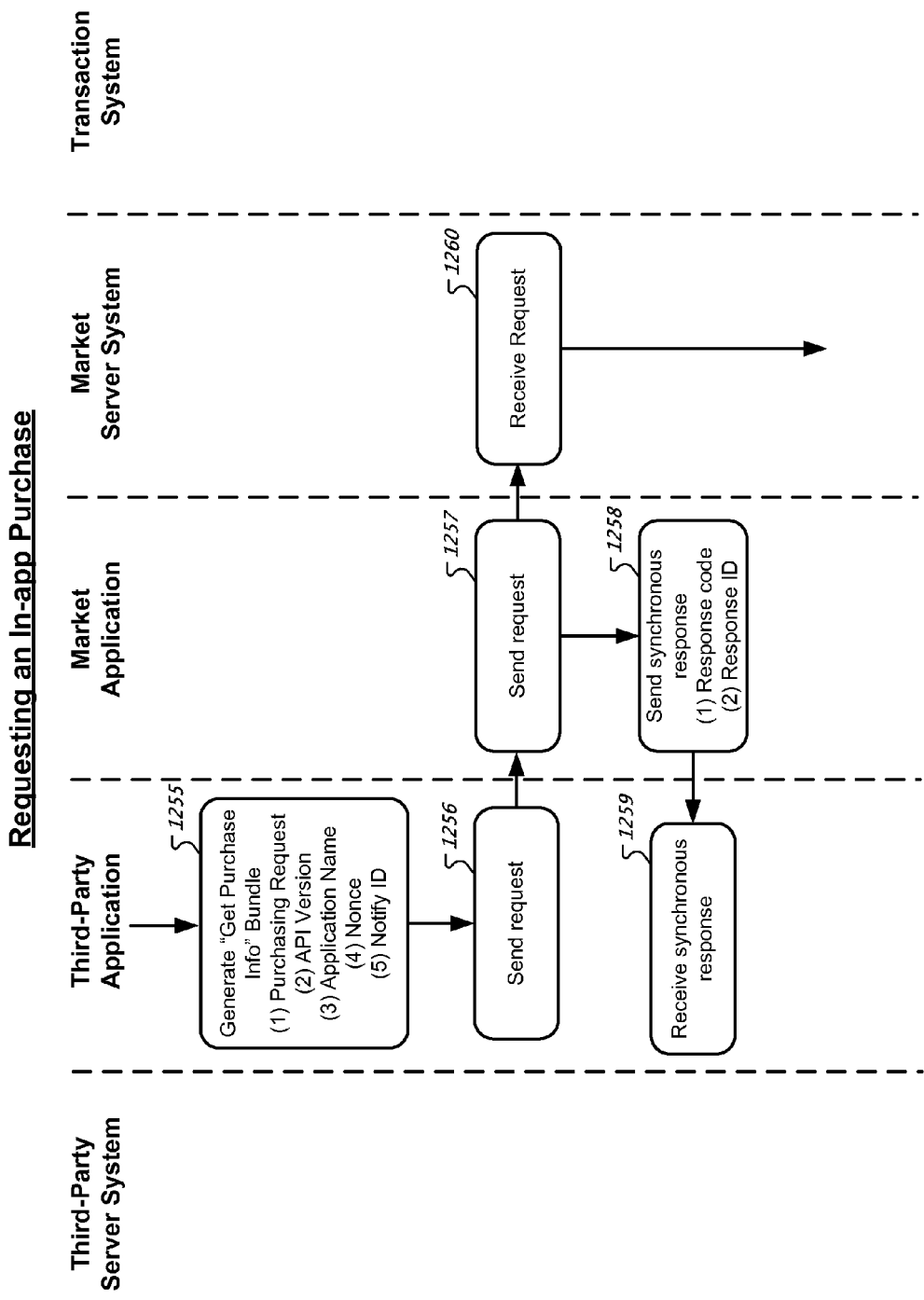
Figure 12F:
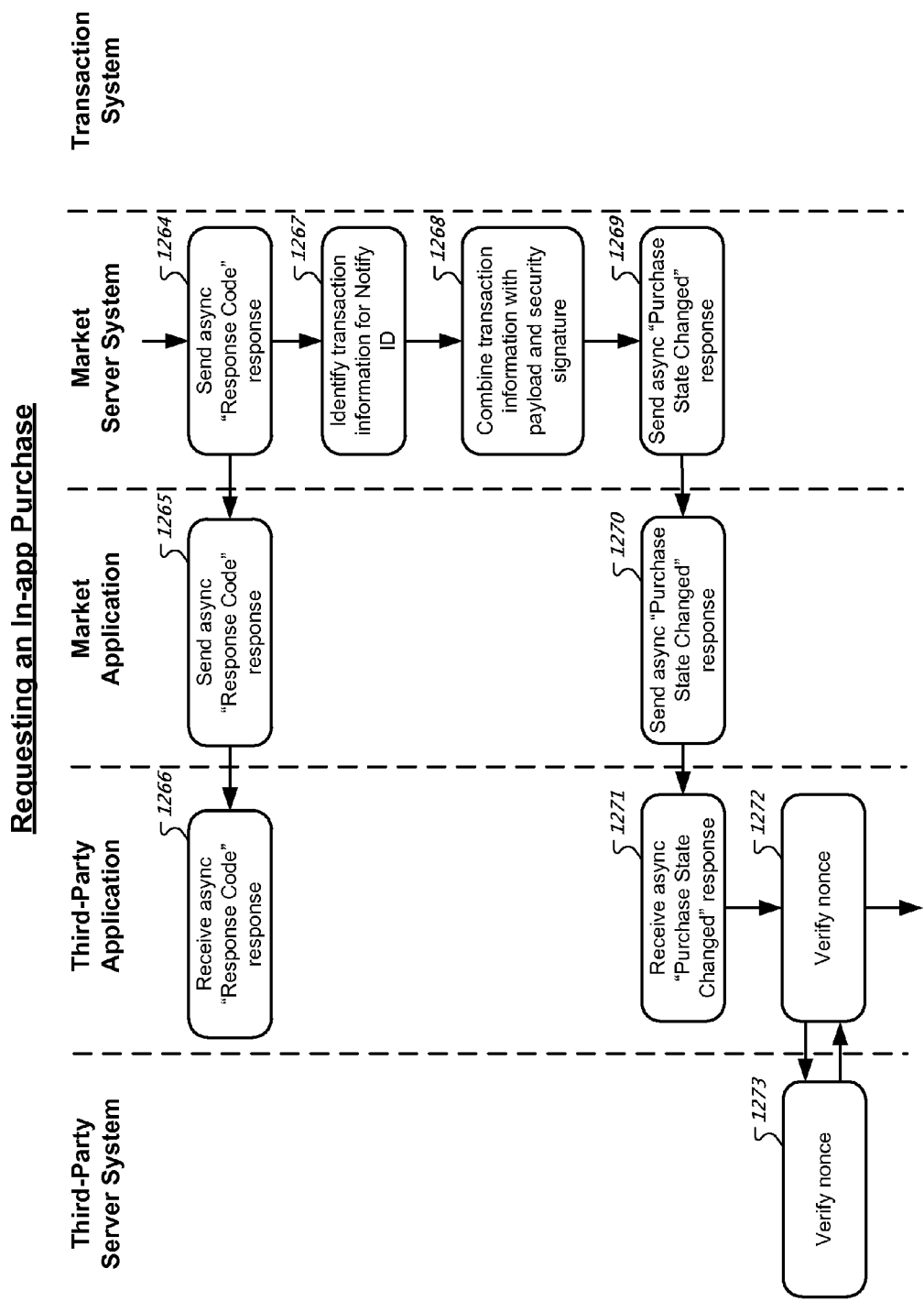
Figure 12G:
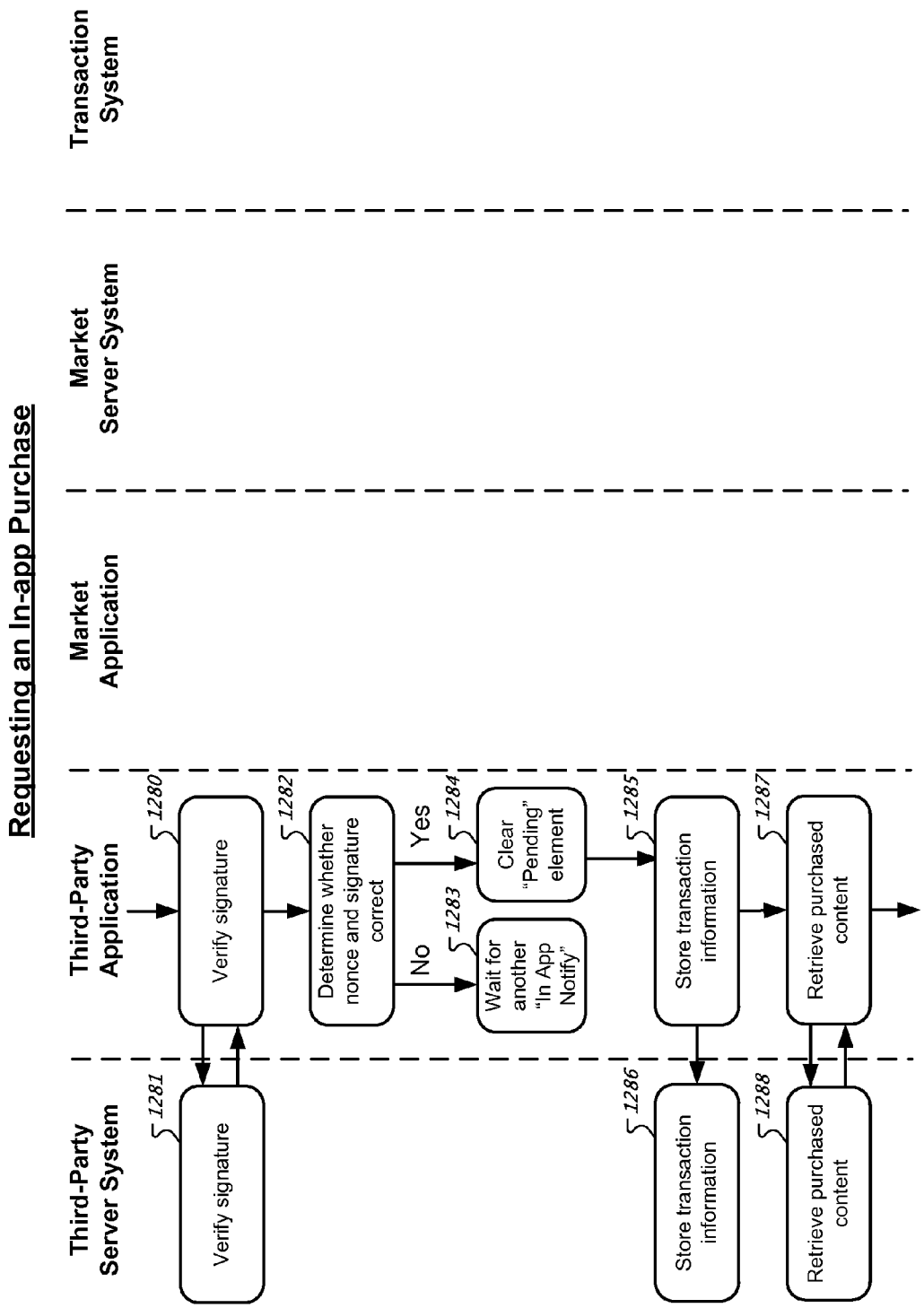
Figure 12H:
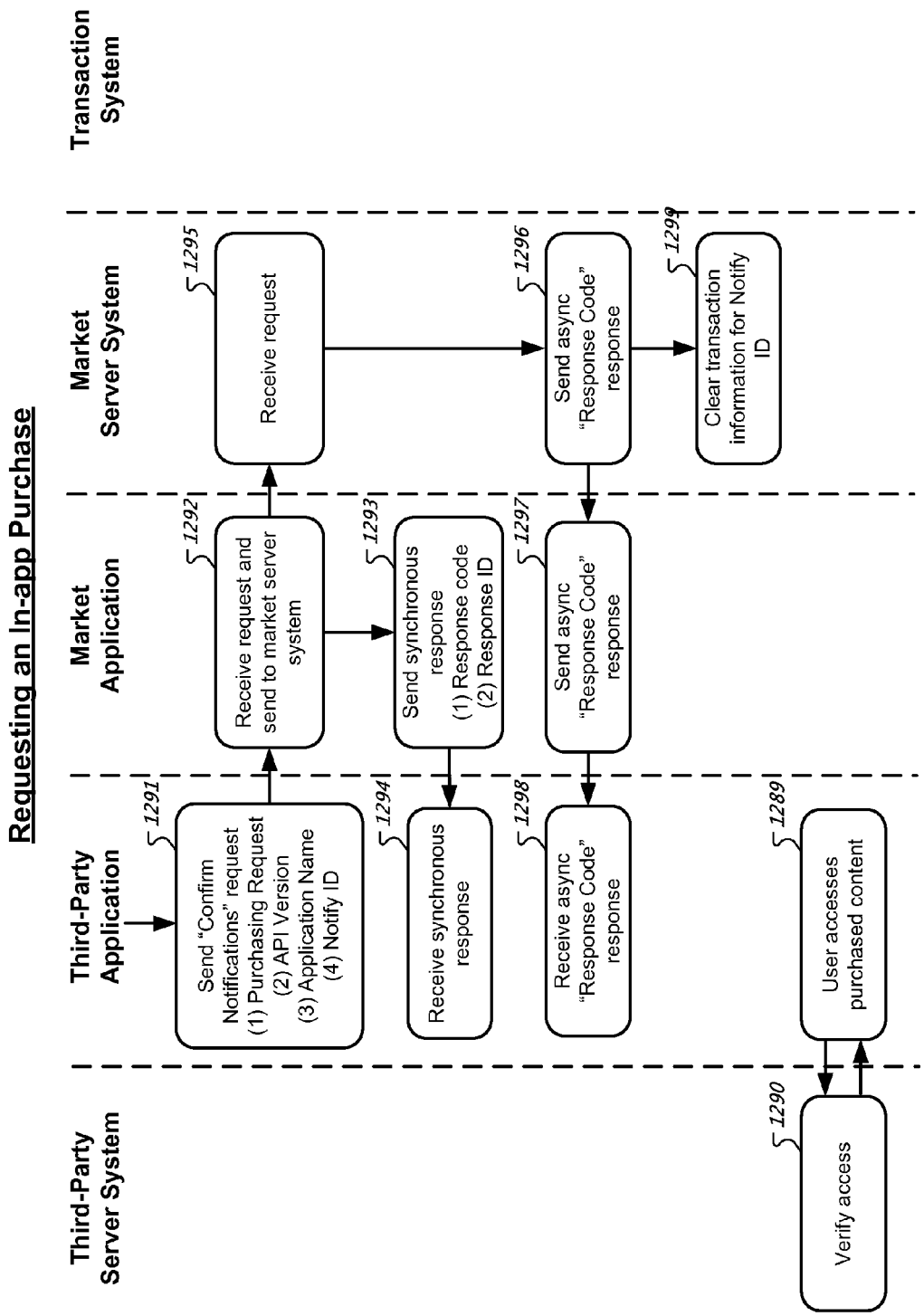

As shown in FIG. 7, after the user has selected the "Buy Now" interface element 516 (FIG. 5), the computing device 400 displays interface 702. In this illustration, interface 702 includes a dialog box 704 that is shown as "hovering" over a background display. The dialog box 704 includes elements that identify that the purchase of the Portland bike map is pending. In some examples, the dialog box 704 is displayed for a temporary period of time (e.g., the earliest of (i) thirty seconds, and (ii) receiving an indication that the product has been purchased) and then disappears from the interface 704, whether or not processing of the purchase has actually completed. The display of the dialog box 704 is discussed in additional detail with reference to box 1242 (FIG. 12D).

Figure 8:
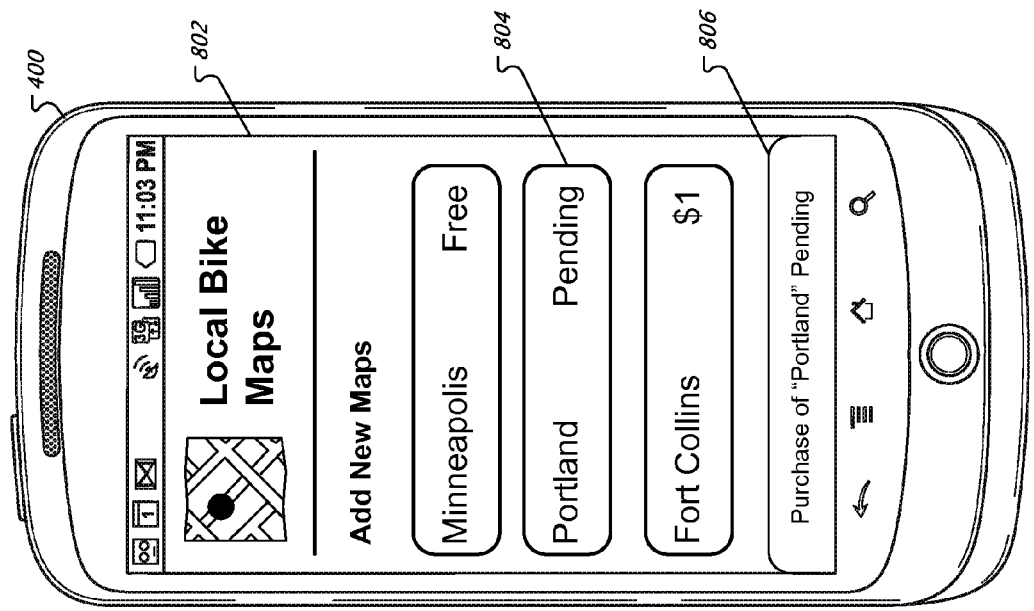

As shown in FIG. 8, after dialog box 704 has disappeared from the interface, the computing device 400 may display interface 802. Interface 802 is substantially similar to interface 402, except that the interface 802 includes one or more elements 804 and 806 that indicate that the purchase of the Portland bike map is pending. In some examples, zero or one of the indications on elements 804 and 806 are presented.

Figure 9:
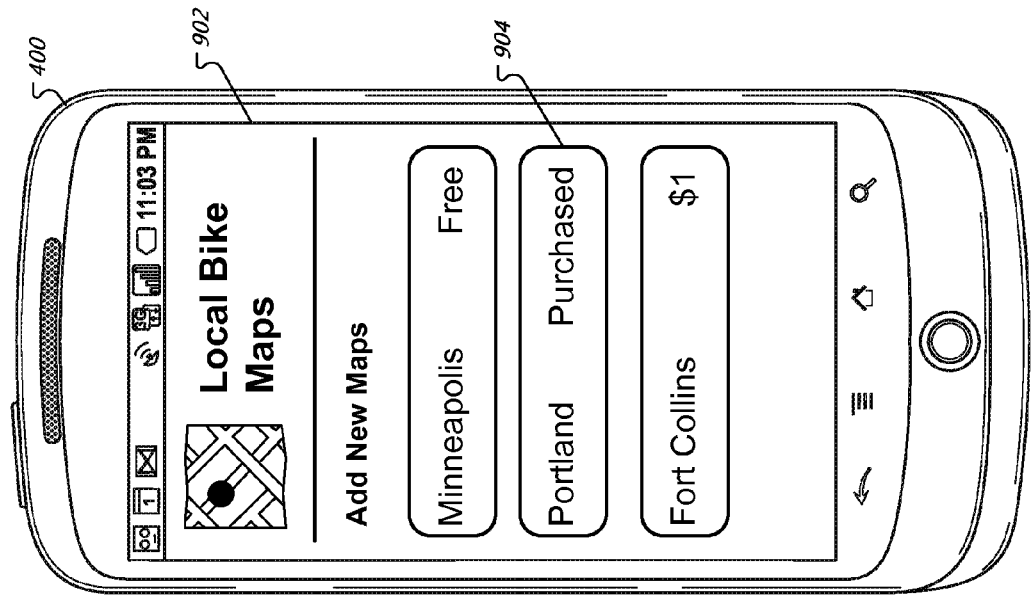

After the computing device 400 receives an indication that that the purchase has been verified, the indications that the purchase is pending, as shown on elements 804 and 806, may be removed from the interface 802, for example, to generate the interface 902 that is shown in FIG. 9. Element 904 in interface 902 indicates that the Portland bike map has been purchased. Specifically, the element 904 changed from the text indication of "$1" to the text indication of "Pending", and to the text indication of "Purchased." The user may cause the computing device 400 to change to an interface that displays the Portland bike map by selecting element 904.

In-App Purchasing System

Figure 10A:
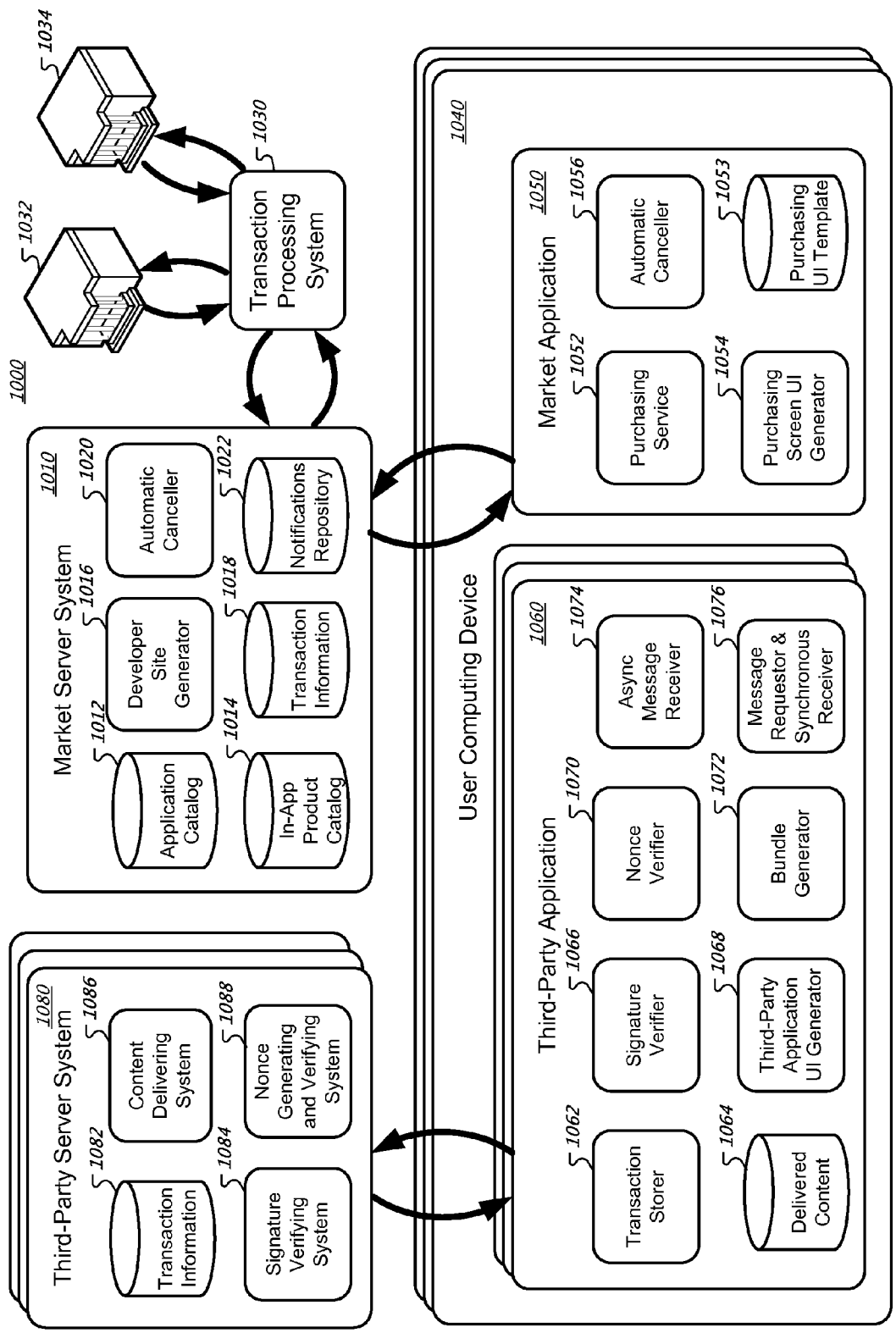
FIG. 10A is a conceptual diagram of an in-app purchasing system.

FIG. 10A is a conceptual diagram of an in-app purchasing system 1000. The system 1000 includes a market server system 1010, multiple user computing devices (e.g., computing device 1040), and multiple third-party server systems (e.g., third-party server system 1080).

The market server system 1010 includes a developer site generator 1016 that manages the distribution platform developer site that is described above with respect to FIGS. 1-3C. The market server system 1010 is further configured to process in-app purchasing requests, as described in greater detail throughout this disclosure. For example, the market server system 1010 may, in response to receiving a request to purchase an in-app product, access the in-app product catalog 1014 to identify details associated with the in-app product (e.g., whether the product exists, a title for the product, a description for the product, and one or more prices for the product).

The market server system 1010 may store details regarding each purchase in the transaction information storage 1018 (e.g., individuals that purchased each product, times at which the products were purchased, and the costs of the products at the purchased times). The automatic canceller 1020 may periodically determine whether a purchasing request should be cancelled. The automatic canceller may request that the automatic canceller 1056 at the market application 1050 measure a delay between the periodic determinations on behalf of the automatic canceller 1020 of the market server system 1010.

Computing device 1040 includes a market application 1050 and multiple third-party applications (e.g., third-party application 1060). Market application 1050 is executed by computing device 1040 and serves as a common interface for in-app purchasing requests by the multiple third-party applications. The market application 1050 also provides a common graphical interface that prompts a user to confirm purchase of in-app products initiated from different third-party applications.

Figure 5:
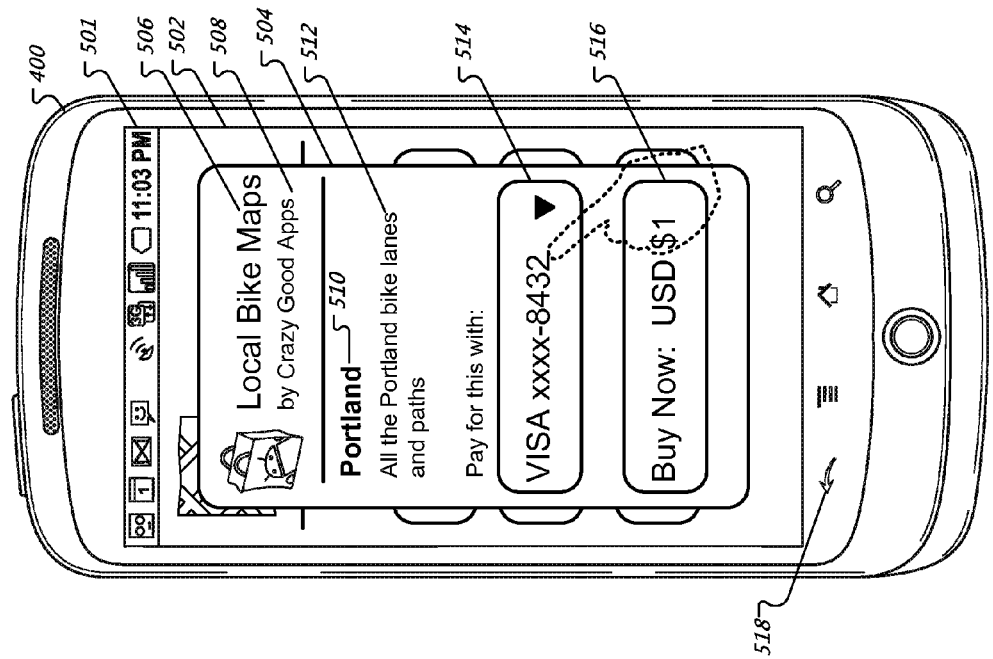

For example, the purchasing screen user interface generator 1054 of the market application 1050 may provide the dialog box 504 of FIGS. 5 and 6. The purchasing screen user interface generator 1054 may access the purchasing user interface template 1053 in order to generate the purchasing screen user interface. The purchasing service 1052 handles the communications of the market application 1050 with the third-party application 1050 and with the market server system 1010. The automatic canceller 1056 institutes a delay at the request of the automatic canceller 1020 at the market server system 1010, at the expiration of which the automatic canceller 1056 prompts the automatic canceller 1020 at the server system to determine whether to cancel the purchasing request. In some examples, market application 1050 is executed by a device that is remote from the computing device 1040.

Third-party application 1060 includes a third-party application user interface generator 1068 that generates a user interface that is specific to the third-party application 1060 and that is defined by instructions at least partially included in the third-party application (e.g., instructions that were downloaded in an installation file for the third-party application 1060 from a distribution platform). For example, third-party application 1060 may provide interfaces 402, 802, and 902 (and may provide the backdrop of interfaces 502, 602, and 702 in examples in which the dialog box 504 does not fill the entire display).

Third-party application 1060 includes various other components for processing in-app purchasing requests. For example, a message requester and synchronous receiver 1076 sends communications to the purchasing service 1052 of the market application 1050, and receive synchronous responses from the purchasing service 1052. The message requester and synchronous receiver 1076 can request that the bundle generator 1072 generate a "bundle" parameter to be included in the communications. The asynchronous message receiver 1074 receives asynchronous responses sent by the purchasing service 1052. The signature verifier 1066 verifies that certain types of messages received from the market application 1050 have been properly signed by the market server system 1010. The nonce verifier 1070 determines whether a response received by the third-party application 1060 to a "GET_PUR-CHASE_INFO" request is an original response that has not been spoofed by a malicious program. The transaction storer 1062 may store indications of which products of the third-party application program 1060 a user of the computing device 1040 has purchased. The delivered content storage 1064 stores the digital products.

Third-party server system 1080 is under the control of an entity that developed and/or published the third-party application 1060, just as other of the third-party server systems are under the control of entities that developed and/or published respective other of the third-party applications. The third-party server system 1080 provides a system for storing and processing information that is remote from the third-party application 1080. Such remote storage and processing of information can be beneficial to perform security-sensitive operations, to persistently store information, and to deliver content (e.g., a purchased digital product) to the third-party application 1060. The components of the third-party server system 1080 that perform these features are described in greater detail throughout this disclosure.

The in-app purchasing system 1000 relieves third-party application programs of many of the burdens of the in-app purchasing process. For example, the third-party application 1060 may not need to be aware of the multiple purchasing instruments with which a user can purchase a product, and may not have stored an indication of the one or more prices for the product. Rather, the third-party application 1060 may provide variations of a single request to the market application 1050, which may handle many of the in-app purchasing steps on behalf of the third-party application 1060. Indeed, the third-party application 1060 may not communicate with the market server system 1000. The protocols that govern the communication between the third-party application and the market application 1050 are discussed in turn.

This disclosure refers primarily to computing device 1040, although the components and functionality described with respect to computing device 1040 apply to other of the multiple computing devices. This disclosure refers primarily to third-party application 1060, although the components and functionality described with respect to third-party application 1060 apply to other of the multiple third-party applications. This disclosure refers primarily to third-party server system 1080, although the components and functionality described with respect to third-party server system 1080 apply to other of the third-party server systems.

Figure 10B:
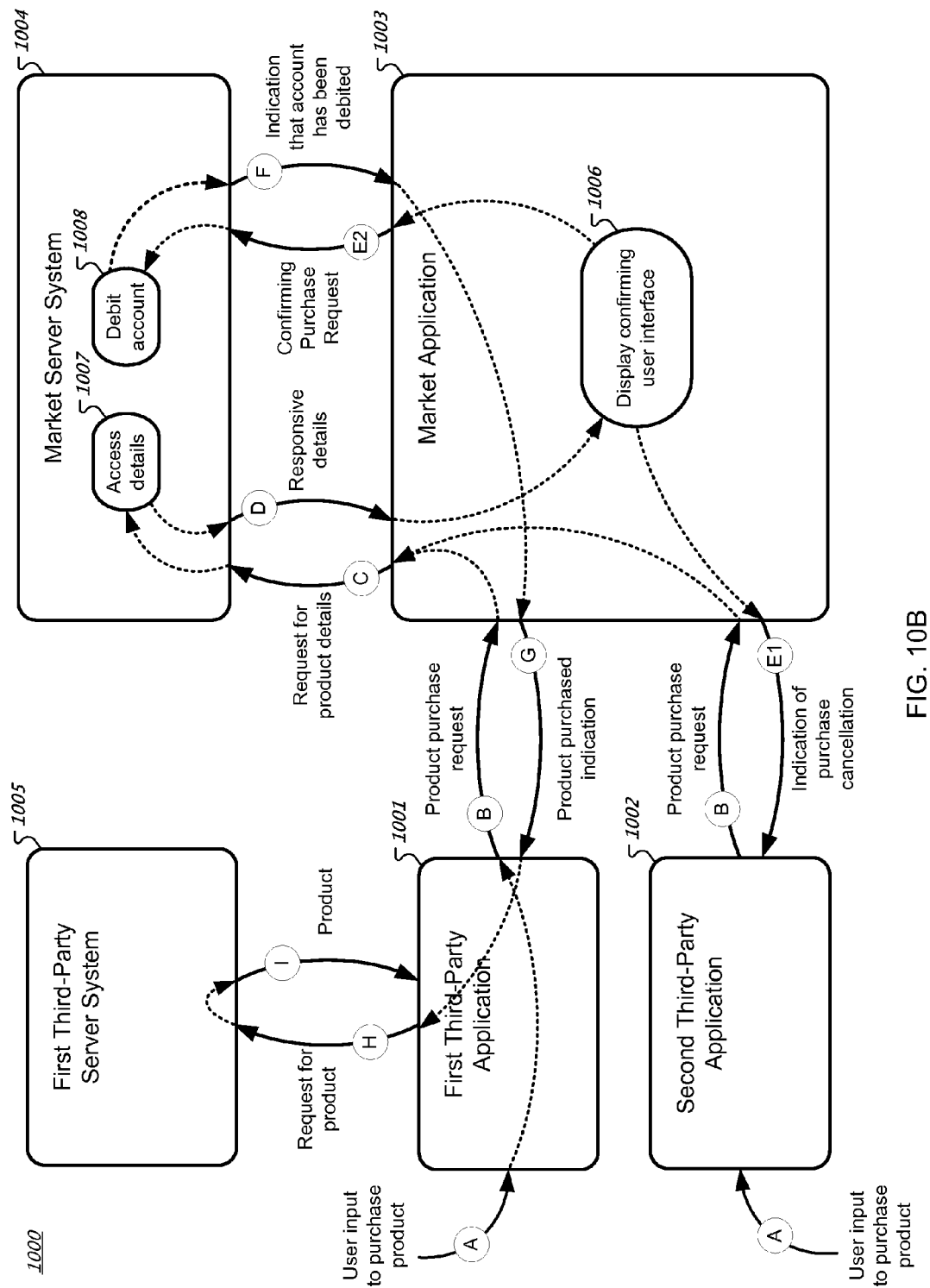
FIG. 10B is a conceptual diagram of an in-app purchasing system.

FIG. 10B is a conceptual diagram of the in-app purchasing system 1000. As described with respect to FIG. 10A, the in-app purchasing system 1000 may include multiple third-party application programs 1001 and 1002 (examples of third-party application program 1060), and a market application 1003 (an example of market application 1050). The system 1000 may also include a market server system 1004 (an example of market server system 1010) and a first third-party server system 1005 (an example of third-party server system 1080). FIG. 10B illustrates a high-level overview of the operations and configuration of the in-app purchasing system 1000. The operation of the various components shown in FIG. 10B is described in additional detail throughout this disclosure, for example, with reference to FIGS. 10A and 12A-12H.

At Transitions A, the third-party applications 1001 and 1002 receive user-input requesting purchase of an in-app product (e.g., as described with reference to box 1202). Transitions A do not need to occur at the same time. At Transitions B, the third-party application programs 1001 and 1002 send a product purchase request to the market application 1003 (e.g., as described with reference to box 1203). At Transition C, the market application 1003 sends a request for product details to the market server system 1004 (e.g., as described with reference to box 1211). The market application 1003 may perform the request of Transition C for each of the Transition B product purchase requests. In other words, the request of Transition C may be performed separately for each Transition B product purchase request. At element 1007, the market server system 1004 accesses the requested details (e.g., as described with reference to boxes 1212, 1213, and 1216). At Transition D, the market server system 1004 sends a response that includes the requested details to the market application 1003 (e.g., as described with reference to box 1216).

At element 1006, the market application 1003 displays a confirming user interface 1006 (e.g., as described with reference to box 1225). Should the user provide input to cancel the purchase, the market application 1003 performs Transition E1 and sends to the third-party application an indication that the purchase has been cancelled (e.g., as described with reference to boxes 1226 and 1227). Should the user provide input to confirm purchase of the product, the market application 1003 performs Transition E2 and sends a confirming purchase request (e.g., as described with reference to box 1226). At element 1008, the market server system 1004 requests that a user's account be debited for the cost of the product, or a cost derived therefrom, for example, a cost that accounts for a coupon or a cost that accounts for taxes and processing charges (e.g., as described with reference to box 1230).

At Transition F, the market server system 1004 sends to the market application 1003 an indication that the user's account has been debited (e.g., as described with reference to box 1243). At Transition G, the market application 1003 sends to the third-party application 1001 an indication that the product has been purchased (e.g., as described with reference to box 1270). At Transition H, the third-party application 1001 requests the product from the first third-party server system 1005 (e.g., as described with reference to box 1287). At Transition I, the first third-party server system 1005 sends the requested product to the first third-party application 1001 (e.g., as described with reference to box 1288).

In additional detail, the market application 1003 may provide a common interface to which multiple third-party application programs are able to send product purchase requests. For example, the market application 1003 may be configured to provide an application program interface with which to receive multiple product purchase requests (Transitions B). The market application 1003 may be configured to request, from the market server system 1004 in response to receiving a particular one of the product purchase requests, particular details regarding a particular product specified by the particular product purchase request. For example, the market application 1003 may be configured to send a request for product details (Transition C) as a result of receiving one of the product purchase requests (Transition B).

The market application 1003 may be configured to send, to the market server system 1004 after the market application 1003 receives a response to the request for the particular details, a confirming product purchase request, the confirming product purchase request causing the market server system 1004 to request that an account of a user of the computerized device be debited for a price that corresponds to a price of the particular product. For example, the market application 1003 may send the confirming purchase request (Transition E2) in response to receiving the responsive details (Transition D), displaying the confirming user interface (as performed at element 1006), and receiving user input confirming purchase of the product (as performed at element 1006).

The market application 1003 may be configured to receive, from the market server system 1004, an indication that the account of the user has been debited for the price that corresponds to the price of the particular product, and, in response, send to the particular third-party application program an indication that the particular product has been purchased. For example, the market application 1003 may receive the indication (Transition F), and as a result may send to the first third-party application 1001 the indication that the product was purchased (Transition G).

The market application program 1003 may be configured to, after sending the confirming product purchase request and before receiving the indication that the account of the user has been debited, receive a second particular one of the product purchase requests, and send, to the market server system 1004, a second confirming product purchase request. For example, the market application 1003 may send the confirming purchase request E2 as a result of a purchase request by the first third-party application 1001, and, while the market server system 1004 is in the process of debiting the user's account (at element 1008), the second third-party application 1002 may send the product purchase request (Transition B), and the market application 1003 may send the resulting request for product details (Transition C). The market application 1003 may be configured so that Transitions B and C resulting from the product purchase request by the second third-party application 1002 may occur before the market server system 1004 sends the indication that the account has been debited (Transition F) and the market application 1003 receives the indication that the account has been debited (Transition F).

The market application 1003 may be configured to display a confirming user interface with which the user is able to provide input to cancel or confirm purchase of a product. The confirming user interface may be a same user interface that is displayed in response to each of multiple product purchase requests, except that the confirming user interface is customized to display one or more features specific to a product being purchased. For example, the market application 1003 may display substantially the same confirming product purchase user interface as a result of product purchase requests from both of the third-party applications 1001 and 1002 and regardless of the product being purchased. The confirming product purchase user interfaces may be generated from a same template, and may be customized using the details that are received from the market server system 1004 (Transition D).

The market application program 1003 may be configured to receive an indication that the user provided input to cancel the particular product purchase request, and, in response, send to a particular one of the third-party application programs an indication that the user cancelled the particular product purchase request. For example, the market application 1003 may be configured to display the confirming user interface (element 1006). Should the user select a button to cancel the purchase, the market application 1003 may be configured to send the indication of purchase cancellation to the second third-party application 1002 (Transition E1).

The market application program 1003 may be configured to receive a product purchase request that does not specify a price of a product or a description of a product (Transition B), and to request one or more of such product details from the market server system 1004 (Transition C). The market server system 1004 may be configured to retrieve such price and description details in response to such a request (element 1007), and send the requested details to the market application 1003 (Transition D). The market application 1003 may display the received one or more prices and the description in the confirming user interface, and may send an indication of a user-selected price to the market server system 1004 (Transition E2).

The first and second third-party application programs 1001 and 1002 may be configured to receive an indication that the user supplied input selecting a first product for purchase, and, in response, send to the market application a first product purchase request that specifies the first product. For example, the third-party application programs 1001 and 1002 may be configured to receive an indication of the user input (Transitions A), and, as a result, send the product purchase requests (Transitions B).

The third-party application programs 1001 and 1002 may not be configured to communicate with the market server system 1004. For example, the third-party application programs 1001 and 1002 may not include code that causes the computing device to be adapted to send to the market server system 1004 a request for the product details. Rather, the third-party applications 1001 and 1002 may transmit the request to the market application 1003, which may send a different request for product details to the market server system 1004 and which may handle subsequent communication with the market server system 1004 on behalf of the third-party application programs 1001 and 1002.

The first third-party application program 1001 may be configured to receive, from the market application 1003, the product purchased indication (Transition G). As a result, the first third-party application 1001 may, from a perspective of a user of the first third-party application 1001, unlock access to the purchased product. The first third-party application 1001 may unlock access to the purchased product by providing the user with access to the first product. The first product may already have been stored at the computing device by the first third-party application program at a time that the first third-party application 1001 sent the first product purchase request. For example, the first third-party application 1001 may include the purchased product (e.g., a game level or an audio file) as a result of an installation of the first-third-party application program 1001. The purchased product may be stored on the computing device prior 1040 prior to a user requesting purchase of the product. The first third-party application 1001 may not provide the user with access to the purchased product, however, until the first third-party application 1001 receives the product purchased indication (Transition G).

In some examples, the first third-party application 1001 may not include the purchased product as a result of an installation of the first third-party application 1001. In such examples, the first third-party application 1001 may retrieve the product from a first third-party server system 1005 by submitting a request for the product (Transition H), and in response receiving the product (Transition I). As discussed in additional detail with reference to box 1287 (FIG. 12G), the first third-party application 1001 may, in some examples, include or have access to the product before the third-party application 1001 requests purchase of the product. In such examples, as a result of receiving the product purchased indication (Transition G), the third-party application 1001 may make the product available for use by a user of the third-party application 1001.

Communication Between Third-Party and Market Applications

The following discussion provides an overview of the protocols that govern communication between each of the third-party application programs (e.g., third-party application program 1060) and the market application program 1050. The protocols are described in additional detail and context with reference to a below-described example in-app purchasing process (see FIGS. 11 and 12A-12H).

Send Purchasing Request Method

In some implementations, the market application 1050 provides each third-party application (e.g., application 1060) with a single method call to the market application 1050. This method call, the "sendPurchasingRequest(bundle)" method call is herein referred to as a "purchasing request." The purchasing request, as shown above, takes a single "bundle" parameter. The bundle parameter includes multiple fields that vary in quantity and type based on the type of purchasing request. The type of the purchasing request is set by one of the fields in the bundle. This "PURCHASING_REQUEST" field can receive a string that is valid for five different values, and thus specifies five different types of purchasing requests. These five types of requests are described in turn.

(1) A "CHECK_PURCHASING_SUPPORTED" request is sent by the third-party application 1060 to verify whether the market application 1050 supports in-app purchasing. The third-party application 1060 can send this request upon launch of the application or before displaying a particular user interface. This request is useful to determine whether to enable or disable certain user interface features that are specific to in-app purchasing. For example, the "Local Bike Maps" application program may not display the Portland and Fort Collins interface elements as a result of a determination that in-app purchasing is not supported.

(2) A "REQUEST_PURCHASE" request is sent by the third-party application 1060 to request purchase of an in-app product. The third-party application 1060 can send this request in response to determining that a user has selected a product for purchase. For example, this request may be transmitted in response user selection of the Portland interface element 406.

(3) A "GET_PURCHASE_INFORMATION" request is sent by the third-party application 1060 to request transaction information from the market server system 1010. This request is transmitted by the third-party application 1060 in response to the third-party application 1060 receiving a notification that transaction information is awaiting retrieval by the third-party application 1060. The transaction information may indicate that a purchase has been successful or has been cancelled, or that a refund has been granted.

(4) A "CONFIRM_NOTIFICATIONS" request is sent by the third-party application 1060 to acknowledge that the third-party application 1060 received transaction information that was sent to the third-party application 1060 in response to the third-party application 1060 submitting the "GET_PURCHASE_INFORMATION" request.

(5) A "RESTORE_TRANSACTIONS" request is sent by the third-party application 1060 to retrieve a user's transaction history. The third-party application 1060 may not, however, receive the user's transaction history in those instances in which the in-app product is not "managed."

Portions of this disclosure discuss a system in which the market application 1050 retrieves, from the market server system 1010, details regarding an in-app product, and does not provide the third-party application 1060 with these details. In some implementations, however, the send PurchasingRequest method supports a "GET_PRODUCT_INFORMATION" type of request. This type of request is sent in implementations in which the market server system 1010 and the market application 1050 cooperate to provide the third-party application 1060 with details regarding the in-app products that are available for use by the third party application 1060.

For example, in response to a user launching the third-party application program 1060, or in response to the user requesting that the third-party application program 1060 navigate to a display that shows in-app products available for purchase using the third-party application program 1060, the third-party application program 1060 may issue a "GET_PRODUCT_INFORMATION" request. The third-party application 1060 may send this request to the market application 1050, which may send the request, or a similar request, for receipt by the market server system 1010.

The market server system 1010 may, in response, retrieve at least some of the details regarding the in-app products that are available for purchase using the third-party application program 1060. The details may include the names of the products, the identifiers for the products, the descriptions of the products, and the prices of the products, for example. The market server system 1010 may send these details for receipt by the market application 1050, which may forward such details for receipt by the third-party application program 1060. The third-party application program 1060 may display the details in a user interface. For example, the third-party application program 1060 may use the details to populate the user interface 402 of FIG. 4. As such, a developer of the Local Bike Maps application program, for example, may not have to send an update for the application program every time the developer adds a new map. Rather, the application program can add user interface elements based details of in-app products received in response to a "GET_PRODUCT_INFORMATION" request.

Bundle Fields

As described above, the sendPurchasingRequest( ) function takes a single bundle parameter, and this bundle parameter can include various different fields, depending on the type of purchasing request.

(1) The "PURCHASING_REQUEST" field, as discussed above, can include a "string" that specifies the type of request. This field may be common to all types of purchasing requests.

(2) An "API_VERSION" field can include an "int" that specifies the version of the application store communication interface that the third-party application 1060 is attempting to access (this field is set to "1" in the examples throughout this disclosure). This field may be common to all types of purchasing requests.

(3) An "APPLICATION_NAME" field can include a "string" that specifies the name of the application that is making the request. This field may be common to all types of purchasing requests.

(4) A "PRODUCT_ID" field can include a "long" that specifies the product ID (also referred to herein as a product identifier) of the product for which the third-party application has requested purchase. This field may be included in "REQUEST_PURCHASE" requests.

(5) A "NONCE" field can include a "long," and may be included in GET_PURCHASE_INFORMATION and RESTORE_TRANSACTIONS requests. The value of the nonce may be unique to each request, is subsequently received by the third-party application 1060 with transaction information, and can be used by the third-party application 1060 to verify the integrity of the transaction information.

(6) A "DEVELOPER_PAYLOAD" field can include a "string" that is specified by the third-party application 1060 for inclusion in a REQUEST_PURCHASE request. This string can send supplemental information with an order, and may be returned with the transaction information. As discussed in greater detail throughout this disclosure, this payload information may be provided not only to the third-party application 1060 on the computing device 1040 that is sending the purchase request, but also to the third-party application 1060 on other computing devices that did not send the request (but that are associated with the computing device 1040 or a user of the computing device 1040).

Further description of these parameters is provided with respect to the example in-app purchasing process (see FIGS. 11 and 12A-12H).

Bundle Maker Function

The "makeRequestBundle( )" function is a helper method that enables a third-party application to submit, in a request to the makeRequestBunle( ) helper method, a string that corresponds to one of the five types of purchasing requests. The method returns a bundle that includes the first three parameters. The third-party application can add additional parameters to the bundle for appropriate requests.

Example code for the makeRequestBundle function is shown below:

```
protected Bundle makeRequestBundle(String method) {
    Bundle request=new Bundle( )
    requestputString(PURCHASING_REQUEST, method);
    request.putInt(API_VERSION, 1);
    request.putString(APPLICATION_NAME, getApplicationName( ));
    return request;
}
```

Response Codes

The market application 1050 is configured to send a synchronous response to the third-party application 1060 in response to each purchasing request sent by the third-party application 1060. The synchronous response includes a bundle that is different than that described above, and that includes at least one field, a "RESPONSE_CODE" field. The synchronous response can provide information that the market application 1050 is able to quickly determine, such as error and status information.

The market application 1050 can also send one or more asynchronous responses to the third-party application 1060 in response to each purchasing request. The use of multiple responses (synchronous and asynchronous) enables the third-party application 1060 to immediately know the status of the request with the synchronous response (and to obtain a code that is used to identify a subsequent asynchronous response), but then to receive further information at a later point in time with the one or more asynchronous responses. The asynchronous nature of the communication enables the market application 1050 to push information to the third-party application 1060 without the third-party application 1060 repeatedly polling the market application 1050, which saves computational and energy resources.

Although asynchronous responses are described in greater detail with reference to the example in-app purchasing process (see FIGS. 11 and 12A-12H), a brief overview is provided in the following paragraphs. Some asynchronous responses may include the RESPONSE_CODE field. The valid values for the RESPONSE_CODE field may vary depending on the synchronous or asynchronous response in which the RESPONSE_CODE field is included. The RESPONSE_CODE field can include various values, as follows.

(1) A "RESULT_OK" value (e.g., "0") can indicate that the request sent by the third-party application 1060 was successfully received (if received in a synchronous response) or that the market application 1050 successfully communicated with the market server system 1010 (if received in an asynchronous response). In the context of a CHECK_PURCHASING_SUPPORTED request, this value can indicate that purchasing is supported.

(2) A "RESULT_USER_CANCELED" value (e.g., "1") may be received in an asynchronous response to a REQUEST_PURCHASE request, and can indicate that the user cancelled the request, for example, by pressing the back button on a checkout interface (e.g., in response to the user selecting the back button 518, as shown in FIG. 5).

(3) A "RESULT_SERVICE UNAVAILABLE" value (e.g., "2") may be received in an asynchronous response and can indicate that market server system 1010 is unavailable, for example, because a network connection is unavailable.

(4) A "RESULT_PURCHASING_UNAVAILABLE" value (e.g., "3") may be received in a synchronous response and can indicate that in-app purchasing is not available because the API_VERSION that was specified in the purchasing request is not recognized by the marketplace application 1050. This value can also specify that the user is ineligible for in-app purchasing, for example, because the user is in a country that is not authorized to provide in-app purchasing.

(5) A "RESULT_PRODUCT_UNAVAILABLE" value (e.g., "4") may be received in an asynchronous response and can indicate that the market server system 1010 cannot find the requested product in the in-app product catalog 1014. This value may be returned to a third-party application 1060 when the product identifier is incorrectly formatted or when a product is listed in the in-app product catalog 1014, but is unpublished.

(6) A "RESULT_DEVELOPER_ERROR" value (e.g., "5") indicates that the third-party application 1060 that is attempting to make a purchasing request has not declared a valid operating system permission in its manifest. This value can also indicate that the third-party application 1060 is not properly signed (e.g., as described with reference to FIGS. 20A-C and at boxes 2048 and 2050), or that the third-party application 1060 sent a malformed request, such as a request with missing bundle parameters or a request that uses an unrecognized request type.

(7) A "RESULT_ERROR" value (e.g., "6") indicates an unexpected server error. For example, this error may be triggered if a developer attempts to purchase a product from itself, which may not be allowed by the transaction processing system.

Example In-App Purchasing Process

Figure 11:
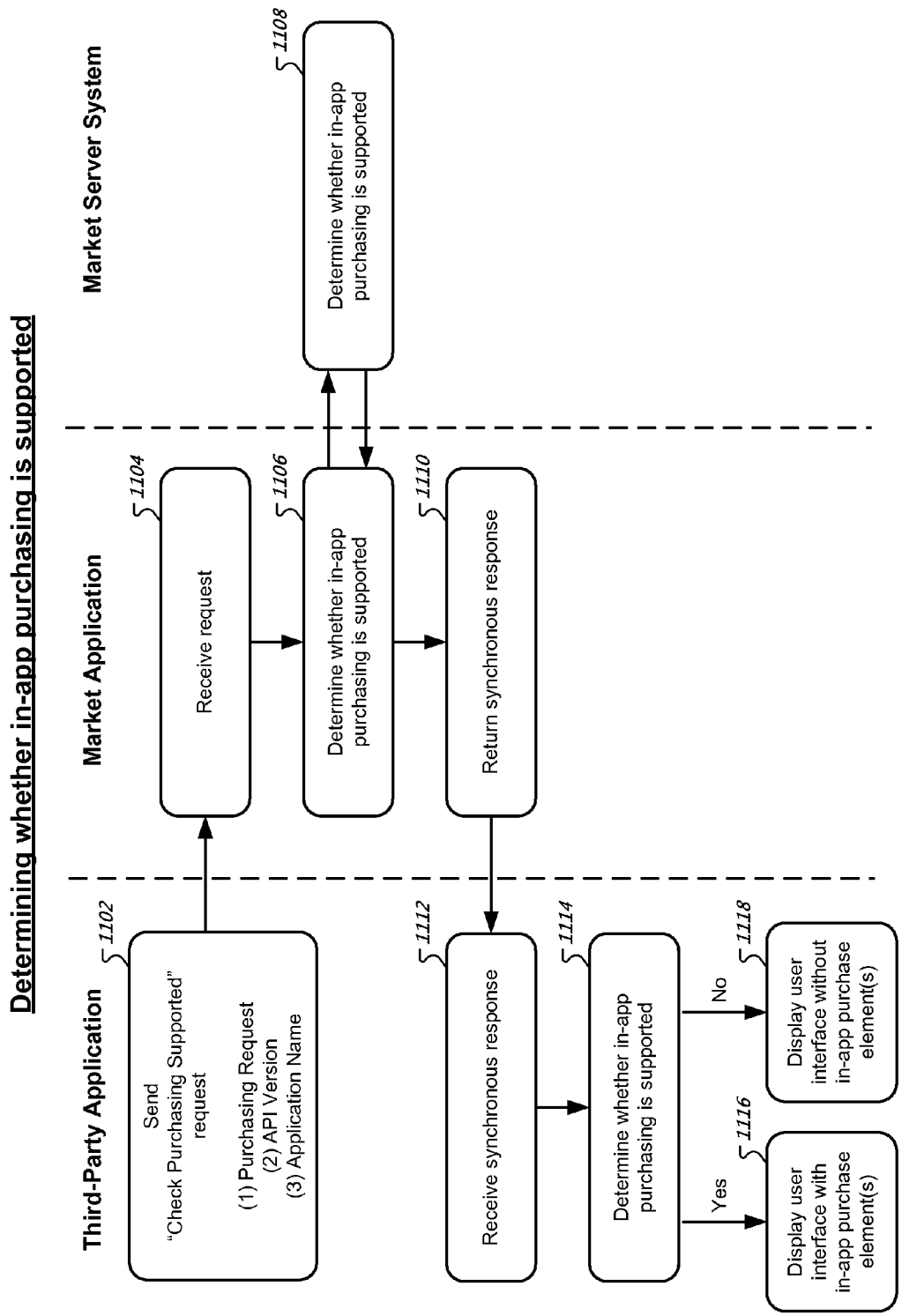
FIG. 11 shows a diagram of a process for determining whether in-app purchasing is supported.

FIG. 11 shows a diagram of a process for determining whether in-app purchasing is supported. As mentioned above, a third-party application 1060 can send a CHECK_PURCHASING_SUPPORTED request to verify whether the market application 1050 supports in-app purchasing. As a result, the third-party application 1060 may receive a synchronous response that indicates to the third-party application 1060 whether the market application 1050 supports in-app purchasing.

At box 1102, the third-party application 1060 sends a CHECK_PURCHASING_SUPPORTED request. For example, the message requestor and synchronous receiver 1076 of the third-party application 1060 may include code that, when executed by one or more processors, requests that the bundle generator 1072 generate a bundle. The bundle generator 1072 may call the helper function makeRequestBundle(CHECK_PURCHASING_SUPPORTED). As described above, this function may generate a bundle that includes the three required parameters, the PURCHASING_REQUEST parameter (specified as "CHECK_PURCHASING_SUPPORTED"), the API_VERSION parameter (specified as "1" in this example), and the APPLICATION_NAME parameter (identified as the name of the requesting application program). The CHECK_PURCHASING_SUPPORTED request may not include other parameters. Accordingly, the message requestor 1076 may call the function sendPurchasingRequest(bundle) in order to send a request to the market application 1050.

At box 1104, the market application 1050, executing on the same computing device 1040 as the third-party application 1060, receives the request from the third-party application 1060. Specifically, the purchasing service component 1052 receives the request.

At box 1106, as a result of receiving the request, the purchasing service 1052 performs operations to determine whether in-app purchasing is supported. In some examples, the computing device 1040 includes metadata that identifies whether in-app purchasing is supported, either based on a value of the metadata or on presence of the metadata. In such examples, the purchasing service 1052 may identify whether such metadata indicates that in-app purchasing is supported or is not supported.

In some examples, determining whether in-app purchasing is supported involves the purchasing service 1052 requesting that the market server system 1010 determine whether in-app purchasing is supported. In such examples, the market server system 1010 (at box 1108) determines whether in-app purchasing is supported, for example, by identifying whether in-app purchasing is restricted from use in a country in which the computing device 1040 is located. In some examples, the market application 1050 may not contact the market server system 1010 to determine whether in-app purchasing is supported.

At box 1110, the purchasing service 1052 returns a synchronous response to the third-party application. The synchronous response includes a bundle having a single parameter, the RESPONSE_CODE parameter, which can take four values in response to a CHECK_PURCHASING_SUPPORTED request: RESULT_OK; RESULT_PURCHASING_UNAVAILABLE; RESULT_ERROR; and RESULT_DEVELOPER_ERROR. The RESULT_OK value may indicate that in-app purchasing in supported. The other values are described in greater detail above. The CHECK_PURCHASING_SUPPORTED request from the third-party application 1060 may not trigger any asynchronous responses.

At box 1112, the third-party application 1060 receives the synchronous response. Although not repeatedly mentioned throughout this disclosure, the message requestor and synchronous receiver 1076 is the component of the third-party application 1060 that receives the synchronous response and sends every sendPurchasingRequest( )

At box 1114, the third-party application 1060 determines whether in-app purchasing is supported. For example, the third-party application 1060 can parse the bundle received with the synchronous response to determine whether the RESPONSE_CODE field includes the RESULT_OK value. If the field includes the RESULT_OK value, the third-party application 1060 may perform the operations of box 1116. If the field does not include the RESULT_OK value, the third-party application 1060 may perform the operations of box 1118.

At box 1116, the third-party application 1060 displays a user interface with in-app purchase elements. For example, the third-party application user interface generator 1068 may request that the computing device 1040 display user interface elements that enable a user to initiate purchase of in-app products (e.g., elements 406 and 408 in FIG. 4). While such a user interface may be controlled by the third-party user interface generator 1068, this disclosure generally refers to such operations as being performed by the third-party application 1060 because the operations are being performed at the request of the third-party application 1060.

At box 1118, the third-party application 1060 displays a user interface without in-app purchase elements at all, or with the in-app purchase elements but in which the in-app purchase elements are disabled. For example, the third-party application 1060 may not request that the computing device 1040 display user interface elements that enable purchase of in-app products, or may display such interface elements but disable their activation of a purchasing request when selected (e.g., elements 406 and 408 may either not appear for display in user interface 402 or may not cause the dialog box 504 to appear when selected).

FIGS. 12A-H show a diagram of a process for requesting an in-app purchase.

At box 1201, the third-party application 1060 displays a user interface that includes one or more in-app purchase elements. Box 1201 may provide the same operations as box 1116, and is repeated in FIG. 12A for clarity.

At box 1202, the third-party application 1060 identifies user selection of an interface element that is associated with a command for initiating purchase of an in-app product. For example, the third-party application 1060 may identify that a user touched his finger to a region of a display that corresponded to display of the interface element 406 to initiate purchase of the Portland bike map.

At box 1203, as a result of identifying the user selection, the third-party application 1060 sends a "REQUEST_PURCHASE" request for receipt by the market application 1050. Sending the request can include multiple operations. For example, the third-party application 1060 may first generate a bundle for inclusion in the request. As illustrated in the figure, the request includes a purchasing request parameter, an API version parameter, an application name parameter, a product identifier parameter, and an optional payload parameter.

Third-party application 1060 may generate the bundle by calling the bundle generator 1072. The bundle generator 1072 calls the method makeRequestBundle(REQUEST_PURCHASE), as described above. The bundle generator 1072 may further add to the bundle (i) the product identifier for the in-app product that the user has requested to purchase, and (ii) a developer payload. The developer payload may be an optional field, and the market application 1050 may properly process the request whether or not the bundle in the request includes the developer payload parameter.

The developer payload is a string that is transmitted back to the third-party application 1060 along with the transmission of any transaction information, as described later in this disclosure. Moreover, the developer payload can be transmitted to other devices associated with the computing device 1040 or a user of computing device 1040. As such, the developer may configure the third-party application 1060 so that the payload transfers additional data concerning the purchase. The developer payload is described with greater detail throughout this disclosure.

After the bundle has been generated, the third-party application 1060 sends the request for receipt by the market application 1050. The following is example code for generating a bundle for a Request Purchase request, and for calling the send PurchasingRequest( )method:

Bundle request=makeRequestBundle("REQUEST_PUR-CHASE");
request.putString(PRODUCT_ID, mProductId);
if (mDeveloperPayload !=null) {
   request.putString(DEVELOPER_PAYLOAD, mDeveloperPayload);
}
Bundle response=mService.sendPurchasingRequest(request);

At box 1204, the market application 1050 receives the request. As a result of receiving the request, the market application 1050 is configured to respond to the third-party application 1060 with a single synchronous response and two asynchronous responses. Although not described repeatedly though this disclosure, the purchasing service 1052 performs the bulk of operations described as being performed by the market application 1050, except for those designated as being performed by the purchasing screen user interface generator 1054 or the automatic canceller 1056.

At box 1205, the market application 1050 processes the request, for example, by checking status information such as whether the request was correctly formed, and whether the market application supports the API version listed in the request.

At box 1208, if the request is properly formed and the market application supports the API version, the market application 1050 generates a bundle that includes a response code parameter, a request identifier parameter, and a pending intent parameter, and sends the bundle to the third-party application 1060 in a synchronous response. The response code parameter, for a properly formatted result, may specify the value "RESULT_OK." The request identifier parameter can include a request identifier that the market application 1050 generated to identify the particular request. The market application 1050 can store the request identifier for transmission in a subsequent asynchronous response. Using the request identifier, the third-party application program 1060 may be able to link an asynchronous response to a synchronous response, and thus a same purchasing request.

The pending intent parameter can include a pending intent or specify a reference to the pending intent. A pending intent is an identifier for an activity that can be performed by the market application 1050. In this example, the activity is generation of a checkout user interface (e.g., dialog box 504). By transferring the pending intent to the third-party application 1060, the market application 1050 grants the third-party application 1060 the right to launch the activity.

At box 1209, the third-party application 1060 receives the synchronous response. The third-party application 1060 analyzes the response code to determine that the response code was RESULT_OK, stores the request identifier in association with information identifying the particular request, and extracts the pending intent.

At box 1210, the third-party application 1060 uses the pending intent to launch the checkout user interface. As a result of the third-party application 1060 launching the checkout user interface, the dialog box 504 may appear in the user interface. In some examples, the market application 1050 provides the synchronous response without the pending intent and, rather, the market application 1050 directly launches the checkout user interface.

Example code for launching the pending intent is shown below:

```
void startBuyPageActivity(PendingIntent pendingIntent, Intent intent) {
if (mStartIntentSender != null) {
  // This is with operating systems that permit the in-app
  // checkout page activity to be on the stack of the application.
  try {
    mStartIntentSenderArgs[0] = pendingIntent.getIntentSender();
    mStartIntentSenderArgs[1] = intent;
    mStartIntentSenderArgs[2] = Integer.valueOf(0);
    mStartIntentSenderArgs[3] = Integer.valueOf(0);
    mStartIntentSenderArgs[4] = Integer.valueOf(0);
    mStartIntentSender.invoke(mActivity, mStartIntentSenderArgs);
  }catch (Exception e) {
Log.e(TAG, "error starting activity", e);
}
} else {
  // This is with operating systems that do not permit the in-app checkout
  // page activity to be on the stack of the application. The in-app checkout
  // page activity will be on its own separate activity stack.
try {
   pendingIntent.send(mActivity, 0 /* code */, intent);
} catch (CanceledException e) {
   Log.e(TAG, "error starting activity", e);
}
}
}
```

At box 1211, the market application 1050 receives an indication that the third-party application 1060 has requested that the checkout user interface launch and, in response, requests that the purchasing screen user interface generator 1054 generate the checkout user interface. As a first step, the purchasing screen user interface generator 1054 requests details regarding the purchase of the in-app product from the market server system 1010. The details may be used to customize the display of the checkout user interface. For example, the market application 1050 accesses the application name and product identifier that were received with the purchasing request, and provides these values and an indication of the requesting user to the market server system 1010 in a request for the details. The indication of the requesting user may be an indication of the computing device 1040 or an indication of a user account for the distribution platform for which a user of the computing device 1040 provided valid credentials. As described with reference to FIGS. 20A-C, the request for details may include an identity certificate for the third-party application program.

At box 1212, the market server system 1010 identifies the details for the in-app product that the user is considering to purchase. For example, the market server system 1010 may access the in-app product catalog 1014. Using the application name and product ID as an index, the market server system 1010 can access information that is assigned to the in-app product. The accessed information may include the information specified by the developer using the distribution platform developer site, as shown in FIGS. 1-3C. This information can include, for example, the title of the product, the description of the product, and the price of the product in one or more currencies. This information can be at least temporarily stored by the market server system 1010. The server system may, before identifying the details for the in-app product, determine whether the received identity certificate matches an identity certificate that the server system had previously stored for the third-party application program, as described with additional reference in FIGS. 20A-C.

At box 1213, the market server system 1010 sends purchasing information to the transaction processing system 1030.

The purchasing information can include an indication of the user, the product identifier, and a price that would be debited from the user's account if the purchase is confirmed.

At box 1214, the transaction processing system 1030 receives the purchasing information. The transaction processing system 1030 can use the indication of the user to identify purchasing instruments that are associated with the user.

The transaction system 1214 may be a system that is configured to charge individuals for purchases using financial instruments. Example purchasing instruments include credit cards, debit cards, carrier billing (e.g., with carrier billing, an entity providing wireless connectivity to the mobile computing device can include the cost of purchases in a bill to a user of the mobile device for availability or use of the wireless connectivity), and e-commerce payment accounts. Entities 1032 and 1034 may be banks or credit card processing centers with which the transaction processing system 1030 communicates to debit an account associated with a particular financial instrument. Entities 1032 and 1034 can credit an account of the transaction processing system 1030 with the debited amount (potentially with a processing charge subtracted from the debited amount).

The user may previously have provided user input that associates one or more purchasing instruments with the transaction processing system 1030. For example, the user may supply credentials for the user's account with the distribution platform to log into a web site for the transaction processing system 1030. Once logged in, the user may supply the web site with the user's credit card information, for example, by typing in the user's credit card numbers. The transaction processing system 1030 can validate the entered information through communication with one or more of the entities 1032 and 1034.

At box 1215, the transaction processing system 1030 creates a transaction entity. The transaction entity may be a data structure that is generated to track a particular purchase of an in-app product. As such, at a later time the market server system 1010 may reference the transaction entity to request that the transaction processing system 1030 proceed with or cancel the transaction. Also, the transaction processing system 1030 provides, to the market server system 1010, an indication of the transaction entity and indications of the identified financial instruments. An example indication of a financial instrument is an indication that the instrument is a VISA card and along with an indication of the last four digits of the credit card number, without providing the full credit card number.

At box 1216, the market server system 1010 receives the indication of the transaction entity and the indications of the purchasing instruments. The market server system 1010 stores the transaction entity and forwards, to the market application 1050, the indications of the purchasing instruments and the in-app product details (e.g., title, description, and price, as identified at box 1212). The market server system 1010 may, alternatively, send to the market application 1050 an indication of an error, for example, that the market server system 1010 could not communicate with the transaction processing system 1030, that the requested in-app product is unavailable, or that the identity certificate received in the request for product details did not match the identity certificate stored for the third-party application program.

At box 1217, the market application 1050 determines whether to send a negative asynchronous response code. For example, the market application 1050 may determine to send a negative asynchronous response code as a result of the market application 1050 receiving from the market server system 1010 an indication of an error. On the other hand, the market application 1050 may perform the operations of box 1225 and continue with normal processing as a result of receiving data from the market server system 1010 that is not indicative of an error.

At box 1225, the market application 1050 displays the checkout user interface, for example, the dialog box 504 that is shown in FIG. 5. The purchasing screen user interface generator 1054 may generate the checkout user interface using a template display, and may fill in particular fields or portions of the template display with information received from the market server system 1010. As an illustration, and with reference to FIG. 5, the application name 506, the name of the developer 508, the product title 510, the product description 512, the purchasing instrument 514, and the price 516 may be specified by information received from the market server system 1010 and may not be a part of the template. The third-party application 1060 may not store this information or send indications of such information in the purchasing request.

At box 1226, the market application 1050 determines whether the user confirmed purchase of the in-app product. For example, should the user select the "back" interface element 518 or another interface element for cancelling the transaction (not shown in the figures), the market application 1050 may immediately perform the operations of box 1227 (e.g., without sending the request to the market server system 1010 for performance of the operations at box 1228). Should the user select a user interface element to confirm the purchase (e.g., the "Buy" interface element 516), the market application 1050 may send a purchasing request to the market server system 1010. The purchasing request may indicate the financial instrument that the user selected. The purchasing request may include the developer payload.

At box 1228, the market server system 1228 receives the purchasing request, triggering two asynchronous responses: (i) a "Response_Code" asynchronous response, and (ii) an "In_App_Notification" asynchronous response. The "Response_Code" asynchronous response is illustrated by transition 1229 and can provide status and error information about the request.

At box 1227, the market application 1050 sends to the third-party application 1060 a "Response_Code" asynchronous response. The response can include a bundle with a RESPONSE_CODE parameter and a Request Identifier. The RESPONSE_CODE parameter can take the values RESULT_OK, RESULT_ERROR, and RESULT_DEVELOPER_ERROR, depending on whether the market application determined to send a negative asynchronous response (box 1217), received an indication that a user cancelled the purchase (box 1226), or received status information from the market server system (box 1228). The market application 1050 may send a single response code asynchronous response to the third-party application 1060, even though different triggers for the response have been described and are graphically illustrated as arrows directed at box 1227 in FIG. 12C.

At box 1242, the market application 1050 temporarily displays, in those instances in which the purchase is pending and has not been cancelled due to user action or an error, a user interface element that indicates to the user that the transaction is pending. For example, the market application 1050 may request that the computing device 1040 display the dialog box 704 for a determined period of time (e.g., 30 seconds). Should the market application 1050 receive, from the market server system 1010, an indication that the product has been purchased, the market application 1050 may remove the dialog box 704 before expiration of the determined period of time. For example, the third-party application 1060 may (at box

1284, discussed hereinafter) send to the market application 1050 an indication that the product has been purchased. As a result, the market application 1050 may, if the dialog box 704 is still being displayed, remove the dialog box 704 from the display.

At box 1233, the third-party application 1060 receives the asynchronous response and, from the value of the response code, determines whether the purchase is pending or has been cancelled (e.g., due to user action or an error).

At box 1239, as a result of determining that the purchase has been cancelled, the third-party application 1060 requests display of a user interface element that indicates that the purchase has been cancelled. For example, the third-party application may request the display of an element that states "cancelled" (not shown in the figures).

At box 1240, as a result of determining that the purchase is pending, the third-party application 1060 requests display of a user interface element that indicates that the purchase is pending. For example, as an alternative to the pending element that is provided by the market application 1050 (at box 1242), or upon the pending element that is provided by the market application 1050 being removed from the display, the third-party application 1060 may display interface element 804 and/or element 806.

At box 1241, the third-party application program 1060 resumes operation. The third-party application 1060 may not poll the market application 1050 or the market server system 1010 for the status of the purchasing request. Rather, the third-party application 1060 may await an asynchronous in-app notification to perform any additional actions related to the purchasing request. As such, a user of the third-party application may be able to use the application, and may be able to initiate purchase of additional in-app products (e.g., by selecting the "Fort Collins" interface element 408).

Resuming the discussion of the server-side processing of a purchasing request, at box 1230, the market server system 1010 has received the purchasing request from the market application 1050 and sends a request to the transaction processing system 1030 to debit an account associated with a purchasing instrument of the user. This request may be referred to herein as a "charge request." The charge request may include the indication of the transaction entity (stored at box 1216) and an indication of the purchasing instrument that the user has selected. The charge request may also include the price that is associated with the product and that is for a currency assigned to the purchasing instrument. In some examples, such price may have been previously transmitted to the transaction processing system 1030.

At box 1231, the transaction processing system 1030 receives the charge request and attempts to complete the transaction. The transaction processing system 1030 may do so by sending a debiting request to a system administered by the entity that issued the selected purchasing instrument (e.g., one of entities 1032 and 1034).

Sending the charge request and processing the charge request may involve additional actions beyond those described with respect to boxes 1230 and 1231. These additional actions (which can include actions performed by the market application 1050 on the user computing device 1040) are described with additional detail with reference to FIGS. 18 and 19. Accordingly, operations described with reference to FIGS. 18 and 19 may supplant the actions shown within box 1232.

At box 1243, the transaction processing system 1030 sends to the market server system 1010 an indication that the purchase has either succeeded or has failed.

At box 1244, the market server system 1010 receives the indication and determines devices to notify about the transaction. For example, the computing device 1040 may have sent the purchasing request to the market server system 1010 at the request of a user, but an indication of the success or failure of the transaction may be transmitted to multiple devices that are associated with the user. For example, the market server system 1010 may identify, in a table or database, a listing of devices that are associated with an account of the user. Such devices can include one or more telephones, tablet computers, netbooks, laptops, desktops, television computers, vehicle-based computers, and other appliance-based computers.

At box 1245, the market server system 1010 generates a notification identifier that identifies transaction information for the purchase, and adds the notification identifier to the notifications repository 1022. The transaction information that is associated with the notification identifier is described in greater detail below with reference to description of a JSON string. Still, the transaction information can generally include an orderID, a name of the application that requested the purchase, the identifier of the product that was purchased, the developer payload, and the purchase time.

The notifications repository 1022 can include notifications for other transactions associated with the account of the user, for example, if the computing device 1040 or other computing devices have yet to acknowledge receipt of the other transactions. The notifications stored in the notifications repository 1022 can each have the following fields. (1) Notification identifier. (2) Status: The status can be Pending, Received, or Expired (e.g., after 15 days without an acknowledgment). (3) Data: The data can include the indication whether the purchase has either succeeded or has failed. (4) List of Devices: A list of the devices determined, for example, at box 1244. (5) List of Acknowledging Devices: Devices may be removed from the list of devices and added to the list of acknowledging devices when a notification is acknowledged by a particular device. (6) Last Sent Timestamp: This timestamp is used to determine an exponential backoff for repeated notifications. (7) Created Timestamp This timestamp is used to determine ultimate expiry of the notification. (8) Number of Attempts: The current number of attempts to send the notification. (9) Ready To Send: True if the notification is ready for sending.

At this stage, the market server system 1010 may send, to each of the devices, a notification of the event that has occurred at the server system. Each device that receives the notification may process the notification in the same manner, regardless of whether the device was the device that initiated the purchase. Similarly, the market server system 1010 may handle an exchange of information with each device separately. Thus, it is possible that the purchasing device may not receive the transaction information first, for example, if the purchasing device is temporarily disconnected from a network. These operations are described in greater detail below. This disclosure continues with a description of the operations performed by and with respect to individual ones of the identified devices (e.g., computing device 1040), although all of the identified devices may operate in a similar manner.

At box 1246, the market server system 1010 sends to the market application 1050 an asynchronous "In app notification" response (also referred to herein as an "in app notify response," "notification response," or "notification"). The notification response can include an array of notification identifiers, for example, those notification identifiers from the notifications repository 1022 that the computing device 1040 has yet to acknowledge.

The notification response may not include the substantive transaction information (e.g., whether the purchase succeeded or was cancelled). In other words, the notification response may not identify which state the purchase request is in (e.g., whether it succeeded, was canceled, or was refunded). Rather, the notification response may serve to inform the third-party application 1060 that a change in purchasing state has occurred. The notification response itself may not be secured. For example, the notification request may not include a nonce or be signed. As such, the notification response can serve to essentially "wake up" the third-party application 1060 or inform the third-party application 1060 that transaction information is ready.

At box 1247, the market server system 1010 continues to identify whether the notifications repository 1022 includes notification identifiers for the computing device 1040 and, if so performs the operations of box 1246. The market server system 1010 may institute a delay between each sending of a notification response (e.g., an exponential backoff). As described throughout this disclosure, a device may be moved from the list of devices field to the list of acknowledged devices field as a result of the market server system 1010 receiving an acknowledgment from the computing device 1040.

At box 1248, the market application 1050 receives the notification response from the market server system 1010. The notification response from the market server system 1010 may identify the application program from which the in-app product was purchased. Accordingly, the market application 1050 may determine whether the identified application is installed on the computing device 1040. If so, the market application 1050 may perform the operations of box 1249. If not, the market application 1050 may send an indication to the market server system 1010 to remove, for the notification identifier in the notification repository, the computing device 1040 from the list of devices field.

At box 1249, the market application 1050 sends the in-app notification response to the third-party application 1060. The notification response may include the one or more notification identifiers sent from the market server system 1010 to the market application 1050.

At box 1250, the third-party application 1060 receives the notification response and prepares a "GET_PURCHASE_INFORMATION" request for transmission to the market application 1050. The request will be secured and will have a nonce, as discussed below.

At box 1250, as a first stage in sending the Get Purchase Information request, the third-party application 1060 requests generation of a nonce. A nonce (number used once) is a cryptographically secure number. The nonce is returned with the asynchronous response to the Get Purchase Information request and, as such, enables the third-party application to verify that the response corresponds to a request that the third-party application made (and is not a response that was spoofed by a malicious user). The nonce may be valid for a single response. The nonce can be generated by the third-party application 1060, or the third-party application 1060 can request that the nonce generating and verifying system 1088 at the third-party server system 1080 generates the nonce.

The following is example code for generating a nonce:
private static final SecureRandom RANDOM=new SecureRandom( )
private static HashSet<Long>sKnownNonces=new HashSet<Long>( )
public static long generateNonce( ){
   long nonce=RANDOM.nextLong( )
   sKnownNonces.add(nonce);
   return nonce;
}
public static void removeNonce(long nonce) {
   sKnownNonces.remove(nonce);
   }
public static boolean is NonceKnown(long nonce) {
   return sKnownNonces.contains(nonce);
}

At box 1255, the third-party application generates a "Get Purchase Info" request. Generating the request includes creating a bundle that includes the three typical fields (Purchasing Request, API Version, and Application Name), along with a field that includes the generated nonce and a field that includes the received array of one or more notification identifiers.

The following is example code for generating and sending the response:
Bundle request=makeRequestBundle("GET_PURCHASE_INFORMATION");
request.putLong(REQUEST_NONCE, mNonce);
request.putStringArray(NOTIFY_IDS, mNotifyIds);
Bundle response=mService.sendPurchasingRequest(request);

At box 1256, the third-party application 1060 sends the Get Purchase Info request for receipt by the market application 1050 (e.g., in a sendPurchasingRequest( ) method call).

At box 1257, the market application 1050 receives the request and, if the request is properly formed and there are no errors, sends a synchronous response (at box 1258) for receipt by the third-party application (at box 1259). The market application 1050 also sends the Get Purchase Info request, or a derivation thereof, to the market server system 1010.

At box 1260, the market server system receives the request.

At box 1264, if the request is properly formed and there are no errors, the market server system 1010 sends an asynchronous response code response to the market application 1050. As described above, the asynchronous bundle includes two parameters, a response code parameter and a request identifier parameter. The response code can take the values RESULT_OK, RESULT_ERROR, and RESULT_DEVELOPER_ERROR. The request identifier can enable the third-party application 1060 to link the asynchronous response to the synchronous response, and thus the Get Purchase Info request.

At box 1265, the market application 1050 receives the asynchronous response and forwards the response to the third-party application 1060.

At box 1266, the third-party application 1060 receives the response.

At box 1267, the market server system 1010 identifies, from the notifications repository 1022, transaction information that is associated with the one or more notification identifiers.

At box 1268, the market server system 1010 generates a response. In addition to the identified transaction information, the response may include the nonce that was received with the Get Purchase Info request. The response may also be signed so that the third-party application can verify the integrity of the response.

At box 1269, the market server system 1010 sends a "PURCHASE_STATE_CHANGED" asynchronous response for receipt by the market application 1050.

At box 1270, the market application 1050 receives the response and sends the asynchronous Purchase State Changed response to the third-party application 1060.

At box 1271, the third-party application 1271 receives the response. The response may include a data string and a signature string. The data string may be a JSON string that contains information about the purchasing transaction such as order number, price, and the product that was purchased or refunded. The signature string represents the signature of the JSON string. In other words, a JSON string is signed and the signature (also called an identity certificate) is sent to the third-party application 1060 along with the JSON string. The JSON string may be unencrypted.

The JSON string may include multiple fields, as defined below:

(1) Nonce: A number that is used once, and that was sent in the GET_PURCHASE_INFORMATION request. The market server system 1010 sends the nonce back as part of the JSON string so that the third-party application 1060 can verify the integrity of the message as being the first response to the Get Purchase Information Request.

(2) NotificationId: An array of one or more unique identifiers that were received in the in app notify asynchronous response and sent in the Get Purchase Info request.

(3) orderID: A unique order identifier for the transaction. This unique identifier may be an identifier for the transaction entity.

(4) ApplicationName: The name of the application from which the purchase originated.

(5) productId: The purchased product's identifier.

(6) purchaseTime: The time that the product was purchased, for example, in milliseconds since an epoch (e.g., Jan. 1, 1970).

(7) purchaseState: The purchase state of the order. Possible values can include "0" (purchased), "1" (canceled), or "2" (refunded).

(8) developerPayload: A optional developer-specified string that contains supplemental information about an order. The computing device 1040 may have specified this string in the Request Purchase request.

An example JSON string is shown below:
{"nonce": 18365350321377741465,
"orders":
    {"notificationId": "android.test.purchased",
    "orderId": "transactionId.android.test.purchased",
    "applicationName": "com.example.dungeons",
    "productId": "android.test.purchased",
    "developerPayload":
    "bGoa+V7g/yqDXvKRqq+JTFn4uQZbPiQJo4pf9RzJ",
    "purchaseTime": 1290114783411,
    "purchaseState": 0}
}

At box 1272, the third-party application 1060 beings the process for verifying the integrity of the response by requesting that the nonce verifier 1070 verify the nonce 1272. The nonce verifier 1070 may have stored the nonce locally on computing device 1040 or, for additional security, may send the received nonce to the third-party server system 1080 for remote verification of the nonce by the nonce generating and verifying system 1088 (at box 1273). The use of nonces can prevent the spoofing of messages. A message that includes a nonce may be valid only if the message is the first response that includes the nonce.

At box 1280, the signature verifier 1066 verifies the signature, for example, the signature of the example JSON string described above. The signature verification may be performed by the signature verifying system 1084 on the third-party server system 1080 (at box 1281) and not on the computing device 1040. Performing the verification process on a server can make it difficult for malicious users to break the verification process by reverse engineering the application installation file.

The third-party application 1060 (or its third-party server system 1080) can verify the signed response using the public key portion of an RSA key pair provided to the developer in a web page generated by the developer site generator 1016. The use of a signature can help detect responses that have been tampered with.

At box 1282, the third-party application 1060 determines whether the nonce and the signature are correct, for example, to determine whether the received information is authentic. The signature may include a hash value generated from the JSON string.

At box 1283, as a result of determining that the received information is not authentic, the third-party application 1060 may terminate this iteration of the process, and may await another in app notification message (e.g., as discussed at box 1250).

At box 1284, as a result of determining that the received information is authentic, the third-party application 1060 may clear the "Pending" element. For example, the third-party application 1060 may remove pending element 806, and may change element 804 from "Pending" to "Loaded" (as shown by element 904). The third-party application 1060 may send to the market application 1050 an indication that the product has been purchased. As a result, if the dialog box 704 is still being displayed, the market application 1050 may request that the dialog box 704 be removed from the display.

At box 1285, the transaction storer 1062 stores the transaction information. For example, the transaction storer 1062 may store an indication that a particular product has been purchased. In some examples, the transaction storer 1062 requests that the third-party server system 1080 store the transaction information in transaction information storage 1082. Remote storage enables the information to be easily recovered if the third-party application 1060 has to be reinstalled.

At box 1287, the third-party application 1060 retrieves the purchased content. In various examples, the market server system 1010 does not provide digital content for receipt by the third-party application 1060. Rather, the market server system 1010 operates to provide an indication that a user had purchased the digital content. The third-party application 1060 and the third-party server system 1080 may be responsible for providing the digital content. As an illustration, the "Portland" bike map may have already been stored by the third-party application program 1060 in the delivered content storage 1064, but the third-party application program 1060 may not unlock the map for display to the user until the application identifies that the map was purchased (e.g., by identifying a successful determination at box 1282).

In some examples, upon identifying that the map was purchased, the third-party application 1060 may provide an indication of a successful purchase to the third-party server system 1080. The content delivering system 1086 may authenticate the request and return the map to the third-party application 1060 (at box 1288) for storage in the delivered content storage 1064. In some examples, the third-party server system 1080 may not return the map to the third-party application 1060 unless the third-party server system 1060 verified that the nonce was correct (see box 1273) and that the signature was correct (see box 1281).

In some implementations, the market server system 1010 provides the third-party application 1060 with the purchased content (e.g., an image pack with which the third-party application 1060 may generate a display of additional game levels), or requests that another computing system make the purchased content available to the third-party application 1060. For example, at box 1287, the third-party application 1060 may request that the market server system 1010 provide the digital content for receipt by the third-party application. The request to the market server system 1010 may include a code received in the "Purchase State Changed" response (e.g., in the signed JSON string), and which the market server system 1010 may use to verify that the request from the third-party application 1060 is a valid request for purchased content (e.g., that the product has been purchased by a user of the computing device). In another example, the market server system 1010 sends the purchased content for receipt by the third-party application 1060 along with the "Purchase State Changed" response. For example, the purchased content may be included in the signed JSON string.

At box 1291, as a result of determining that the signature and the nonce are correct (box 1282), the third-party application 1060 generates and sends a "CONFIRM_NOTIFICATIONS" request. The confirm notifications request can include a bundle with four parameters—the normal three parameters and a parameter that includes the array of notification identifiers that was sent with the "Purchase State Changed" response.

The confirm notifications request triggers a synchronous response originating from the market application 1050 (as shown by boxes 1293 and 1294) and an asynchronous response originating from the market server system 1010 (as shown by boxes 1296, 1297, and 1298).

At box 1299, the market server system 1010 moves the computing device 1040 from the list of devices and to the list of acknowledged devices for each notification identifier in the array. The notification identifier may remain in the notification repository 1022 if other devices are still included in the list of devices.

The third-party application 1060 may not automatically re-send the "Get Purchase Info" request should the third-party application 1060 not receive one or more of the synchronous response (at box 1294) and the asynchronous response (at box 1298), for example, because the Confirm Notifications acknowledgment was lost before being received. Rather, the third-party application 1060 may continue operate as typical Should the third-party application 1060 receive another in-app notification (potentially with the same or additional notification identifiers because the Confirm Notification request was lost), the third-party application 1060 can generate and send a new Get Purchase Info request with a newly-generated nonce. In response to sending the request, the third-party application 1060 may receive transaction data, and can then send another Confirm Notification response. As such, the third-party application 1060 may acknowledge a notification identifier multiple times. Each of the devices that sends a Get Purchase Info request in response to notification identifier may generate and send different nonces in the requests.

At box 1289, the third-party application 1060 receives an indication that a user is attempting to access purchased content. For example, the third-party application 1060 may receive an indication that a user selected user interface element 904. In some examples, instead of immediately providing the user with access to the associated content, the third-party application 1060 requests that the third-party server system 1080 verify that the user can access the content. For example, the third-party server system 1080 may determine whether or not the transaction information storage 1082 includes an indication that the user has purchased the content. If so, the third-party server system 1080 may return, to the third-party application 1060, an indication that the third-party application 1060 can access the associated content. If not, the third-party server system 1080 may return an indication that the third-party application 1060 should not access the associated content. In some examples, the content is associated with a content feed that requires regularly-granted permissions to access the content feed. Use of server-side access verifications permits developer revocation of permission to access a product, and can secure use of in-app products to those users that purchased the products.

Providing Multiple Purchase Prices for a Product

Figure 13A:
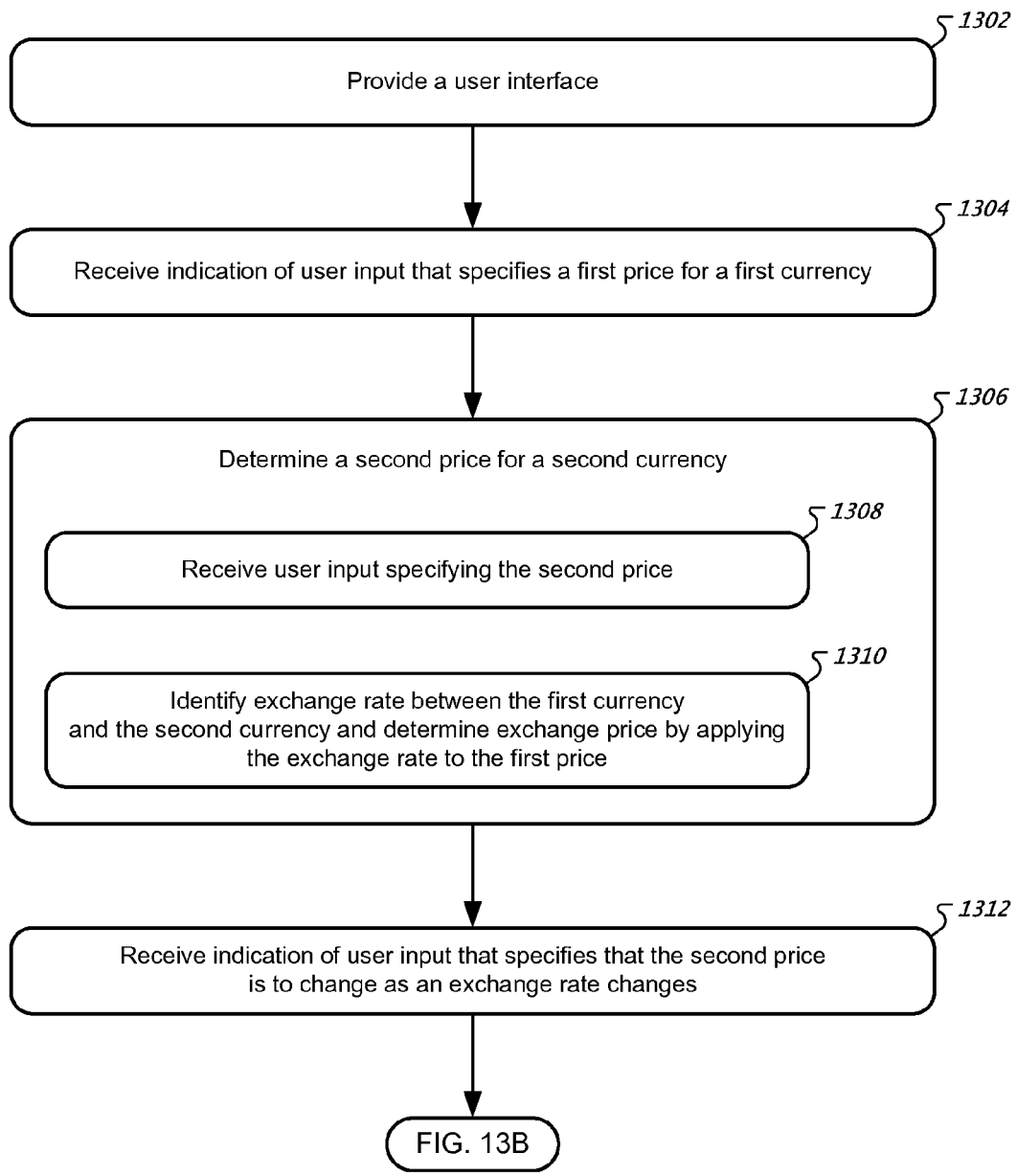
FIGS. 13A-B show a diagram of an example process for providing multiple prices for a product.
Figure 13B:
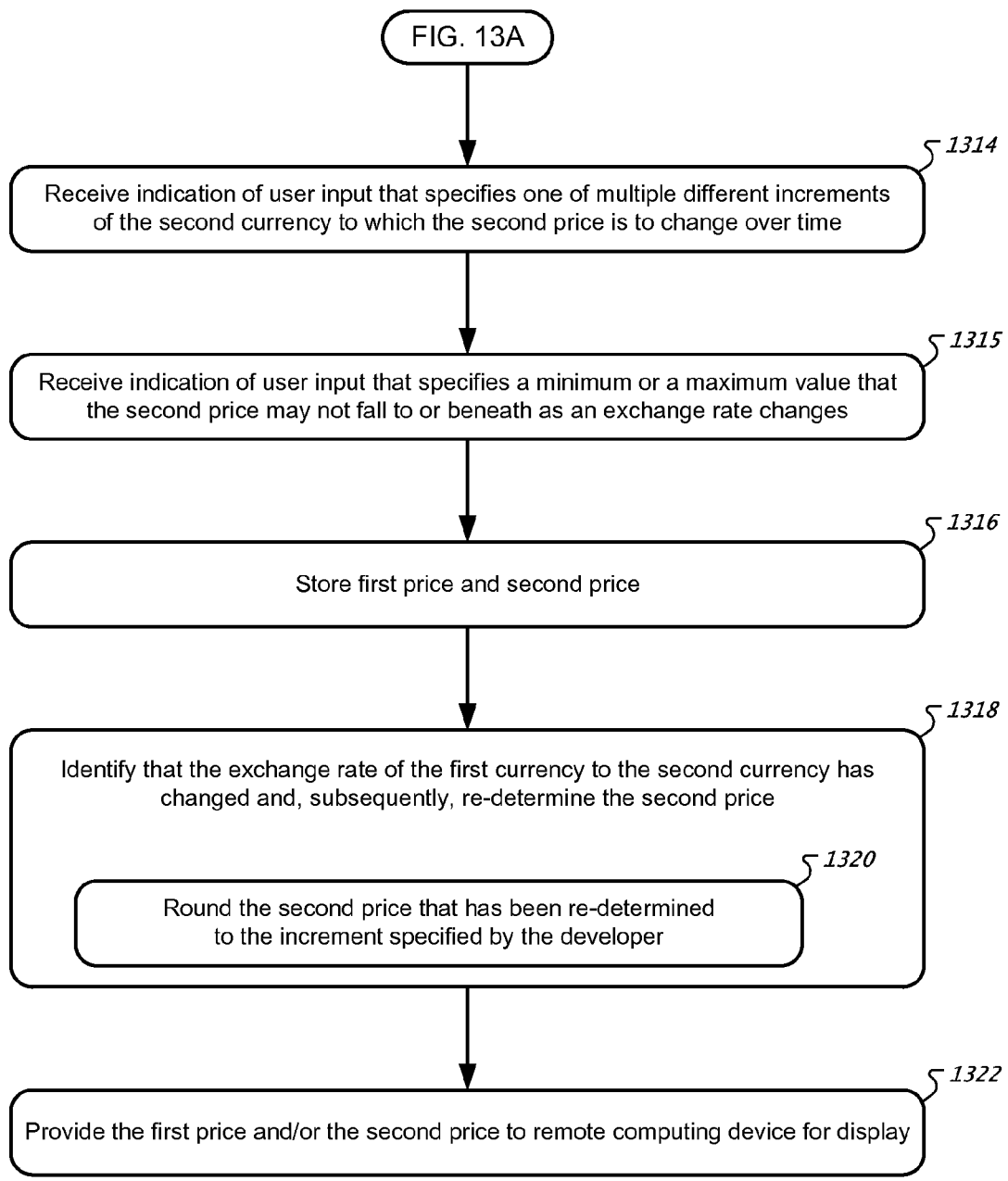

FIGS. 13A-B show a diagram of an example process for providing multiple prices for a product. Particular implementations can, in certain instances, realize one or more of the following advantages. A developer may provide different prices in different currencies for purchase of a product. The prices may automatically round to change in developer-specified increments as exchange rates change. Purchasers of a product may have a choice with which of multiple currencies the purchasers elect to purchase a product.

At box 1302, a user interface is provided. The user interface may include includes elements with which a developer of an application program can specify multiple prices in multiple respective currencies for which a product is to be offered for purchase. For example, developer site generator 1016 may provide the user interface shown in FIGS. 1-3C for display to the developer on a remote computing device, for example, by transmission of code over the Internet and for receipt by the remote computing device, the code causing the remote computing device to display the user interface. The application program may be configured to permit a user of the application program to initiate purchase of the product from an interface that is provided by the application program. For example, the Local Bike Maps application program includes an element 406 that, when selected, initiates purchase of the Portland bike map product.

At box 1304, an indication of user input that specifies a first price for a first currency is received. For example, the developer site generator 1016 may receive an indication of user input by the developer that specifies a first price of the multiple prices, the first price being for a first currency. The user input may include the developer specifying the value "1" in field 320*a*. User specification of a price includes the user typing or otherwise providing input that defines the price, in distinction to selecting an element that copies a price that may have been displayed to the developer and that the developer did not define.

At box 1306, a second price for a second currency is determined. For example, the developer site generator 1016 may determine the price 0.78 EUR as shown in field 320*b* or as exchange price 326*b*.

At box 1308, determining the second price for the second currency includes receiving user input specifying the second price. For example, the developer site generator 1016 may receive an indication of user input by the developer that specifies the second price through receiving an indication that the developer specified the value "0.78" in field 320*b*.

At box 1310, determining the second price for the second currency includes identifying an exchange rate between the first currency and the second currency, and determining an exchange price by applying the exchange rate to the first price. For example, the developer site generator 1016 may access a remote service that maintains current exchange rates between various currencies. Moreover, the developer site generator 1016 may multiple the first price by the exchange rate to determine the exchange price. In some examples, the exchange price is automatically populated in user-editable field 320b as the second price without user input specifying the second price. In some examples, the exchange price is displayed as exchange price 326b, permitting the developer to specify the second price in field 320b while the exchange price 326b is concurrently displayed.

At box 1312, an indication is received, the indication being of user input by the developer that specifies that the second price is to occasionally change as an exchange rate of the first currency to the second currency changes. For example, the developer site generator 1016 may receive an indication that the developer selected element 328b. An occasionally changing exchange rate may be an exchange rate that changes regularly or irregularly.

At box 1314, an indication is received, the indication being of user input by the developer that specifies one of multiple different increments of the second currency to which the second price is to change over time as an exchange rate of the first currency to the second currency changes. For example, the developer site generator 1016 may receive an indication that the developer selected an increment using slider element 330b.

At box 1315, an indication is received, the indication being of user input by the developer that specifies a minimum value or a maximum value that the second price may not fall to or beneath as an exchange rate of the first currency to the second currency changes. For example, the developer site generator 1016 may receive an indication that the user specified the value "5" in field 332d and an indication that the user specified the value "10" in field 334d.

At box 1316, the first price and the second price are stored for subsequent presentation to a prospective purchaser of the product as alternative prices. For example, the market server system 1010 may store the first price and the second price for subsequent presentation to a prospective purchaser as the prices shown in FIGS. 5 and 6.

At box 1318, the exchange rate of the first currency to the second currency is identified to have changed and, subsequently, the second price is re-determined. For example, the market server system 1010 may determine, after the developer has selected the save element 336 and after the second price in dialog box 504 has been displayed to at least one prospective purchaser, that the exchange rate between the first currency and the second currency has changed. As a result, the market server system 1010 may re-determine the second price by applying the newly-identified exchange rate to the first price. The second price that has been re-determined may be displayed to another prospective purchaser, for example, in dialog box 504 (but on a different computing device).

At box 1320, the second price that has been re-determined is rounded to the increment specified by the developer. For example, the market server system may access the indication received from the user (as discussed above), and may round the second price that has been re-determined up or down to a value identified by the increment. For example, at an increment of 0.1 euro, a price of 1.23 euro may be rounded to 1.2 euro. At an increment of 0.25 euro, a price of 1.23 euro may be rounded to 1.25 euro. The increments may be evenly divisible into 1.0 euro and, as such, the values to which the price can round to may be marked off by the increment starting 0.0 euro.

At box 1322, the first price and the second price are provided to a remote computing device for display to the prospective purchaser of the product. For example, the prices may be provided to computing device 400 for display as the prices in FIGS. 5 and 6. In this example, the price GBP 0.5 is presented upon user selection of the RBS purchasing instrument option from the pull-down menu. The price USD 1 is presented upon the user selecting the VISA purchasing instrument from the pull-down menu. A presentation of the USD 1 price may replace the presentation of the GBP 0.5 price. For example, the USD 1 price may not be displayed concurrently as the GBP 0.5 as a result of the user selection of the VISA purchasing instrument, even should the prices momentarily display concurrently during a transition between the displays.

Figure 14:
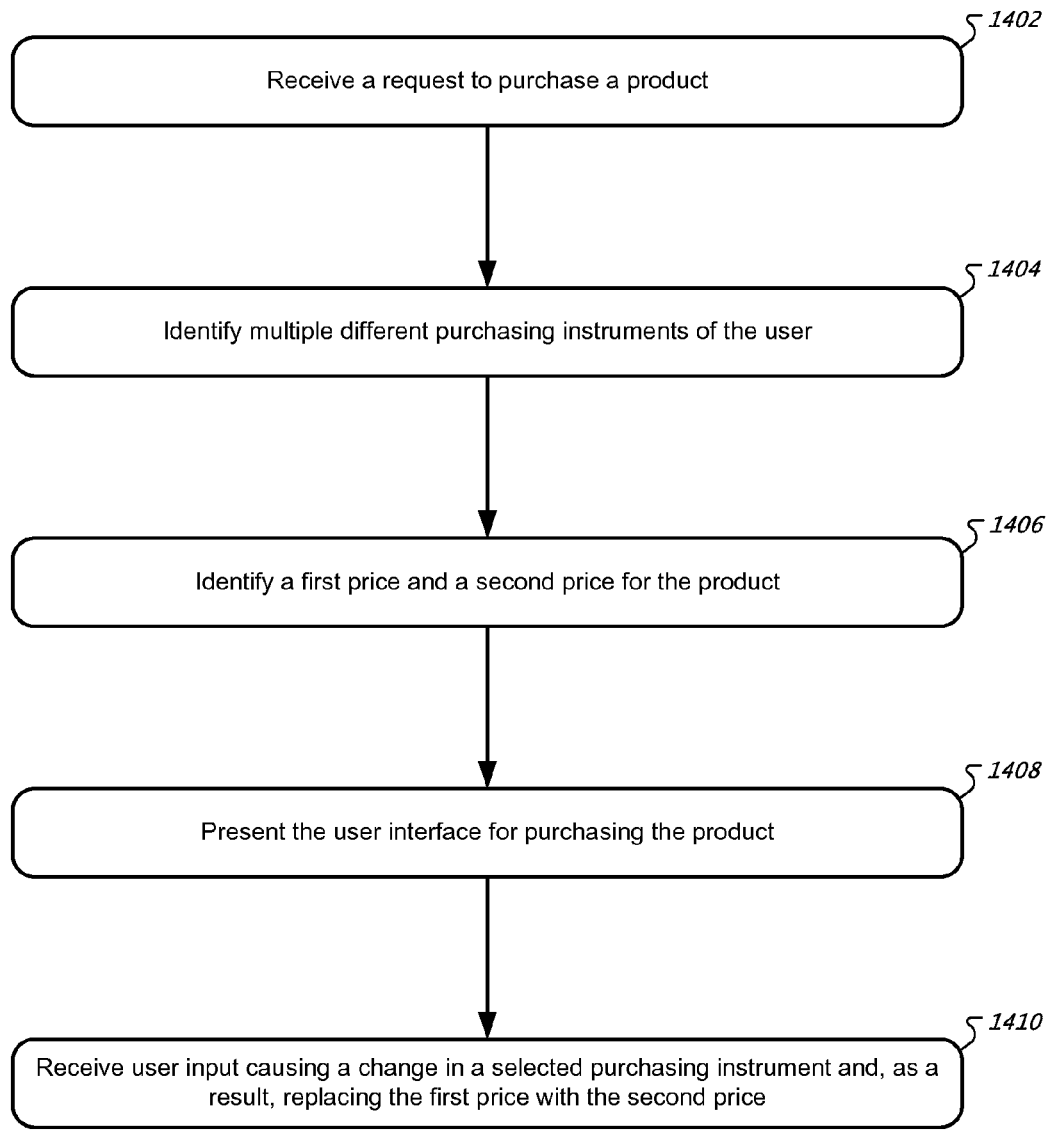
FIG. 14 shows a diagram of an example process for providing multiple prices for a product.

FIG. 14 shows a diagram of an example process for providing multiple prices for a product.

At box 1402, a request to purchase a product is received. For example, the computing device 400 may receive a request to purchase a product. The request may initiated by a user of the Local Bike Maps application program from a user interface 1402 provided by the application program At box 1404, multiple different purchasing instruments of the user are identified. For example, the computing device 500 may access stored indications of the purchasing instruments. Previously, the computing device 500 may have sent a request to the market server system 1010 for purchasing instruments that are associated with a user of the computing device 500. The request may include an indication of the user (e.g., an indication of a user account). The market server system 1010 may have stored indications of the purchasing instruments, as described throughout this disclosure, and may return indications of such purchasing instruments to the user. Each of the purchasing instruments may be assigned a primary currency, for example, a currency in which purchases may be transacted without incurring additional fees. The primary currency may be a currency in which a balance of the purchasing instrument is presented to the user. The primary currency for each purchasing instrument may be provided from the market server system 1010 to the computing device 500.

At box 1406, a first price for the product in the first currency and a second price for the product in the second currency are identified. For example, the computing device 500 may access stored indications of such prices. Previously, the computing device 500 may have sent a request to the market server system 1010 for prices for the product. The market server system 1010 may retrieve the prices from in-app product catalog 1014, and may send the prices to the computing device 500.

At box 1408, a user interface for purchasing the product is presented. For example, the dialog box 504 that is shown in FIGS. 5 and 6 may be presented to the user. The user interface may present the first price in association with an indication that the user has selected the first purchasing instrument and present the second price in association with an indication that the user has selected the second purchasing instrument.

At box 1410, user input is received, the user input being for causing a change in a selected purchasing instrument. As a result, the first price may be replaced with the second price. For example, as a result of the user changing the selected purchasing instrument from VISA to RBS by selecting element 514, the price that is displayed by element 516 may change.

Providing a Common Purchasing User Interface

Figure 15:
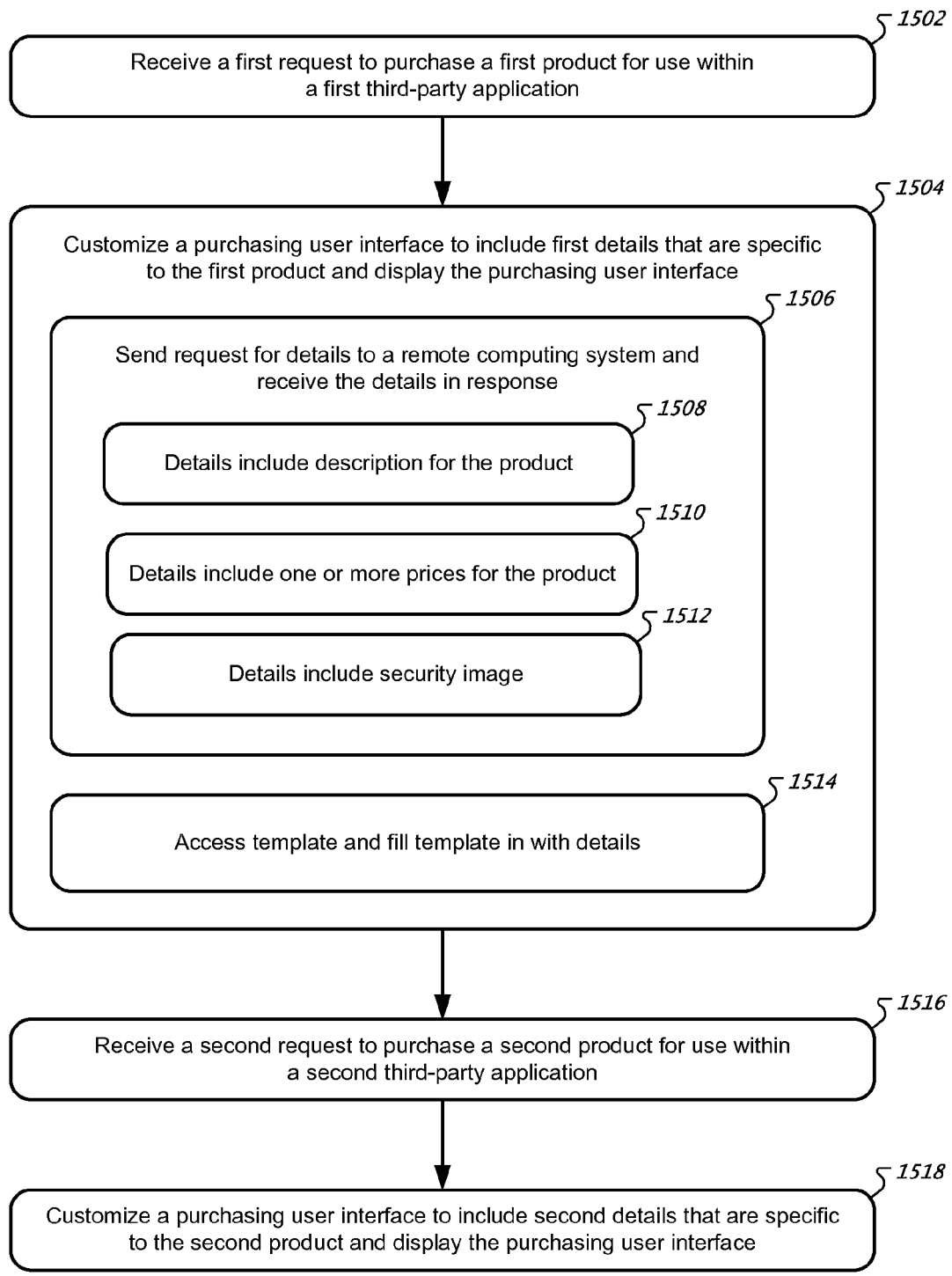
FIG. 15 shows a diagram of an example process for providing a common purchasing user interface.

FIG. 15 shows a diagram of an example process for providing a common purchasing user interface. In some examples, the common purchasing user interface may be dialog box 504 (see FIGS. 5 and 6).

At box 1502, a first request is received from a first third-party application program that is executing on a computing device and that was developed by a first entity, the first request being to purchase a first product for use within the first third-party application program. For example, the market application 1050 may receive the "Request Purchase" request from third-party application 1060, as described at box 1204.

As described further throughout this disclosure, the market application 1050 may be developed by an entity. An entity is an individual person or organization of persons such as a corporation or a non-profit group. The entity that developed the market application 1050 may be different than entities that developed third-party application programs that interact with the market application 1050. The entity that developed the market application 1050 may manage an application distribution platform. As described herein, an application distribution platform is a computerized service that enables users to browse listings of application programs and download application programs therefrom.

The entity that developed the market application 1050 may be an entity that operates a computerized service that charges users of third-party application programs for products that may be used in the respective third-party application programs. For example, a product may be purchased by selecting an element in a user interface that is provided by a particular third-party application program. The features provided by the purchased product may be illustrated by one or more elements in the user interface that is provided by the particular third-party application program, and may not have been provided in the user interface without the purchase of the product. For example, an element that indicates a health of a game character may indicate an increased health as a result of a user purchasing game character health. As another example, an element that enables a user to view an additional portion of the user interface may activate as a result of a user purchase (e.g., a button for viewing an additional game level may activate as a result of the user purchasing the additional game level). The computerized service may credit financial accounts of developers of the third-party application programs. The market application 1050 may be developed by an entity that developed server-side processing that facilitates in-app purchasing.

At box 1504, in response to receiving the first request, a purchasing user interface is customized to include first details that are specific to the first product. For example, the purchasing screen user interface generator 1054 displays the dialog box 504 that is shown in FIG. 5. The computing device 400 may display instances of dialog box 504 in response to product purchasing requests by different third-party applications. Different instances of dialog box 504 may have a same size, same arrangement of user interface elements, same color scheme, and same characteristics of user interface elements (e.g., font size, font color, and font type) regardless of the product that is being purchased and regardless of the third-party application program from which purchase of the product was initiated.

The content of the user interface elements in different instances of dialog box 504 may vary. As shown in FIG. 5, element 510 displays the title "Portland" to indicate that the "Portland" bike map product is being purchased. Element 510, however, may display a different title as a result of a request to purchase a differently named product. Similarly, element 512 displays a description that varies depending on the individual product that is being purchased. Likewise, element 516 displays one or more prices that change depending on the product that is being purchased. As such, the same purchasing user interface may be customized for purchase of different products. Furthermore, elements 506 and 508, which identify the title of the third-party application program from which the product purchasing request was initiated and the name of the developer of the third-party application, may identify different application program titles and developer names as the third-party application program from which the purchasing request initiated changes.

At box 1506, a request for details is sent to a remote computing system, and the details are received from the remote computing system in response. The details may be used to customize the purchasing user interface and may be specific to the product that is being purchased. For example, the purchasing screen user interface generator 1054 may request, from the market server system 1010, details that are used to generate the display of the purchasing user interface (e.g., dialog box 504), as described with respect to box 1211. In response, and as described with respect to box 1217, the purchasing screen user interface generator 1054 may subsequently receive the details from market server system 1010.

At box 1508, the details include a product description. For example, the request that is described with respect to box 1211 may identify the product for which the third-party application program 1060 has requested purchase. The market server system 1010, as described with respect to box 1212, may include instructions that cause the market server system 1010 to use the identification of the product to identify a description (and other details, in some implementations) in response to receiving the request. The description may be identified by the market server system 1010 from the in-app product catalog 1014. The description may have been specified by a developer of the third-party application program. The developer of the third-party application and the product that is being purchased may be the same (e.g., because the same organization may have created or requested creation of the third-party application and the product, even though different individuals in the organization or at the request of the organization may have created the third-party application program and the product).

At box 1510, the details include one or more prices for the product that is being purchased. As described above, the market application 1050 may send to the market server system 1010 a request for details associated with a product (at box 1211), and may receive the details in response (at box 1217). The details may include a single price for the product in a single currency, or may include multiple prices for the product in multiple respective currencies. As described with respect to boxes 1213, 1214, 1215, and 1216, the market server system 1010 may identify the multiple currencies as being the default currencies that are assigned to multiple purchasing instruments of the user.

At box 1512, the details include a security image that is assigned to the user of the computing device (e.g., a user account for which the computing device 1040 provided correct credentials). For example, the market server system 1010 may use an identifier of the user to request, from another system, a security image that is assigned to the user.

A security image may be an image that is assigned to an account of the user and that is not provided for public dissemination by a system that manages the user account. For example, a computerized billing system (e.g., the transaction processing system 1030) may display the security image to the user after the user supplies a user name portion of the user's credentials, but before the user supplies the corresponding password of the user's credentials, during a process for logging into a web page for the transaction processing system 1030. User accounts for the computerized billing system may be assigned different security images. The computing device 400 may present the security image in various instances of dialog box 504 (e.g., each and every time that instances of dialog box 504 are shown in association with a user's account). The display of the security image indicates that the dialog box 504 is authentic, for example, that the dialog box 504 was generated by the in-app billing system and not generated by the requesting third-party application in a phishing effort to obtain the user's privileged information. Use of a security image includes use of a security motion picture (e.g., a movie).

In some examples, in addition to or as an alternative to the display of the security image in dialog box 504, the computing device 400 provides an alert that indicates that the concurrently displayed dialog box 504 is authentic. An application program may not be able to request that the computing device provide the alert without the application program being assigned one or more operating system permissions. The one or more permissions may be assigned to the market application 1050, but may not be assigned to the requesting third-party application program 1060 or, in some examples, any third-party application program. Example alerts include sounds, tactile feedback, and one or more displayed interface elements (e.g., an icon displayed in status bar 501).

The details can also include an indication of one or more purchasing instruments that are associated with an account of the user (as described with reference to FIGS. 5 and 6). As such, the user may use the common purchasing interface to manage the purchasing instruments. For example, the user may switch between different purchasing instruments and view the in-app product price that is specific to each of the purchasing instruments. Moreover, a user may use the common purchasing interface to add, for association with the user's account, a new purchasing instrument that was not previously associated with the user's account. As shown in FIGS. 5 and 6, dialog box 504 can show names of the purchasing instruments (e.g., "VISA" and "RBS), and at least a portion of the account number for each of the purchasing instruments (e.g., "xxxx-8432" and "xxxx-8372"). Further, the user may infer that the common purchasing interface is legitimate (e.g., not a phishing attempt) if the names of the purchasing instruments and/or the at least portions of the account numbers represent the user's actual one or more purchasing instruments and associated one or more account numbers.

At box 1514, a template is accessed and the details are filled into the template. For example, the purchasing screen user interface generator 1054 may access the purchasing user interface template 1053 and perform operations that insert the received details into the template (e.g., a copy of the template in situations in which the template is read only). This modified template may be displayed by the purchasing user interface generator 1054. A template may be a collection of code that an application program can execute to generate a display. The collection of code may receive input parameters that specify content for interface elements that are specified by the template. As discussed throughout this disclosure, an operation by a component of the computing device 1040 (e.g., the purchasing user interface generator 1054) to "display" a user interface includes the component requesting that the computing device 1040 display the user interface.

In some examples, the third-party application 1060 that initiated the product purchase request does not receive the template 1053 or the details that are requested by the market application 1050. For example, the market application 1050 may receive the requested details from the market server system 1010, but the market server system 1010 and the market application 1050 may not provide the details or the template 1053 to the third-party application 1060. Moreover, the third-party application 1060 may not include the details or the template 1053. For example, the third-party application 1060 may comprise a collection of code that is stored by the computing device 1040. The collection of code may have been downloaded from an application program distribution platform. This collection of code may not include the requested details or the template 1053.

Furthermore, the third-party application 1060 may not be configured to access the requested details or the template 1053. For example, the third-party application 1060 may not include code that, when executed, causes retrieval of the details or the template 1053 to the third-party application 1060. The details and/or the template 1053 may not be accessible to the third-party application 1060. For example, a remote application or system may not be configured to provide the details and/or the template 1053 to the third-party application program 1060, for example, because the third-party application program 1060 may not have proper credentials with which to authenticate access to a system that would provide the details and/or the template 1053 to the third-party application program 1060.

At box 1516, a second request is received from a second third-party application program that is executing on the computing device and that was developed by a second entity, the second request being to purchase a second product for use within the second third-party application program. For example, the market application 1050 may receive the "Request Purchase" request, as shown at box 1204, but from another third-party application program.

At box 1518, in response to receiving the second request, the purchasing user interface is customized to include second details that are specific to the second product. For example, the purchasing screen user interface generator 1054 displays the dialog box 504 that is shown in FIG. 5, but including details for a product for which the user of the computing device 1040 requested purchase with the other third-party application program. For example, the user may have launched a "Music Streaming Service" third-party application program that offers two hours of free listening. After the two hours of free listening has expired, the user may select a "Purchase Additional Time" interface element. In response, the computing device 1040 may display a dialog box similar to that shown in FIG. 5, except that the application program title 506, in-app product developer name 508, in-app product title 510, in-app product description 512, and price 516 may specify content that is specific to the "Music Streaming Service" application program. Moreover, the operations of box 1518 can include operations that are similar to those described with respect to boxes 1508, 1510, and 1512 except the operations are specific to the second third-party application program.

Transmitting an Attribute of a Product with an Indication of Purchase

In general, a third-party application program 1060 may specify, with a request to purchase an in-app product, an attribute of the product. The attribute of the product may be returned to the third-party application program 1060 along with an indication that the product has been purchased. The attribute of the product may be an optional field that the third-party application 1060 may or may not specify with any particular request to purchase a product. The round-trip transmission and receipt of the attribute of the product may relieve the third-party application program 1060 from having to save the attribute of the product for a duration of time during which the purchasing request is being processed.

The market application 1050 may receive the request to purchase the product, and the market application 1050 may transmit the attribute of the product to the market server system 1010. The market server system 1010 may send the attribute of the product not only back to the computing device at which the product purchase request originated (sometimes referred to herein as the originating computing device), but also to one or more other computing devices that are associated with the originating computing device or a user of the originating computing device. As such, transmitting the attribute of the product along with the product purchasing request enables a device at which a purchasing request originated to communicate the attribute of the product to other, associated devices.

The attribute of the product may not be limited to specified values by a standard or an Application Program Interface (although the attribute of the product may have a maximum length, for example, 256 bytes). As such, the attribute of the product may be any "developer-specified" value. The attribute of the product may be used in various manners.

In some examples, the attribute of the product specifies an index at which information associated with the product is stored in a database (e.g., a table stored on the user computing device 1040 or a database stored at the third-party server system 1080). For example, the database may store any combination of: (i) an indication whether the product has been purchased, (ii) a variation of the product (as discussed below), (iii) a location of the originating computing device at a time at which the product was purchased, (iv) a brand of the originating computing device, and (v) a model of the originating computing device. As such, the in-app billing system propagates the index value to the other devices that are associated with the originating computing device. These other devices are then able to identify a location in the database of the information that is associated with the product. Propagation of the index value enables inter-device communication of data that is greater than a size of data permitted by the field for the attribute of the product.

In some examples, the attribute of the product specifies a measure of the product. For example, the third-party application program 1060 may be a role-playing game and the product may be potion to restore a game character's health. In this example, the user may request purchase of the potion while the game character has a first level of health (e.g., 30%). The purchasing request may be accompanied by an attribute of the product that specifies a measure of the product (e.g., a measure of potion to restore 70% of the game character's health). As such, should the game character lose further health while the potion is being purchased, the game character may receive only the specified measure of the product, so as to restore only the level of health that was missing when the purchasing request was originally provided. In other words, the third-party application 1060 may receive an indication that the potion product was purchased, along with an indication that the potion is to restore 70% of the user's health, even if the user's health had dropped to 10%. The cost to purchase health may not depend on the amount of health purchased, as specified by the attribute of the product.

In some examples, the attribute of the product specifies a variation of the product. For example, the third-party application program 1060 may be a role-playing game and the product may be clothes for a game character or food for the game character. The market server system 1010 may permit purchase of a "shirt" product or a "food" product, but may not specify variations of the "shirt" (e.g., whether the shirt is a red shirt, a green shirt, a button-up shirt, or a t-shirt) or variations of the "food" product (e.g., whether the food is a pizza, a milkshake, or a burrito). In other words, the in-app product catalog 1014 may store an identifier for the "shirt" product and an identifier for the "food" product, but may not store identifiers for the variations of the "shirt" product and the "food" product.

A particular variation of a purchased product, as specified by an attribute of the product, may not be used by the market server system 1010 for purposes of purchasing the product. Still, the particular variation of the product may be used by the third-party application program 1060. For example, the third-party application program 1060 may use an indication of a variation of a product to generate a correct display of the product (e.g., so that the game character wears a shirt that is red and eats food that is pizza). Transmitting the variation of the product in the attribute of the product enables instances of the third-party application on other computing devices to recognize the variation of the product and display the product with the correct variation.

In some examples, the attribute of the product specifies a user account associated with the third-party application 1060 into which a user had logged in when the user requested purchase of the product (in distinction to a user account of the computing device operating system or a user account of the in-app billing system). For example, the third-party application 1060, after launch of the third-party application 1060, may request that a user select a user account into which the user is to log in. The user may have to provide credentials (e.g., a password or a username and a password) to login to a particular user account. Products purchased with one user account may not be available for use by a user logged into another user account unless the user of the other user account also purchased the product. As such, the product attribute can specify the user account with which the product is being purchased. Accordingly, instances of the third-party application executing on other user devices may associate the purchased product with the purchasing user account, in distinction to associating the purchased product with all user accounts with which a user may access interfaces provided by the third-party application.

Figure 16:
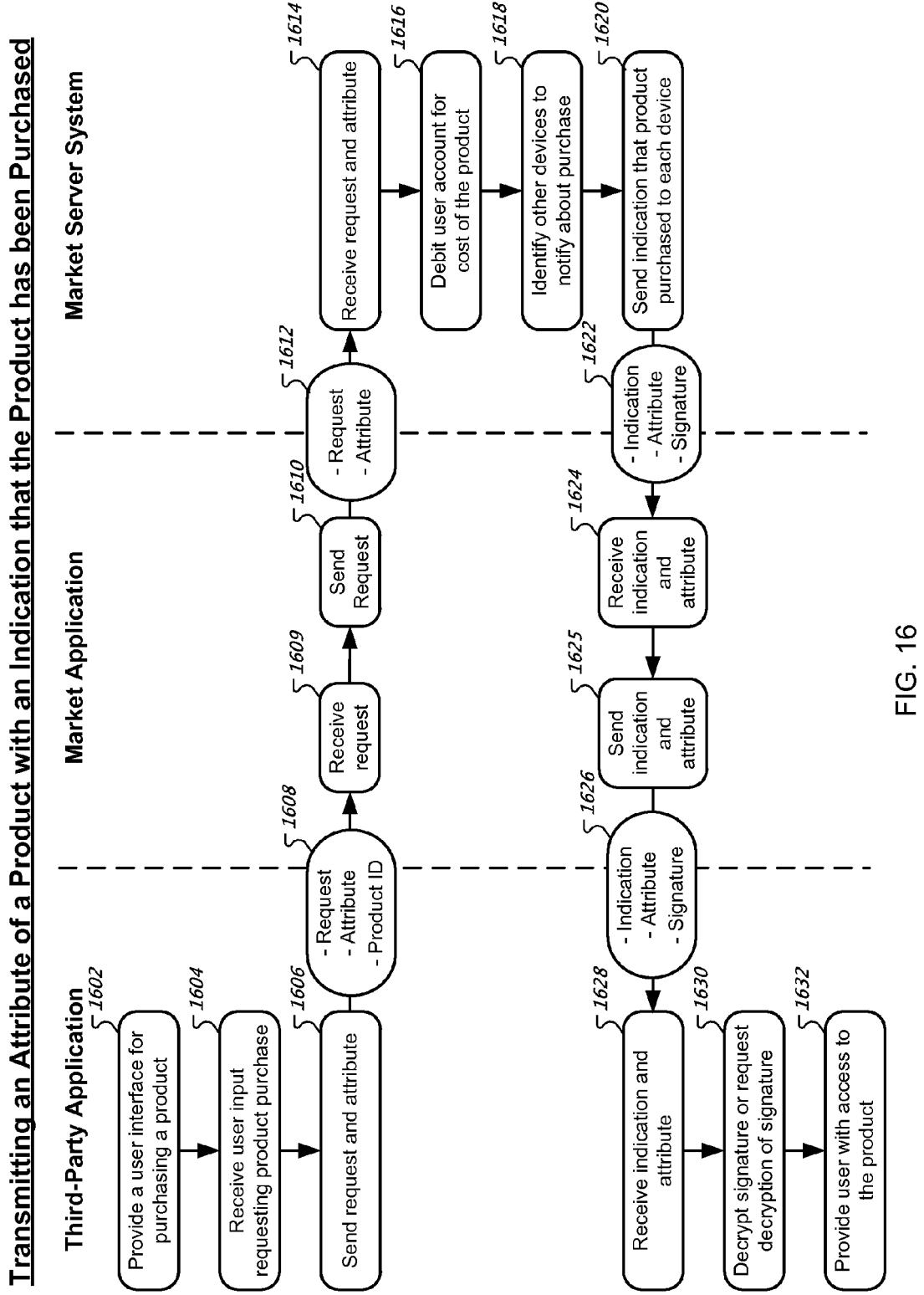
FIG. 16 shows a diagram of a process for transmitting an attribute of a product with an indication that the product has been purchased.

FIG. 16 shows a diagram of a process for transmitting an attribute of a product with an indication that the product has been purchased. As described above, the process may be performed by the third-party application 1060, the market application 1050, and the market server system 1010.

In box 1602, a third-party application program executing on a computing device provides a user interface with which a user of the computing device is able to request purchase of a product that is for use by the third-party application program. For example, the third-party application 1060 may perform the operations of box 1201 to display the user interface 402 (as shown in FIG. 4). A product is used by a third-party application program if the third-party application program provides a user interface from which the product is presented or can be activated.

In box 1604, the third-party application program receives an indication that the user provided input requesting purchase of the product. For example, the third-party application 1060 may perform the operations of box 1202 as a result of the user selecting the "Portland" element 406 (as shown in FIG. 4).

In box 1606, the third-party application program sends, for receipt by a particular application program, (i) a request 1608 to purchase the selected product, and (ii) an attribute of the product. For example, the third-party application program 1060 may perform the operations of box 1203 to send a "Request Purchase" request for receipt by the market application 1050. As described throughout this disclosure, the Request Purchase request is configured to include an optional payload (also referred to herein as an attribute of the product).

The Request Purchase request may also include a product identifier. The product identifier may uniquely identify the product from a collection of products that a user is able to purchase from a user interface provided by the third-party application program. For example, the user interface 402 enables a user of the computing device 400 to purchase a "Portland" map product and a "Fort Collins" map product. Each of these products may be associated with an identifier that is unique among the products offered for purchase by the Local Bike Maps application program. As described throughout this disclosure, the application identifier may be used by the market server system 1010 to obtain information regarding the product from the in-app product catalog 1014.

As described throughout this disclosure, the request 1608 may include both the attribute of the product and the product identifier. For example, the "Request Purchase" request includes the attribute of the product (i.e., the developer payload) and the product identifier as parameters of the request. In various examples, the request, the attribute of the product, and the product identifier are sent in separate transmissions, although the market application 1050 may await receipt of all three items before requesting purchase of the product from the market server system 1010. The attribute of the product may not be the product identifier and may not be the application name. The attribute of the product may take different values for a particular product.

At box 1609, the particular application receives the request to purchase the product and the attribute of the product. For example, the market application 1050 performs the operations of box 1204 to receive the Request Purchase request.

At box 1610, the particular application sends a request 1612, for receipt by a server system, to purchase the product and the attribute of the product. For example, the market application 1050 performs the operations described with respect to box 1226 to send a purchasing request to the market server system 1010. The purchasing request sent from the market application 1050 to the market server system 1010 may be the same as or different than the request sent from the third-party application 1060 to the market application 1050.

At box 1614, the server system receives a request to purchase the product and the attribute of the product. For example, the market server system 1010 may perform the operations of box 1228.

At box 1616, the server system requests that a user account is debited for a cost that corresponds to a cost of the product. For example, the market server system 1010 may perform the operations of box 1230 to request that a transaction processing system 1030 debit the user account for the cost that corresponds to the cost of the product (e.g., the cost of the product, a cost of the product after application of a coupon, or a cost of the product after taxes have been added). The user account may be a user account that is assigned to the computing device 1040, for example one of multiple user accounts associated with the in-app billing system for which a user of the computing device 1040 provided valid credentials at the computing device 1040.

At box 1618, the server system identifies other devices to notify about the purchase of the product. For example, the market server system 1010 may perform the operations of box 1244 to identify other devices that are assigned to the above-described one user account.

At box 1620, the server system sends, for receipt by the particular application, an indication that the product has been purchased and the attribute of the product (shown together as element 1622). For example, the market server system 1010 may perform the operations of box 1269 to send a "Purchase State Changed" response to the market application 1050. A similar Purchase State Changed response may be sent to each of the computing devices 1040 associated with the above-described one user account. The indication that the product has been purchased may be a value in the "purchaseState" field of the JSON response (e.g., the value "0" indicating that the product has been "purchased") (see description with respect to box 1271). As described with reference to FIGS. 12A-H, the Purchase State Changed response may be sent as a result of the market server system 1010 sending an "In App Notification" (see box 1246) to each of the computing devices 1040, and the computing devices each sending a "Get Purchase Info" request (see boxes 1255 and 1256).

The server system may send for receipt by the particular application a signature with which the indication that the product has been purchased and the attribute of the product have been signed with a cryptographic key. For example, the market server system 1010 may apply a deterministic procedure to the indication that the product has been purchased and the attribute of the product to generate a hash value (e.g., a single string). The market server system 1010 may encrypt the hash value (and possibly other information) using either a public key or a private key from a pair of public and private cryptographic keys that are mathematically linked. The encrypted hash value (referred to as a certificate) may be sent with the indication that the product has been purchased and the attribute of the product. As described later, the other of the public key or the private key may be used by the third-party application 1060 to verify that the indication that the product has been purchased and the attribute of the product were sent by the market server system 1010 and not a malicious device.

At box 1624, the particular application program receives the indication that the product was purchased and the attribute of the product. For example, the market application 1050 may receive the "Purchase State Changed" response, as described with respect to box 1270. The signature may also be received with the indication and the attribute At box 1625, the particular application program may send, for receipt by the third-party application program, the indication that the product has been purchased and the attribute of the product (shown as element 1626). For example, the market application 1050 may send the "Purchase State Changed" response, as described with respect to box 1270. The signature may also be sent with the indication and the attribute.

At box 1628, the third-party application program may receive, from the particular application program, the indication that the product has been purchased and the attribute of the product. For example, the third-party application program may perform the operations of box 1271. As described above, the indication that the product has been purchased and the attribute for the product may be signed (e.g., they may be accompanied with the signature).

At box 1630, the third-party application program may decrypt the signature or request decryption of the signature by another system. The signature may have been generated by applying a first cryptographic key (e.g., a public key or its corresponding private key) to a hash (also called a digest) of the indication that the product has been purchased and the attribute of the product. A second cryptographic key (e.g., the other of the public key or its corresponding private key) may be used to decrypt the signature. For example, the third-party application 1060 may perform the operations of boxes 1280 and 1281.

At box 1632, the third-party application provides the user with access to the purchased product. For example, the third-party application 1050 may determine whether the signature is correct (e.g., by analyzing whether the hash value in the signature matches a hash value of the signed information) (box 1282), and if so, may change the user interface so that the user is presented with the purchased content or is able to access the purchased content. For example, interface 902 may change so that element 904 includes the text "Purchased," and so that element 904 becomes activated. As such, when element 904 is selected by a user, the computing device 1040 displays a Portland bike map.

Coordinating Multiple Devices in a Product Purchasing System

Figure 17A:
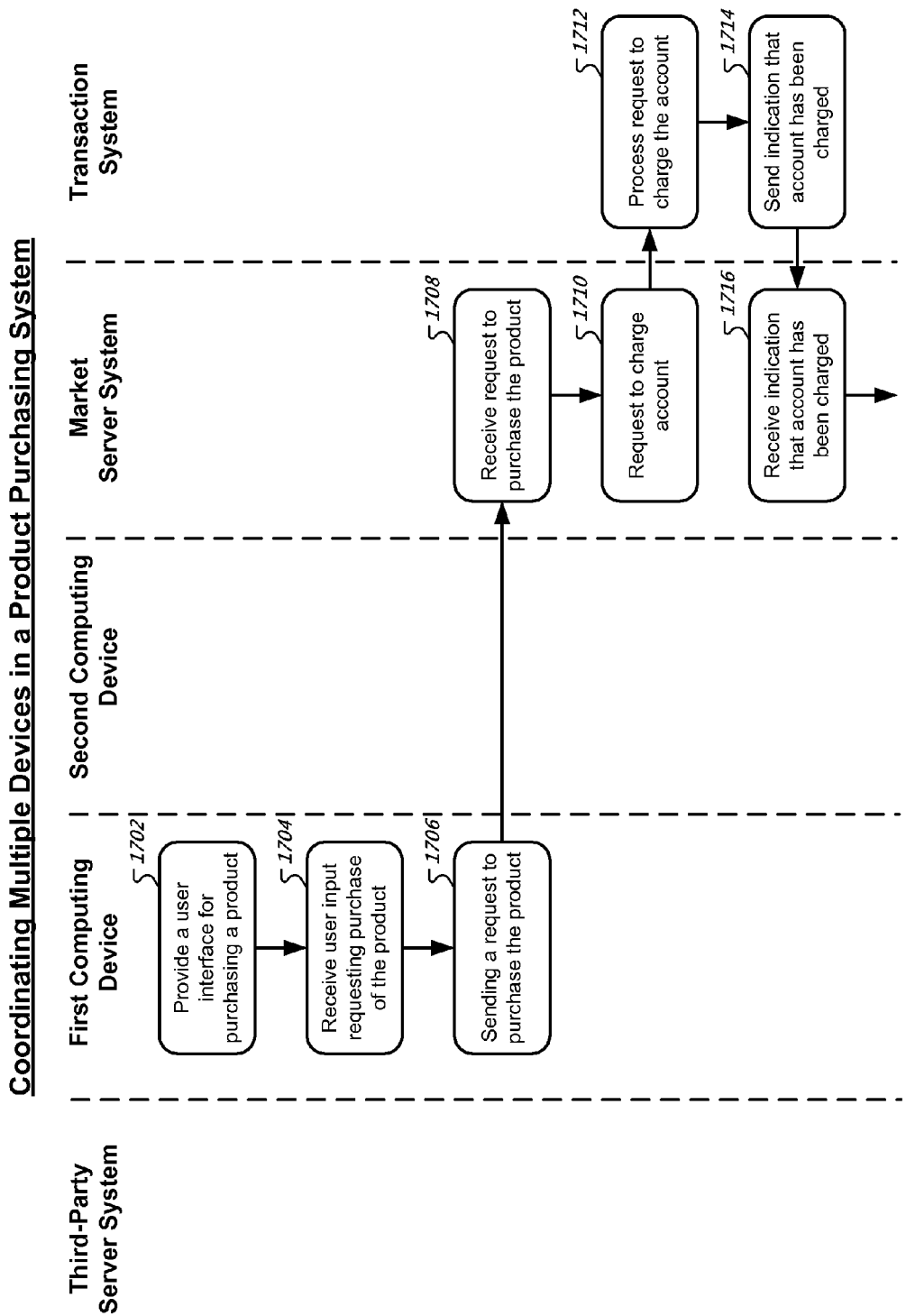
FIGS. 17A-C show a diagram of a process for coordinating multiple devices in a product purchasing system.
Figure 17B:
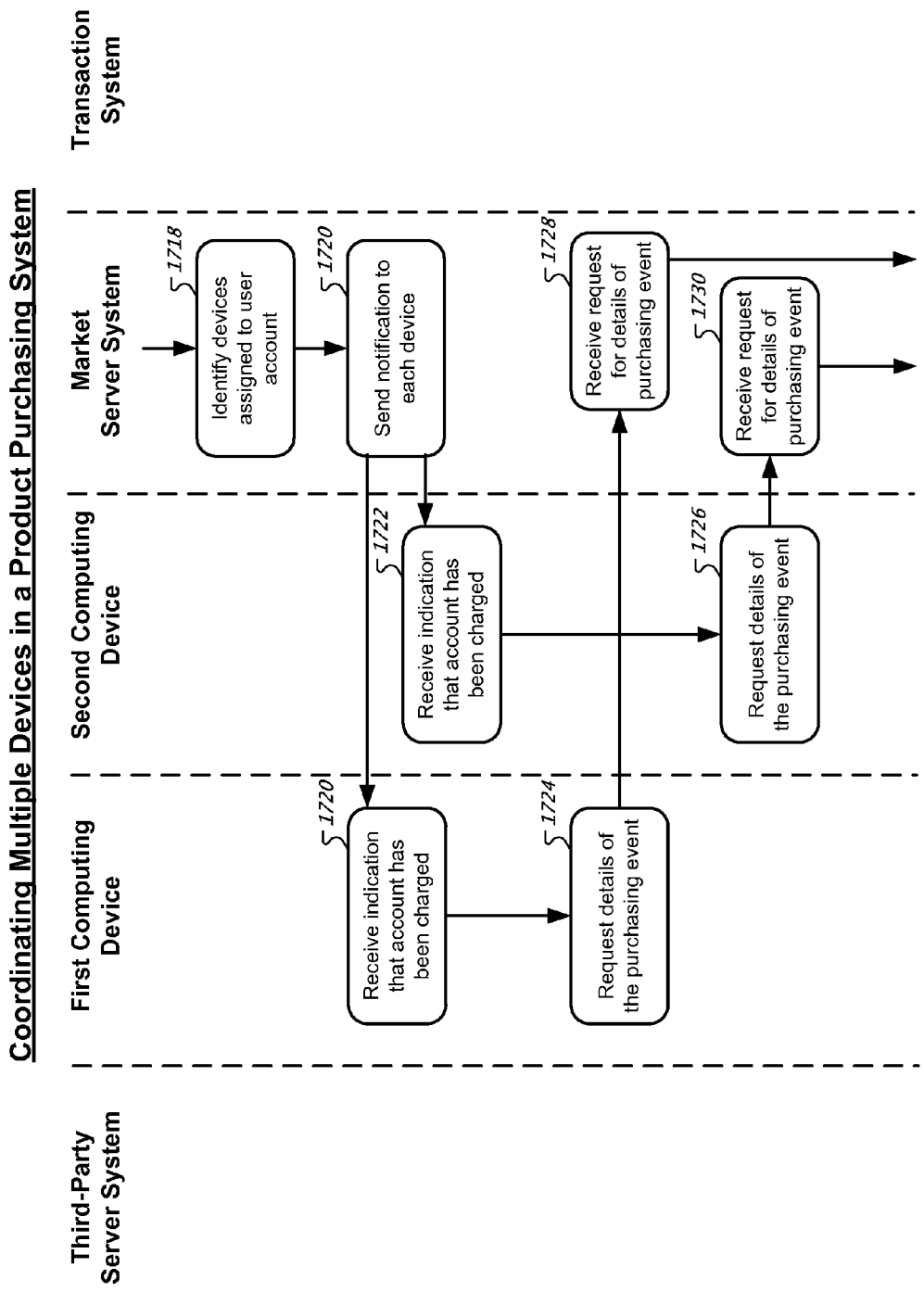
Figure 17C:
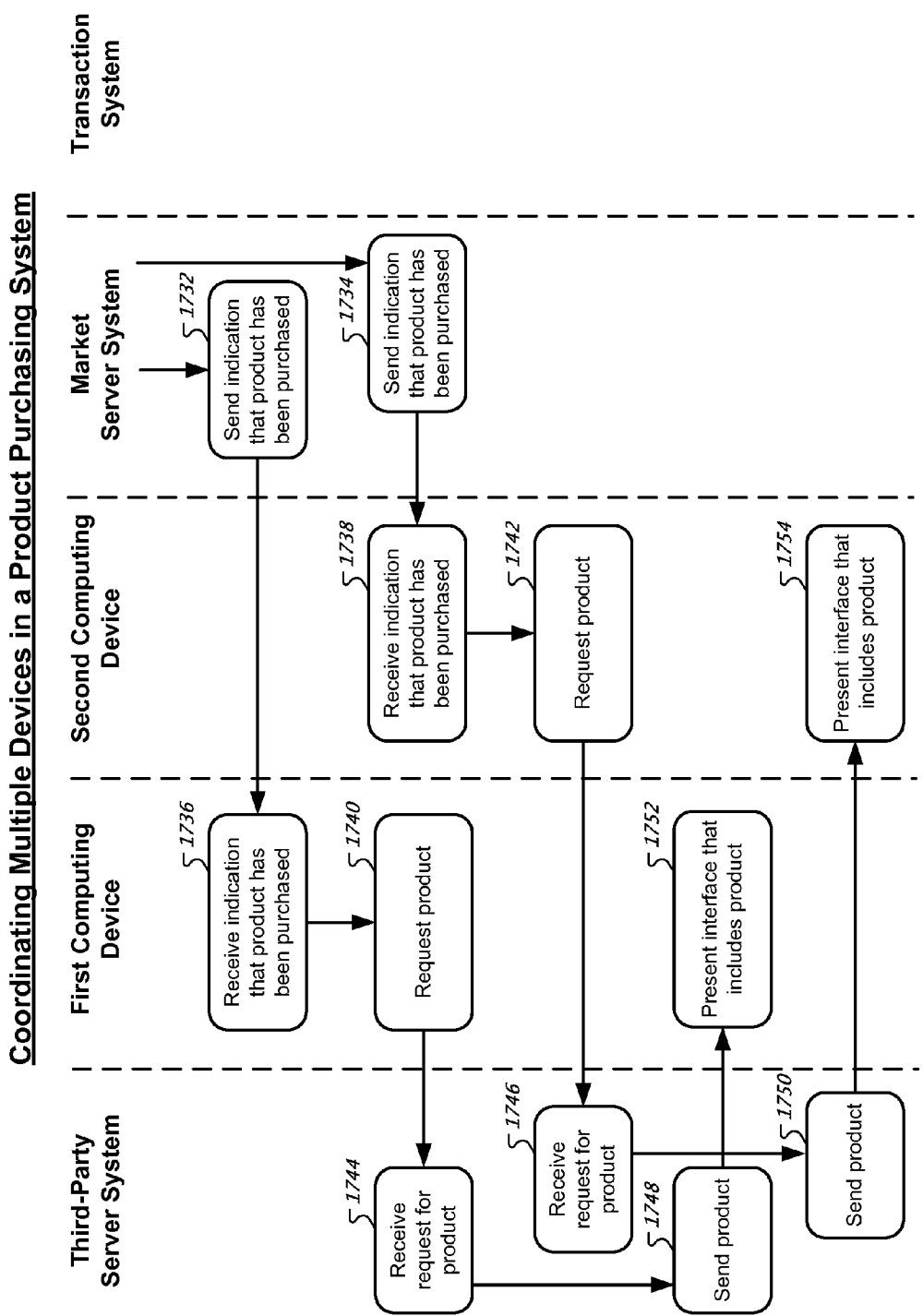

FIGS. 17A-C show a diagram of a process for coordinating multiple devices in a product purchasing system. The process may be performed by the computing devices and systems described throughout this disclosure. For example, the process that is described with reference to FIGS. 17A-C represents portions of the process that is described with reference to FIGS. 12 A-H.

At box 1702, a first computing device provides a user interface with which a user may purchase a product. The user interface may be provided by a third-party application program. In other words, the user interface may be specified by instructions of the third-party application program. For example, third-party application 1060 at the computing device 1040 may perform the operations of box 1201 to display interface 402 (see FIG. 4).

At box 1704, the first computing device receives input requesting purchase of the product. The first computing device may identify that a user of the computing device provided input to purchase the product using the interface that is provided by the third-party application program. For example, the third-party application 1060 at the computing device 1040 may perform the operations of box 1202 in order to identify that a user selected the "Portland" interface element 406 that is presented by user interface 402 (see FIG. 4).

At box 1706, the first computing device sends a request to purchase the product. For example, the third-party application 1060 and/or the market application 1050 may perform the operations of box 1203 and/or box 1226 to send, for receipt by the market server system 1010, a request to purchase the product.

At box 1708, the server system receives, as having been sent by the first computing device, the request to purchase the product. For example, the market server system 1010 may perform the operations of box 1228.

At box 1710, the server system requests to charge an account that is associated with a user of the first computing device for a price that corresponds to a price of the product. The account that is associated with the user may be different than the user account to which each of the multiple computing devices is assigned. For example, the market server system 1010 may perform the operations of box 1230 to request purchase of the product. The charged price may correspond to the price of the product, for example, by being the price of the product or being based on the price of the product (e.g., by adding tax or discounting a value of a coupon from the price of the product). Requesting purchase of the product may include requesting that the account that is associated with the user be charged for the price, and may not involve requesting a delivery of the product from the server system.

At box 1712, a transaction processing system requests to charge the account that is associated with the user. For example, the transaction processing system 1030 may perform the operations of box 1231 to either charge the account that is associated with the user, or to request that another system (e.g., entity 1032 or 1034) charge the account that is associated with the user.

At box 1714, the transaction processing system sends an indication that the account has been charged. For example, the transaction processing system 1030 may perform the operations of box 1243. Sending an indication that the account has been charged may include sending an indication that the account is to be debited for the cost that corresponds to the cost of the product. For example, the indication that the account has been charged may be sent by the transaction processing system 1030 after the transaction processing system has determined that the user account includes sufficient funds, but before the transaction processing system verifies that the account that is associated with the user has been debited for the cost that corresponds to the cost of the product.

At box 1716, the server system receives an indication that the account has been charged. For example, the market server system 1010 may perform the operations of box 1244.

At box 1718, the server system identifies devices other than the first computing device that are assigned to the user account. For example, the market server system 1010 may perform the operations of box 1244. The multiple devices that are assigned to the user account may be devices at which the user of the computing device provided user input supplying credentials (e.g., username and password) for the user account. The user account may be a user account for the in-app billing system, for example, a user account to which the user's purchases of in-app products in the in-app billing system are associated. The user account for the in-app billing system may also be a user account for the application distribution system (e.g., an application marketplace). In this example, the market server system 1010 identified that a second computing device is assigned to the user account.

At box 1720, the server system sends, for receipt by each of the multiple computing devices that are assigned to the user account, a notification that a purchasing event has occurred. A separate notification is sent to each of the multiple devices, although the notification may be the same. For example, the market server system 1010 may perform the operations of box 1246 for each of the devices that are assigned to the user account. A purchasing event may include the market server system 1010 receiving, from the transaction processing system 1030, an indication that a request to purchase a product has been successful (e.g., confirmed) or has been cancelled, or that a refund has been received for a previously purchased product.

The market server system 1010 may, after a length of time, determine whether the market server system 1010 has received, from each particular one of the multiple computing devices, a confirmation that the particular computing device received the notification that the purchasing event has occurred. The confirmation may be a request for details of the purchasing event (as described in additional detail below).

At box 1720, the first computing device receives the notification that the purchasing event has occurred. For example, the computing device 1040 may perform the operations of box 1248. The second computing device also receives the notification that the purchasing event has occurred. For example, another computing device may perform the operations of box 1248. The notification that is sent to the first computing device and the notification that is sent to the second computing device may be the same. For example, other than a addressing information (e.g., a destination address and a source address), the content of the notifications may be the same. The notifications may not specify that the product has been purchased. Rather, and as described with reference to box 1248, each notification may serve to "wake up" the recipient computing device and may prompt the recipient computing device to send a request for the details of the purchasing event.

At box 1724, the first computing device sends a request for details of the purchasing event. For example, the computing device 1040 may perform the operations of box 1256 and/or box 1257 to send the "Get Purchase Info" request. As described with respect to boxes 1250, 1251, and 1255, the request may include a nonce. Each request may include a different nonce, and the first computing device may be configured to process a single response that includes any particular nonce. Subsequent responses that include the particular nonce may be discarded by the first computing device (at least until the first computing device sends another request that uses the nonce). At box 1726, the second computing device sends a request for details of the purchasing event. The second computing device may also perform the operations of box 1256 and/or box 1257.

At box 1728, the server system receives, from the first computing device, the request for details of the purchasing event. For example, the market server system 1010 may perform the operations of box 1260 for a request that was sent by the computing device 1040. At box 1730, the server system receives, from the second computing device, the request for details of the purchasing event. For example, the market server system 1010 may perform the operations of box 1260 for a request that was sent by the second computing device.

At box 1732, the server system sends, for receipt by the first computing device, an indication that the product has been purchased. For example, the market server system 1010 may perform the operations of box 1269. In this example, the indication that the product has been purchased may be a "Purchase State Changed" response that includes a value of "0" (purchased) in the "purchaseState" field of the JSON string in the "Purchase State Changed" response. At box 1734, the server system sends, for receipt by the second computing device, an indication that the product has been purchased. For example, the market server system 1010 may perform the operations of box 1269.

The market server system may send the notification to each of the devices (box 1720) before any of the devices requests details of the purchasing event (boxes 1724 and 1726), or before the market server system receives any of the requests for details of the purchasing event (boxes 1728 and 1730). The market server system may send the notification to each of the devices (box 1720) before the market server system sends the indication that the product has been purchased to any of the devices (e.g., boxes 1732 and 1734).

At box 1736, the first computing device receives the indication that the product has been purchased. For example, the computing device 1040 may perform the operations of box 1271. Receiving the indication that the product has been purchased may, in some examples, include verifying a nonce that is included with the indication (boxes 1272 and 1273), verifying a signature of the indication (boxes 1280 and 1281), and determining whether the nonce and the signature are correct (box 1282). At box 1738, the second computing device receives the indication that the product has been purchased. For example, the second computing device may perform the operations of box 1271.

At box 1740, the first computing device requests the product. The request may be to unlock the product from local storage on the first computing device for use by the user (e.g., as described with reference to box 1287) or may be a request that a second server system send the product for receipt by the first computing device (e.g., as described with reference to box 1288). At box 1742, the second computing device requests the product (e.g., as described with reference to box 1287 or box 1288).

At box 1744, the second server system receives the request for the product (e.g., as described with respect to box 1288). The second server system may be the third-party server system 1080. At box 1746, a third server system receives the request for the product (e.g., as described with respect to box 1288).

At box 1748, the second server system sends the product for receipt by the first computing device (e.g., as described with respect to box 1288). At box 1750, the third server system sends the product for receipt by the second computing device (e.g., as described with respect to box 1288). The second server system may be the same as the third server system or may be different than the third server system.

At box 1752, the first computing device presents an interface that includes the received product. For example, the first computing device may change the user interface to include content specified by the product. The content specified by the product may be audio content or displayed content. For example, the computing device 1040 may perform operations that are specified by instructions of the third-party application program to change the interface 402 (see FIG. 4) to the interface 902 (see FIG. 9). The changed user interface may identify the product as being purchased (e.g., by displaying an indication of the product that was not displayed before the user requested purchase of the product). At box 1752, the second computing device presents an interface that includes the product. For example, the second computing device (e.g., a tablet computer that is also assigned to a same user account as that of the mobile telephone 400) may present a user interface that identifies the product as having been purchased.

FIGS. 17A-C show that the first computing device and the second computing device perform operations and communicate with the market server system in a step-wise manner (e.g., the first computing device performs operations followed thereafter by the second computing device performing the same or similar operations). The operations of the first computing device and the second computing device, however, may occur independently of each other and according to independent time frames. The first computing device and the second computing device may not communicate with each other in performance of the process of FIGS. 17A-C. For example, once the market server system sends notifications to each device (box 1720), one of the computing devices may respond before the other, and the market server system may handle the response and send a subsequent communication to the responding device without waiting for a response by the other computing device. The computing device that responds to the market server system last may be a computing device that has poor network connectivity or poor processing capabilities.

In some implementations, the market server system may send the notification for receipt by each device (box 1720), but the first computing device may not receive the notification (e.g., because the first computing device is no longer connected to the Internet or has been turned off). As such, the second computing device and the market server system may perform the operations of boxes 1722, 1726, 1730, 1734, and 1738 before the first computing device performs the operations of box 1720 (e.g., at some later time when the first computing device regains network connectivity or is turned on, and as a result of the market server system sending a subsequent notification for receipt by the first computing device).

In some implementations, the market server system may not receive a request to purchase the product from any of the multiple computing devices assigned to the user account other than the first computing device. As such, the notification of the purchasing event that is sent to each of the multiple devices may be sent without each of the other devices independently requesting purchase of the product. Rather, a user may purchase the product using one of the multiple devices, and the purchase of the product may be communicated automatically to the other of the user's devices, and without user intervention or input requesting that the product purchase be communicated to the other of the user's devices.

Indeed, after the first computing device sends the request to purchase the product (box 1706), the market server system 1708 may not receive any communication (or any communication initiated as a result of user input) from particular ones of the other computing devices before the market server system sends the notification to the particular ones of the devices (box 1720). As such, the other computing devices may not send to the server system a communication requesting an update or a syncing operation.

Cancelling a Purchasing Request

Figure 18:
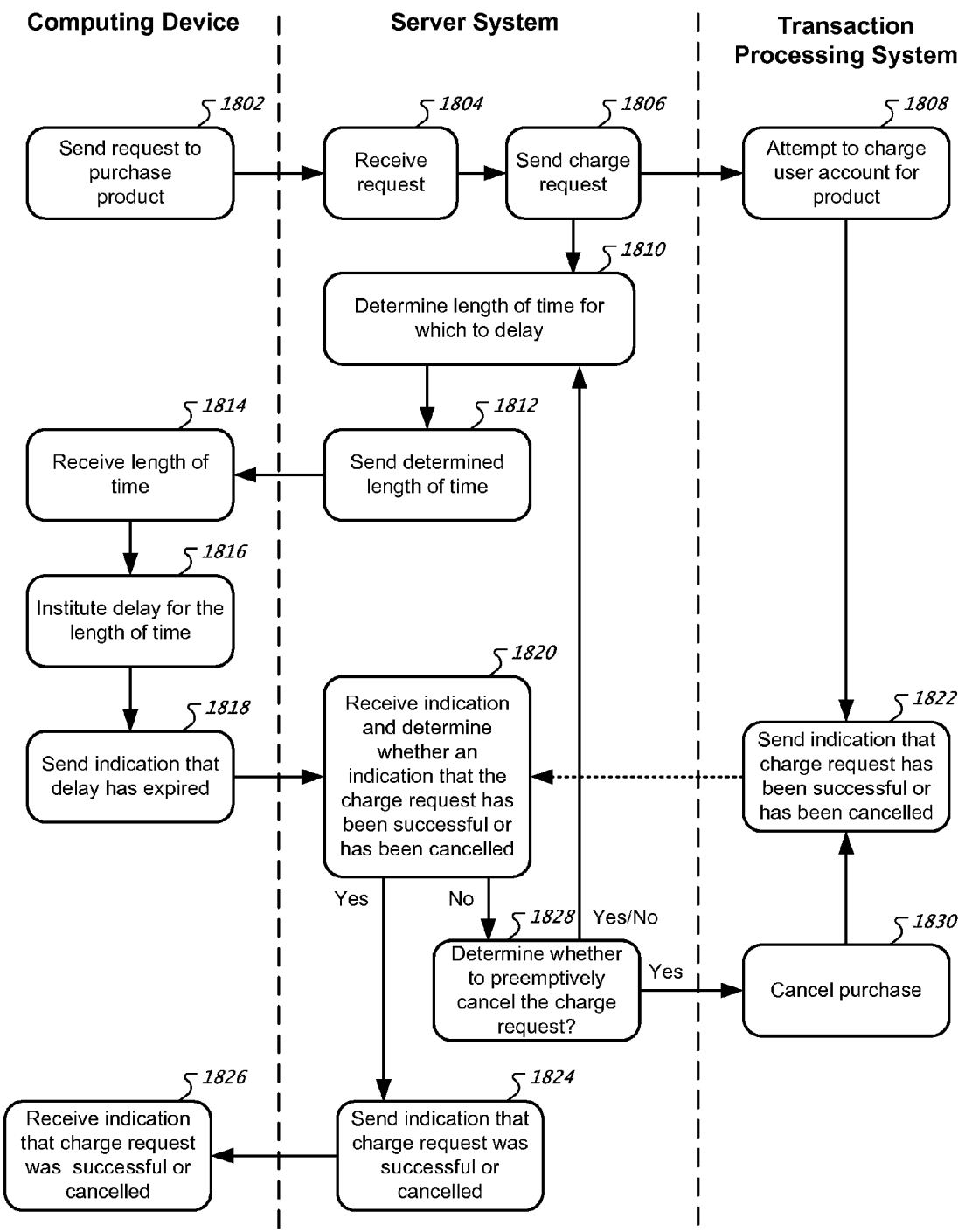
FIG. 18 shows a diagram of a process for cancelling a purchasing request.

FIG. 18 shows a diagram of a process for cancelling a purchasing request. The process may be performed by the computing devices and systems described throughout this disclosure. For example, at least some of the operations described with reference to FIG. 18 may supplant the operations shown in box 1232 (see FIG. 12C).

At box 1802, a request to purchase a product is sent by a computing device for receipt by a server system. For example, computing device 1040 may send, for receipt by market server system 1010, a request to purchase a product. The request may be a "Request Purchase" request, as described with reference to box 1203. The product may be an in-app product that is for use by a third-party application program. The request to purchase the product may have been initiated by user selection of an interface element that is provided for display by the third-party application program. For example, the request may have been initiated by user selection of the "Portland" interface element 406 (as shown in FIG. 4).

At box 1804, the request to purchase the product is received by the server system. For example, the market server system 1010 may receive the request to purchase the product, as described with reference to box 1204.

At box 1806, as a result of receiving the request to purchase the product, the server system sends a charge request for receipt by a transaction processing system. The charge request may be a request to charge an account of a user of the computing device for purchase of the product. For example, the market server system 1010 may send a charge request for receipt by the transaction processing system 1030. The request to charge the account may be a request to debit a monetary value from the account. The account of the user of the computing device may be an account for which the user provided login credentials using the computing device. The account of the user may be a credit card or debit card account. In some implementations, the transaction processing system may be a system managed by a credit card company. In some implementations, the transaction processing system may be a system that is managed by a business entity that is different than a business entity that manages the server system.

At box 1808, the transaction processing system receives the charge request and begins operations to charge the account of the user for the product. For example, the transaction processing system 1030 may send a request to charge the account to entity 1032 or entity 1034. The transaction processing system may await a response from entity 1032 or entity 1034 regarding a status of the charge request. As described hereinafter, the server system and the computing device may perform various operations while the transaction processing system is processing the charge request.

At some later point in time, the transaction processing system may determine that the charge request has been successful, or may determine that the charge request has been cancelled. As a result, the transaction processing system may send an indication that the charge request has been successful, or may send an indication that the charge request has been cancelled. The indication that the charge request has been successful may be sent as a result of the transaction processing system determining that the account of the user has been debited for an amount of the purchase, or that the account of the user is able to be debited for the amount of the purchase (e.g., that the account includes sufficient funds). The indication that the charge request has been cancelled may be sent as a result of the transaction processing system receiving a request to preemptively cancel the purchase (as described with reference to box 1830) or the transaction processing system determining on its own initiative that the charge request should be cancelled (e.g., as a result of the transaction processing system determining that the charge request is likely to be fraudulent or that the account of the user has insufficient funds).

At box 1810, the server system determines a length of time for which to delay. For example, the automatic canceller 1020 at the market server system 1010 may determine a length of time for which the computing device 1040 should delay before the computing device 1040 prompts the server system 1010 to determine whether the charge request has been successful or has been cancelled. As described with respect to FIG. 19, the determination of the length of time for which to delay can include an analysis of information from an account of the user, information from a social graph, or information regarding previous purchases by the user. For example, if the user has recently created the account of the user (e.g., by proposing a username and password), or if the user has not requested any purchases using the account, the server system may determine a longer length of time (e.g., so as to not discourage a new user from requesting purchase of products).

At box 1812, the server system sends, for receipt by the computing device, an indication of the determined length of time. For example, the automatic canceller 1020 of the market server system 1010 may send, for receipt by the automatic canceller 1056 of the computing device 1040, a request that the computing device 1040 establish a delay for the length of time.

At box 1814, the computing device receives, as having been sent by the server system, the indication of the determined length of time. For example, the automatic canceller 1056 may receive the request that the computing device 1040 establish the delay for the length of time.

At box 1816, the computing device institutes a delay for the received length of time. For example, the computing device may execute a timer that either counts up to the length of time or a timer that counts down to the length of time so as to monitor passing of the length of time. After the computing device determines that the length of time has expired (e.g., the timer has measured that the length of time has passed), the computing device may perform the operations of box 1818.

At box 1818, the computing device may send, for receipt by the server system, an indication that the delay for the length of time has expired. For example, the automatic canceller 1056 may send, for receipt by the automatic canceller 1020 at the market server system 1010, a request that the market server system 1010 determine whether the account of the user has been charged for the product.

At box 1820, the server system receives a communication from the computing device that indicates that the delay for the length of time has expired. The server system also, after and as a result of receiving the communication, determines whether the server system has received an indication that the charge request has been successful or has been cancelled. For example, the automatic canceller 1020 at the market server system 1010 may receive the indication that the delay for the length of time has expired during the delay that is instituted by the computing device 1040.

The indication that the delay for the length of time has expired may be a request to determine whether the server system has received the indication that the charge request has been successful or has been cancelled. The server system 1010 may access a flag to determine whether an indication that the charge request has been successful or has been cancelled was received during the delay. The flag may be set to one or more particular values if the indication had been received. The server system 1010 may access a memory location to determine whether an indication that the charge request has been successful or has been cancelled was received. The memory location may include the received indication whether the charge request has been successful or has been cancelled.

As such, the server system may receive, from the transaction processing system, the indication that the charge request has been successful or has been cancelled and may store the indication, but the server system may not perform the operations of boxes 1820 and/or 1828 until the server system receives, from the computing device, the indication that the delay has expired.

At box 1824, as a result of determining that the server system has received an indication that the charge request has been successful or an indication that the charge request has been cancelled, the server system sends, for receipt by the computing device, an indication that purchase of the product has been successful or has been cancelled. For example, the market server system 1010 may send for receipt by the market application 1050 an indication that the request to purchase the product has been cancelled. The market server system 1010 may, alternatively, send for receipt by the market application 1050 an indication that the request to purchase the product has been successful. The indication that the charge request has been successful or has been cancelled may be the "Purchase State Changed" response that is described with reference to boxes 1269 and 1270.

At box 1826, the computing device receives the indication that the charge request was successful or the indication that the charge request was cancelled. For example, the computing device 1040 may perform the operations of box 1270.

At box 1828, as a result of determining that the server system has not received an indication that the charge request has been successful or an indication that the charge request has been cancelled, the server system determines whether to preemptively cancel the charge request. The determination whether the server system should preemptively cancel the charge request may account for the same or similar factors as the determination for the length of time for which to delay (as described with reference to box 1810). Indeed, the determination whether to preemptively cancel the charge request may be a determination of a time for which to delay, as described with reference to box 1810. A determination of a zero, or near zero, delay may be recognized by the server system as a determination to preemptively cancel the charge request.

At box 1828, as a result of determining to cancel the charge request (e.g., as a result of a determination that a delay for a "0" length of time should be instituted), the server system sends, for receipt by the transaction processing system, a request to cancel the charge request.

At box 1830, the transaction processing system receives the request to cancel the charge request and performs operations to cancel the charge request (e.g., by sending a request to entity 1032 to cancel the charge request).

At box 1828, as a result of determining to either cancel the charge request or to not cancel the charge request, the server system performs the operations of box 1810 (in some implementations, the operations of box 1810 are performed as part of the determination whether to preemptively cancel the charge request, see box 1828). At box 1828, the server system may determine another, subsequent length of time for which to delay. The subsequent length of time may be different than the length of time of the previous delay, and may be determined based on various factors, as described with reference to FIG. 19.

The determination of the subsequent length of time for which to delay may account for factors that are different than the factors accounted for in the determination of the previous length of time. For example, additional information may have been received after the previously determined length of time was determined. Indeed, the previously determined length of time may be a predetermined and standard length of time that is used as an initial delay for multiple or all requests to purchase products. The subsequently determined length of time may be based on the aforementioned factors.

The server system and the computing device may repeat the operations of boxes 1812, 1814, 1816, and 1818 in order to institute a delay for the subsequently determined length of time. At box 1820, the server system may determine whether, during the subsequent delay, the indication that the charge request has been successful or has been cancelled has been received. At box 1828, the server system may again determine whether to preemptively cancel the charge request. This repetitive process may continue until the server system receives an indication that the charge request has been successful or has been cancelled and, as a result, the server system performs the operations of box 1824.

In some implementations, the server system requests that the computing device measure the delay because the server system does not maintain a thread of execution for measuring the delay. Rather, the server system may have a limited quantity of threads that it can execute simultaneously (e.g., several dozen), yet the server system may be configured to simultaneously manage hundreds of purchasing requests. As such, the server system may request that individual computing devices measure delays for their respective purchasing requests. Such client-side measurement of delays permits the server system to process purchasing requests for more computing device than if the server system measured delays itself. The server system may terminate a thread of execution for the received purchasing request after performing the operations of box 1812, and may invoke the thread of execution upon receiving the indication that the delay has expired (box 1820).

In some implementations, the request to purchase the product does not have to be initiated by user selection of an interface element that is provided by a third-party application. In some implementations, the request to purchase the product does not have to specify a product that is used by a third-party application program. In other words, the request to purchase the product need not specify a product and need not specify an in-app product. Rather, the computing device may request that a server system perform a particular action, as a result the server system may request that another system perform a related action, and the server system may communicate, to the computing device, a length of time for which the computing device is to maintain a delay on behalf of the server system. The other system, upon determining that the related action has been successful or has been cancelled, may send an indication that the related action has been successful or has been cancelled for receipt by the server system. At box 1820, the server system may determine whether the related action has been successful or has been cancelled.

Figure 19:
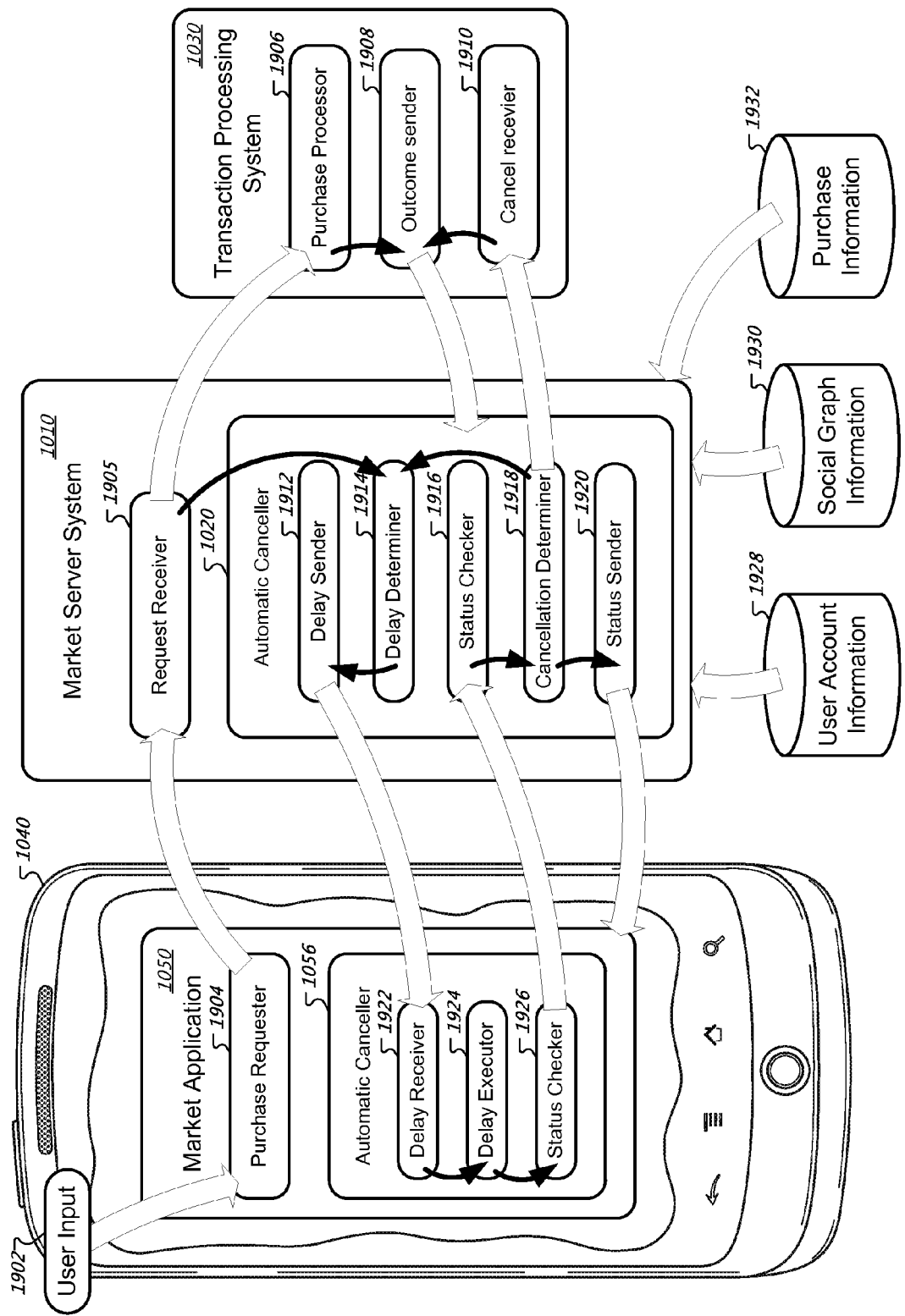
FIG. 19 shows a schematic diagram of a system that is configured to cancel a purchasing request.

FIG. 19 shows a schematic diagram of a system that is configured to cancel a purchasing request. The system may implement the process described with reference to FIG. 18 using a user computing device 1040, a market server system 1010, and a transaction processing system 1030.

For example, the market application 1050 on the computing device 1040 may receive user input 1902 that selects a user interface element for initiating purchase of a product. The user interface element may be displayed at request of a third-party application program. For example, the third-party application program may include instructions that, when executed by a computer processor, cause the computing device 1040 to display the interface element. A purchase requester component 1904 of the market application 1050 may, in response to identifying receipt of the user input 1902, send a request to purchase a product to the request receiver component 1020 of the market server system 1010. The purchase requester 1904 may perform the operations of box 1802.

The request receiver component 1905 of the market server system 1010 may be configured to perform the operations of boxes 1804 and 1806. For example, the request receiver 1905 may receive the purchasing request from the market application 1050, and, as a result: (i) send a charge request to the purchase processor component 1906 of the transaction processing system 1030, and (ii) request that the automatic canceller 1020 institute a delay, upon termination of which the market server system 1010 is to check whether the user has been charged for the product. The market server system 1010 may be configured to not check whether the user has been charged for the product during the delay.

The delay determiner 1914 is configured to perform the operations of box 1810 to determine a length of a delay, upon termination of which the market server system 1010 is configured to check whether the user has been charged for the product. The determination of the length of the delay may be performed in various manners. In some examples, the length of the delay is predetermined and may be the same regardless of the product that is specified by the purchasing request. Purchase of a particular product at the request of a user may include two delays, and these two delays may be for different lengths of time. For example, an initially determined delay may be different than a subsequently determined delay (e.g., the initial delay may be five seconds and the subsequent delay may be twenty seconds).

In some examples, the length of the delay is determined by analyzing user account information 1928. For example, the user account information may specify a date at which the account was created. The date may be used in the calculation of the delay. The calculation may result in a short delay if the account was recently created, for example, because the account may be more likely to have been automatically generated by a computer program for generating fraudulent purchasing requests. The user account information 1928 may specify demographic information regarding the user of the computing device 1040. The demographic information may be used in a calculation that varies the length of the delay. For example, the delay may calculated to be longer for users that are men between the ages of twenty-four and thirty than for users that are women between the ages of eighteen to twenty-three, because such men may have been determined to be less likely to purchase another in-app product after a cancelled purchasing request.

In some examples, the length of the delay is determined using social graph information 1930. The social graph information 1930 may specify relationships between various users, and certain of the users that have been determined to have made fraudulent purchases. A relationship between two users of the social graph may exist if one of the users sent an invitation to the other of the two users to create an account, or if one of the two users agreed to "follow" the other user's posts on a social networking service. The delay determiner 1914 may determine that a short delay is more appropriate than a long delay if the user of the computing device 1040 has formed relationships with an excessive level of users that are associated with fraudulent activity. As such, the market server system 1010 may be configured to waste less computational resources on purchasing requests that are likely to be associated with fraud. The market server system 1010 may also avoid having to pay a developer of a product for a fraudulent purchase for which an administrator of the market server system 1010 is not compensated.

In some examples, the length of the delay is determined based on an analysis of information that specifies characteristics of past purchases by the user of the computing device 1040. Should the user rarely purchase in-app products and suddenly begin to frequently purchase in-app products, the delay determiner 1914 may determine that the length of the delay should be short because the purchase may be fraudulent. Moreover, if the present purchasing request is for a product that costs significantly more than previously purchased products, the delay determiner 1914 may determine that a short delay is appropriate.

The delay determiner 1914 sends the determined length of the delay to the delay sender 1912, which is configured to perform the operations of box 1812. For example, the delay sender 1912 sends, for receipt by the delay receiver 1922, a request that the computing device 1040 execute a delay for the determined length of time.

The delay receiver 1922 is configured to perform the operations of box 1814.

The delay executor 1924 is configured to perform the operations of box 1816. For example, the delay executor 1924 may execute a process that counts clock cycles until a quantity of clock cycles specified by the determined length of the delay has lapsed, at which time the computing device 1040 generates a timing interrupt.

The status checker 1926 is configured to perform the operations of box 1818. For example, the status checker 1926 may send to the status checker 1916, as a result of the computing device 1040 generating the timing interrupt, a request that the status checker 1916 determine whether the charge request has been successful or has been cancelled.

The status checker 1916 is configured to perform the operations of box 1820. For example, the status checker may determine whether the outcome sender 1908 of the transaction processing system 1030 has sent an outcome of the charge request to the market server system 1010 (e.g., an indication that the charge request has been successful or has been cancelled).

If the status checker 1916 determines that the market server system 1010 has received an outcome of the change request from the transaction processing system 1030, the status checker 1916 is configured to request that the status sender 1920 perform the operations of box 1824 to send an indication of the outcome to the computing device 1040 (e.g., an indication that the product has been purchased or an indication that purchase of the product has been cancelled).

If the status checker 1916 determines that the market server system 1010 has not received an outcome of the change request from the transaction processing system 1030, the status checker 1916 is configured to prompt the cancellation determiner 1918 to determine whether to cancel the charge request. The cancellation determiner 1918 is configured to perform the operations of box 1828. For example, the cancellation determiner 1918 may request that the delay determiner 1914 generate another length of time for which the computing device 1040 should delay. If the length of time is zero or substantially near zero (e.g., within a quarter of a second of zero), the cancellation determiner 1918 may be configured to cancel the purchase.

The purchase can be cancelled by requesting that the status sender 1920 send an indication that the purchase is cancelled to both the transaction processing system 1030 and to the market application 1050. The indications that the purchase is cancelled may be sent before the market server system 1010 receives, from the transaction processing system 1030, an indication that the transaction processing system has either cancelled the charge request or an indication that the charge request has been successful.

If the length of time for which to delay is not zero or substantially near zero, the cancellation determiner 1918 may be configured to request that the determined length of the delay is sent by the delay sender 1912 to the delay receiver 1922, so as to invoke another delay. Even if the cancellation determiner 1918 has determined to cancel the charge request, the cancellation determiner 1918 may be configured to request that a determined length of the delay (e.g., a default length of delay that follows a request to cancel the charge request) is sent by the delay sender 1912 to the delay receiver 1922. Accordingly, the status checker 1916 of the market server system 1010 may periodically check for a change in status of the charge request. The market server system 1010 may not send, to the computing device 1040, an indication that purchase of the product has been cancelled until the market server system 1010 receives, from the outcome sender 1908, confirmation that the charge request has been cancelled.

In other words, the market application 1050 may send for receipt by the transaction processing system 1030 a request to cancel the charge request, the transaction processing system 1030 may send for receipt by the market application 1050, an indication that the charge request has been cancelled, and thereafter the market application 1050 may send the indication that the purchase has been cancelled for receipt by the computing device 1040.

Eventually, the outcome sender 1908 may send, for receipt by the market server system 1010, an indication that the charge request was successful or was cancelled (either at the initiative of the transaction processing system 1030 or at the initiative of the market server system 1010). Thereafter, the status sender 1920 may be configured to send, for receipt by the computing device 1040, the indication that the purchase was successful or was cancelled.

Verifying Legitimacy of a Purchasing Request

Figure 20A:
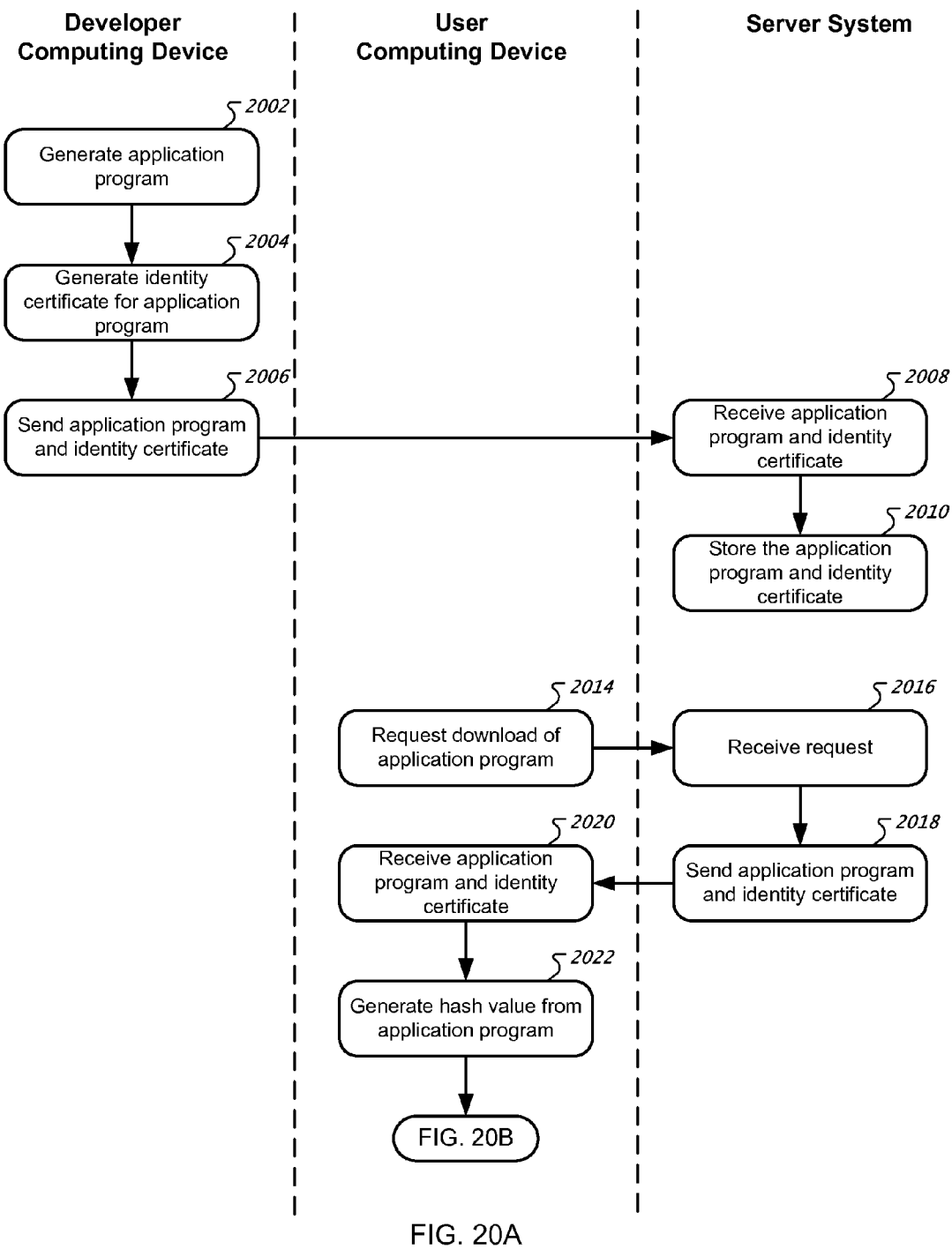
FIGS. 20A-C show a diagram of an example process for verifying that a request for purchasing a product is legitimate.
Figure 20B:
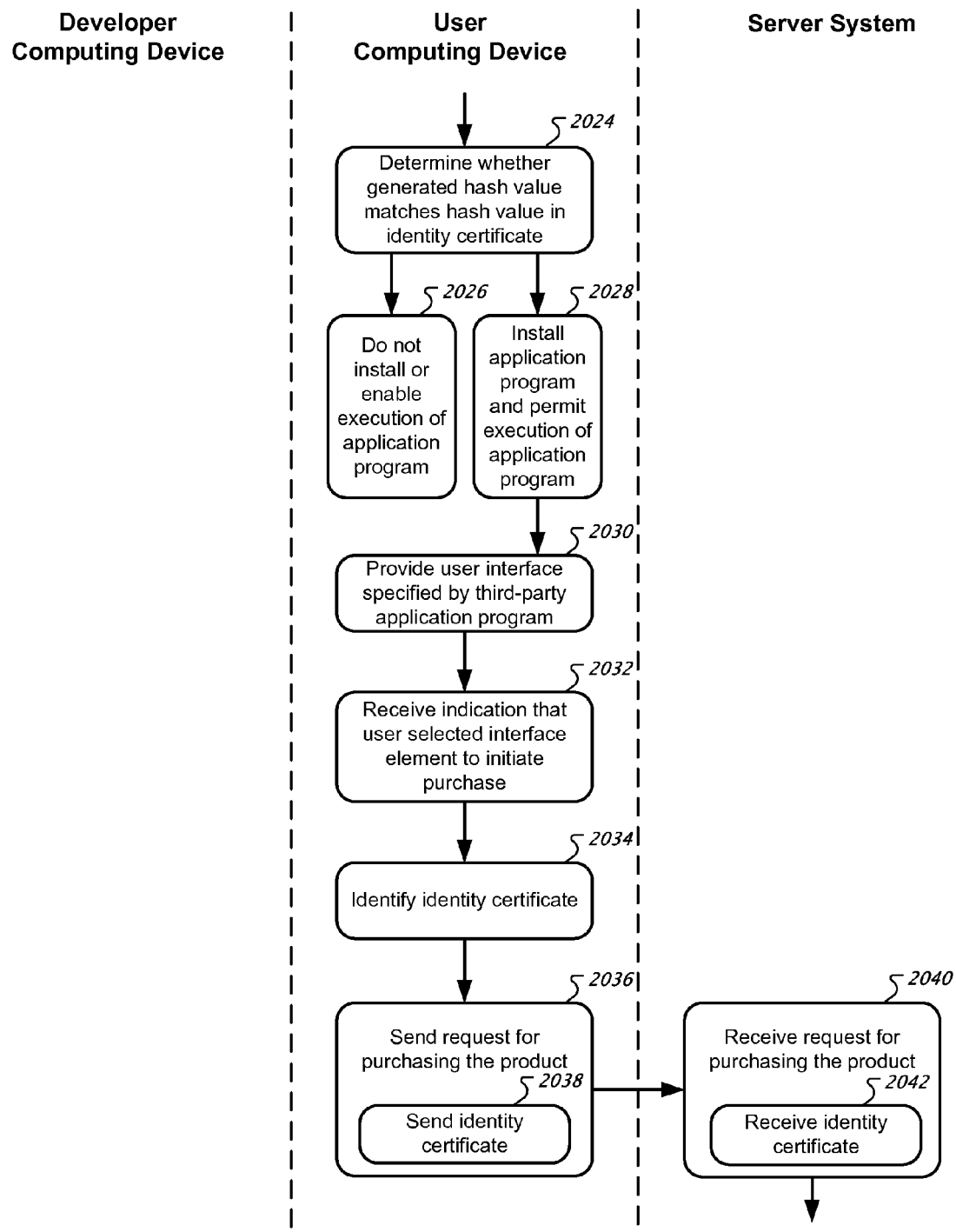
Figure 20C:
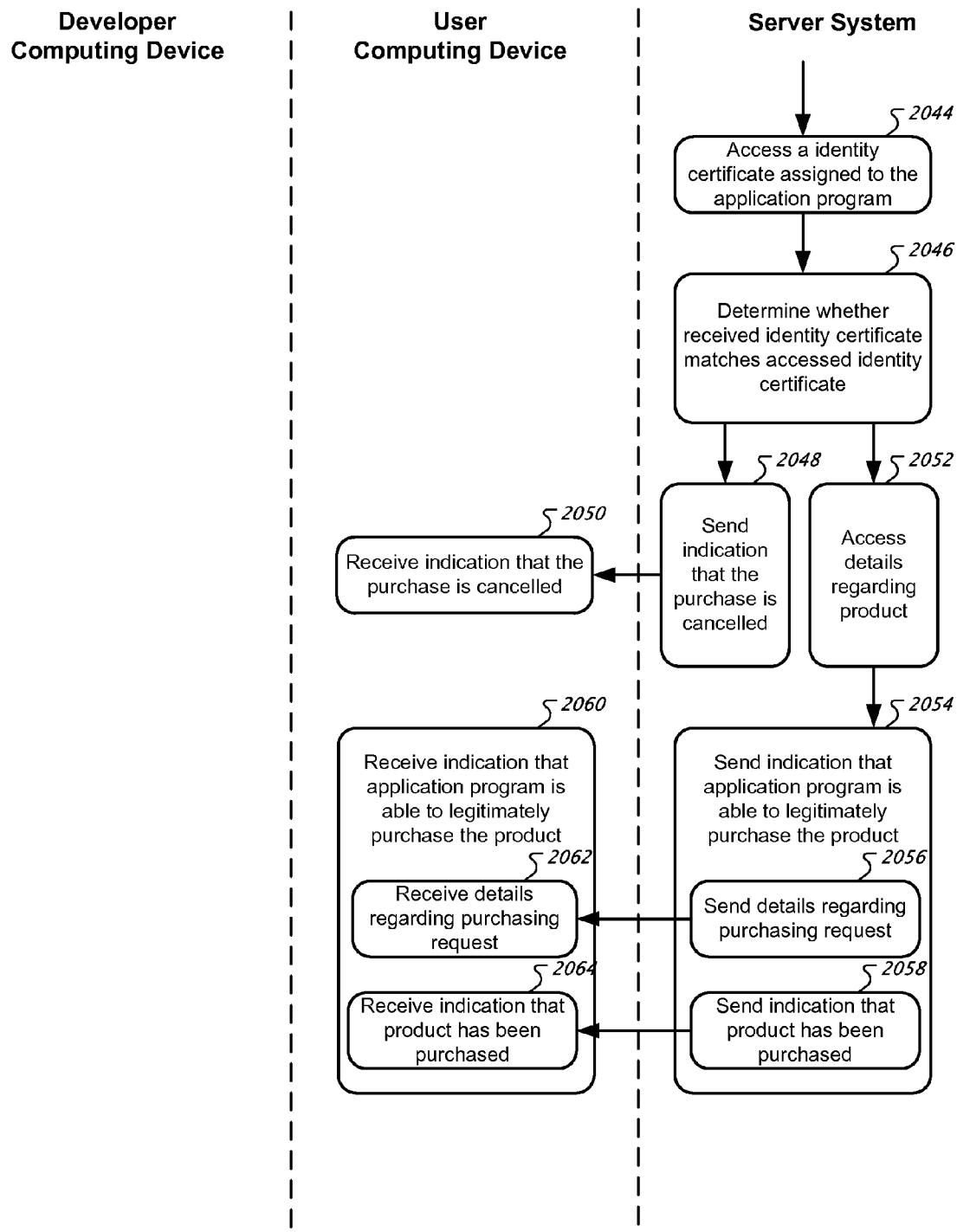

FIGS. 20A-C show an example process for verifying that a request for purchasing a product is legitimate. The process supplements portions of the process described with reference to FIGS. 12A-H and may be performed, at least in part, by the user computing device 1040 and the market server system 1010.

At box 2002, a developer computing device generates an application program. For example, an entity that develops an application program may type computer code into the developer computing device, compile the computer code into a working application program on the developer computing device, or transfer a compiled application program to the developer computing device.

At box 2004, the developer computing device generates an identity certificate for the application program. For example, a developer user of the developer computing device may provide input that causes a program to generate a pair of cryptographic keys (e.g., a public cryptographic key and its corresponding and mathematically linked private cryptographic key), and may then provide input that causes another program to sign the application program with the private cryptographic key. As an example, the developer may provide input that causes execution of the JAVA Keytool command so as to cause the developer computing device to generate the pair of cryptographic keys. The developer may then provide input that causes execution of a program that compiles the application program into an application package. An application package is a group of one or more installation files for the application program. Discussion in this document regarding an application program refers to both the installation files for an application program and the application program as installed on a user's computing device.

The developer may provide input that causes execution of another command (e.g., the Jarsigner command) that results in the computing device signing the application package with an identity certificate. References herein to a signed application program signifies an application package that includes an identity certificate. The identity certificate included in the application package can be used by a computing system to verify an identity of a developer of the application program.

An identity certificate may include text that has been encoded (also referred to as encrypted) using the private key of the cryptographic key pair. The text can include, for example, a name of the developer (e.g., a developer identifier), a street address of the developer, a name of the application program (e.g., an application identifier), and a cryptographic hash value. The cryptographic hash value may have been generated by performing a cryptographic hash function on the application program (e.g., the one or more installation files in the application package). A cryptographic hash function may be a deterministic procedure that receives data and outputs a string. The hash function is configured such that the use of different input data results in a different output strings. A hash value is also known in the art as a message digest or a digest.

The developer name, developer street address, name of the application program, and the hash value for the application program may be encoded using the private key. The resulting encoded document may be the identity certificate. The public key may be included in the identity certificate, although, in some examples, the public key is not signed with the private key and remains unencrypted and available for use to decrypt the identity certificate. Because the public key corresponds to the private key that was used to encode the identity certificate, the public key may be used to decode the identity certificate and extract the text (e.g., the developer name, developer street address, name of the application program, and the hash value).

At box 2006, the developer computing device sends the application program and the identity certificate for receipt by a server system. For example, the developer may access the distribution platform publisher web page that is shown in FIG. 1 and select the "Upload New Application" interface element 119. As a result, the distribution platform developer site may display a user interface that enables the developer to select the application package from multiple files on the developer computing device. Upon selection of the application package, the developer computing device may send the application package for receipt by the market server system

1010. The application package may include installation files for the application program and the identity certificate.

At box 2008, the server system receives the third-party application program and the identity certificate. For example, the server system may receive the application package.

At box 2010, the server system stores the third-party application program and the received identity certificate. The third-party application program and the received identity certificate may be stored for subsequent access. The server system may assign the received identity certificate to the third-party application program. For example, the market server system 1010 may save the application package in computer-readable memory, and may extract the identity certificate from the application package. The market server system 1010 may store the identity certificate in association with an identifier for the application program. As such, at a later point in time the market server system 1010 may be able to quickly access the identity certificate by supplying the identifier for the application program to a lookup table or a database.

At box 2014, the user computing device requests download of the application program. As described herein, requesting download of an application program may include requesting transfer of the application program to the computing device, or requesting installation of the application program. For example, and as described throughout this document, a user of the computing device 1040 may browse an application marketplace and select an application program for installation. In response, the computing device 1040 may send a request to the market server system 1010 to provide the application program to the computing device 1040 or another device. For example, a user of computing device 400 may select, on a web page provided by the application marketplace, a user interface element associated with installation of the "Local Bike Maps" third-party application program.

At box 2016, the server system receives the request to download the application program. For example, the market server system 1010 may receive the request to provide the computing device 400 with the "Local Bike Maps" application program.

At box 2018, the server system initiates sending of the third party application program. For example, the market server system 1010 may receive the request to download the application program, and either: (i) send the application package for receipt by the computing device, or (ii) request that another system send the application package for receipt by the computing device. The application package that is sent for receipt by the computing device may be the application package that was stored at box 2010. As discussed throughout this document, the sent application package may include one or more files for installing the application program and an identify certificate for the application program.

At box 2020, the computing device receives, as a result of the computing device sending the request to download the third-party application program: (i) the third-party application program (e.g., one or more installation files for the third-party application program), and (ii) a first identity certificate for the third-party application program. For example, the computing device 1040 may receive the application package, which includes both of these elements.

At box 2022, the computing device generates a cryptographic hash value from the third-party application program. For example, the computing device may apply the cryptographic hash function on the application program (e.g., the one or more installation files of the application program). The cryptographic hash function may receive the one or more installation files as input and may output the generated hash value.

The program on the computing device that manages identity certificates and thus generates the cryptographic hash value, or requests generation of the cryptographic hash value, may be a secure system level service that is different than the market application 1050, and that is not one of the third-party applications (e.g., a third-party application downloaded from the market server system 1010). The secure system level service may assign identity certificates to application programs, and may not change an assignment between an identity certificate and an application program unless the application program is changed or reinstalled, and the system level service verifies that the identity certificate (old or new) is valid for the changed application program, as described herein by matching hash values. Third-party application programs may not be able to change the assignments by the secure system level service.

At box 2024, the computing device determines whether the generated cryptographic hash value matches the cryptographic hash value in the received identity certificate. The computing device may have to decode the identity certificate to access the cryptographic hash value in the received identity certificate. For example, the secure system level service may perform a decoding procedure on the identity certificate using the public key that was received with the third-party application program (and that may have been included in a part of the certificate that was not encrypted with the private key). After the cryptographic hash value has been extracted from the received identity certificate, the secure system level service may compare the extracted hash value to the generated hash value to determine whether the hash values match or do not match. Hash values may match if the hash values are identical, and may not match if the hash values are not identical.

At box 2026, as a result of a determination that the generated hash value does not match the hash value in the received identity certificate, the user computing device prevents installation of the third-party application program, or prevents execution of the third-party application program. For example, the operating system executed by the computing device or a component thereof (e.g., the secure system level service) may not permit the third-party application program to install or execute.

At box 2028, as a result of a determination that the generated hash value matches the hash value in the received identity certificate, the user computing device enables installation of the third-party application program or enables execution of the third-party application program. For example, the operating system may install the application program and place, on a desktop display or other user interface of the computing device, a user interface icon with which a user can launch the application program.

Upon installation of the third-party application program, the computing device may store the received identity certificate in association with an identifier for the third-party application program. For example, the secure system level service may store the received identity certificate in storage that is not accessible to the market application 1050 or any of the third-party application programs. As such, the secure system level service may assign the received identity certificate to the third-party application program for later access with reference to the identifier for the third-party application program.

In some examples, the computing device may be configured to prevent reinstallation or modification to the third-party application program without changing the first identity certificate and verifying that the hash value in the changed first identity certificate matches a hash value generated from the reinstalled or modified third-party application program. In other words, without a user "rooting" or otherwise hacking the operating system of the computing device, an application program may not be reinstalled without the computing device performing the operations of boxes 2020, 2022, and 2024 to ensure that the identity certificate assigned to the third-party application program is valid. Rather, the secure system level service may manage access to the identity certificates and ensure than an installed third-party application program has a corresponding identity certificate that is valid for the installed third-party application program.

At box 2030, the computing device provides a user interface that is specified by instructions of the third-party application program. For example, the computing device may perform the operations of box 1201 to provide the user interface 402 (as shown in FIG. 4). The instructions of the third-party application program may be instructions included in files that are assigned to the third-party application program and that may have been downloaded from an application marketplace in response to a request by a user to download the application program.

The user interface may include an interface element that initiates purchase of a product when selected by a user, for example, interface element 406. But for selection of the interface element 406, a process for purchasing the product may not occur. The product may be a digital product for use by the third-party application program in another user interface specified by instructions of the third-party application program. For example, the product may be digital code that generates a display of a local bike map as a result of the user of the computing device 400 selecting the "Portland" interface element 904 (see FIG. 9).

At box 2032, the computing device receives an indication that the user has selected the interface element. For example, the computing device may perform the operations of box 1202.

At box 2034, the computing device may identify an identity certificate that is assigned to the third-party application program. For example, the selected user interface element may be associated with code that includes an identifier for the third-party application program which is to be purchased. The computing device may use the identifier to retrieve the identity certificate previously assigned to the third-party application program from among multiple identity certificates that the computing device assigns to multiple respective third-party application programs. For example, market application 1050 may provide the identifier for the third-party application program to the secure system level service, and the secure system level service may, in return, provide the market application 1050 with the identity certificate that was assigned to the third-party application program. The identity certificate for the third-party application program. The identity certificate for the third-party application program may have been stored by the secure system level service in a secure system location. The market application may be unable to access the identity certificate at the secure system location, but may be able to request that the secure level service retrieve the identity certificate from the secure system location.

At box 2036, the computing device sends a request for purchasing the product. The request for purchasing the product may or may not be a request confirming that a remote system purchase the product. The request for purchasing the product may be a request that is part of a series of communications related to purchase of the product. For example, the request for purchasing the product may be a request, by the market application 1050, for details of the purchasing GUI as described with reference to box 1211. The request for purchasing the product may include the identity certificate (box 2038). For example, the request for purchasing the product may include the identity certificate as a parameter or may include an identifier that references the identity certificate. The request for purchasing the product may have been triggered by the third-party application 1060 sending, for receipt by the market application 1050, a "Request_Purchase" request, as described with reference to boxes 1203, 1204, 1205, 1208, and 1211 (see FIGS. 12A-B).

At box 2040, the server system receives the request for purchasing the product. For example, the market server system 1010 performs at least some of the operations of box 1212 to receive the request for details of the purchasing user interface. The received request for purchasing the product may include the identity certificate (box 2042).

At box 2044, the server system accesses an identity certificate that the server system assigned to the third-party application program before the server system received the request for purchasing the product. For example, the received request for purchasing the product may include an identifier for the third-party application program, and the market server system 1010 may use the identifier in a database or table lookup procedure to access the identity certificate that the server system 1010, at box 2010, assigned to the third-party application program.

At box 2046, the server system determines whether the received identity certificate matches the accessed identity certificate. In some examples, the server system may determine that the identity certificates match if the identity certificates are identical. In some examples, the server system may determine that the identity certificates match if the identity certificates are able to be decoded using the same public cryptographic key (which indicates that the identity certificates were encoded using the same private cryptographic key).

At box 2048, in response to a determination that the received identity certificate does not match the accessed identity certificate, the server system sends an indication that purchase of the product has been cancelled. For example, the market server system 1010 may (at box 1212) send to the market application 1050 an indication that the "Request Purchase" request has been cancelled (e.g., that communications for purchasing the product will not result in purchase of the product).

At box 2050, the computing device may receive the indication that the purchase is cancelled. As a result, the computing device may not display the dialog box 504 (see FIG. 5), and rather may rather continue to display user interface 402 (see FIG. 4). The user interface 402 may include an indication that the purchase was cancelled.

At box 2052, in response to a determination that the received identity certificate matches the accessed identity certificate, the server system accesses details regarding the product. For example, the market server system 1010 may perform the operations of boxes 1212, 1213, and 1216 to identity in-app item details that are either stored at the market server system 1010 or at a remote system (e.g., the transaction processing system 1030).

At box 2054, the server system sends an indication that the third-party application program is able to legitimately purchase the product. As an example, the market server system 1010 may perform the operations of box 1216 to send the accessed details (box 2056). As another example, the market server system 1010 may perform the operations of box 1269 to send an indication that the product has been purchased (box 2058).

At box 2060, the computing device receives the indication that the third-party application program is able to legitimately purchase the product. As an example of an indication that the third-party application program is able to legitimately purchase the product, the market application 1050 may perform the operations of box 1217 to receive the accessed details (box 2062). The accessed details may not have been stored by the computing device after sending the request for purchasing the product and before receiving the accessed details from the market server system. As another example of an indication that the third-party application program is able to legitimately purchase the product, the market server system 1010 may perform the operations of box 1270. The computing device 1040 may receive the indication that the product has been purchased by performing the operations of boxes 1271, 1272, 1280, and 1282 (box 2064).

As discussed herein, an indication that a third-party application program is able to legitimately purchase a product is not limited to a communication that includes data that specifically identifies whether or not the third-party application program is able to legitimately purchase the product (e.g., such as a flag or a variable). Rather, the indication may be a communication that, when received by the computing device 1040, causes the computing device 1040 to continue with a process for purchasing a product. The continued process for purchasing the product may include displaying a subsequent user interface for purchasing the product (e.g., dialog box 504, see FIG. 4), or may include displaying a user interface that indicates that the product has been purchased (e.g., user interface 902, see FIG. 9).

The market server system 1010 may require that uploaded third-party application programs are signed with identity certificates. Signing third-party application programs with identity certificates allows developers to know that their application is provided, unmodified, to each user's computing device. Further, an administrator of the market server system 1010 is able to hold developers accountable for improperly functioning application programs.

A signed identity certificate may define which user identity is associated with which application. An application may not be able to access another application that is associated with a different user identity except through defined inter-process communication calls. In some implementations, developers may self-sign their application programs, and the application programs do not have to be signed by a central authority. Self-signing provides the benefits described herein without the monetary costs sometimes required by a central authority.

A developer may sign multiple of the developer's different application programs using the same private key. A first benefit to signing multiple application programs with the same private key is that an end user's computing device may be configured to only allow installation of an update to an application program if the update has an identity certificate that matches an identity certificate of the previously-installed application program (e.g., because both identity certificates can be decoded using the same public key). If the identity certificates match, the end user's computing device permits the update.

A second benefit to signing multiple application programs with the same private key is an ability to provide application modularity. An end user's computing device may enable application programs that are signed with the same public key to run in the same process. In this way, a developer is able to deploy an application program in modules, and the end user's computing device is able to update each of the modules independently.

A third benefit to signing multiple of the developer's application programs with the same private key is to enable code and data sharing among the developer's application programs. An application program that is signed with a particular private key is able to expose functionality to another application program that is signed with the same private key. As such, permissions to share code and data among two or more application programs are based on the identity certificates for the two or more application programs being able to be decoded with a same public key.

Figure 21:
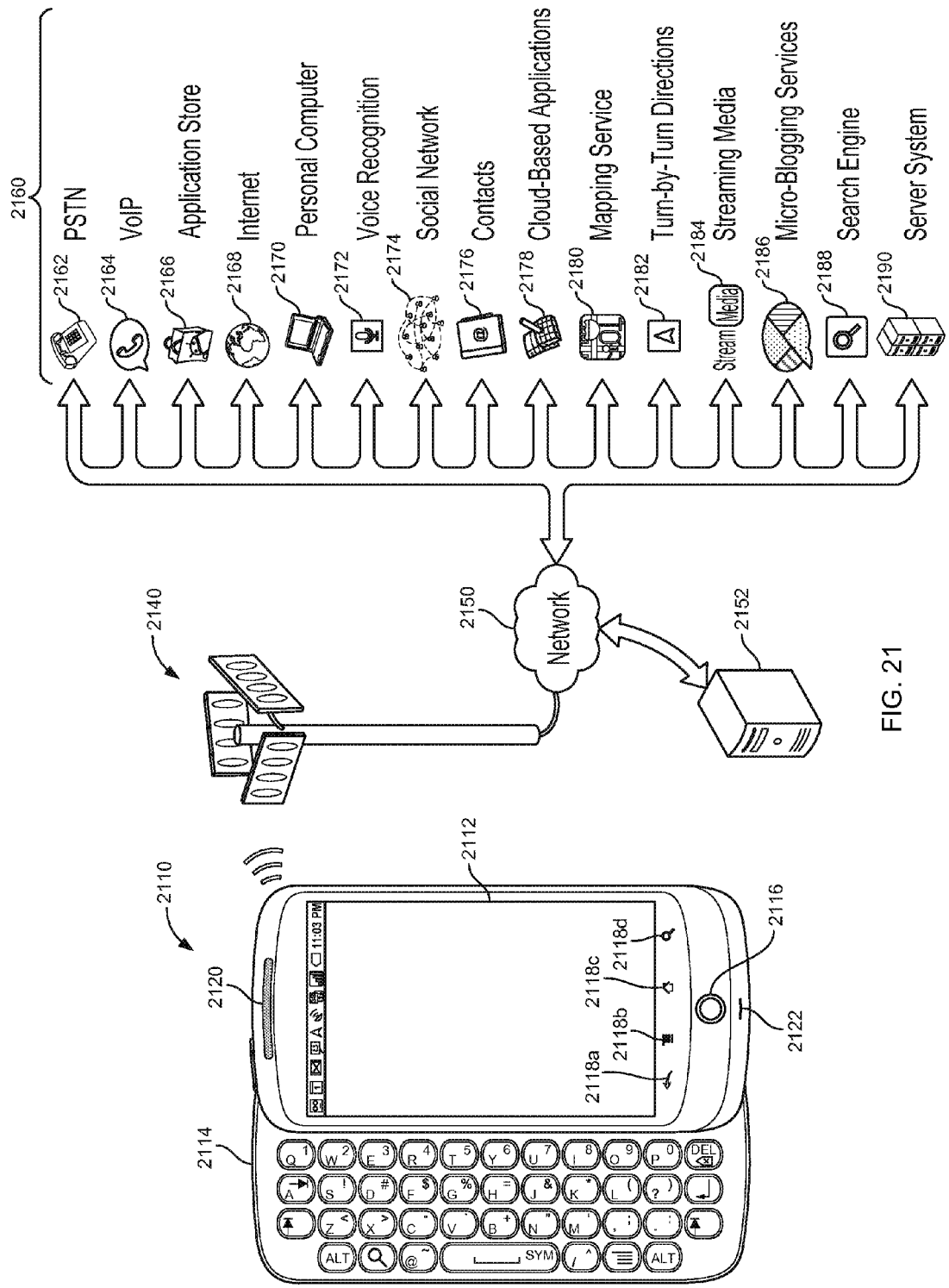
FIG. 21 is a conceptual diagram of a system that may be used to implement the systems and methods described in this document.

Referring now to FIG. 21, a conceptual diagram of a system that may be used to implement the systems and methods described in this document is illustrated. In the system, mobile computing device 2110 can wirelessly communicate with base station 2140, which can provide the mobile computing device wireless access to numerous hosted services 2160 through a network 2150.

In this illustration, the mobile computing device 2110 is depicted as a handheld mobile telephone (e.g., a smartphone, or an application telephone) that includes a touchscreen display device 2112 for presenting content to a user of the mobile computing device 2110 and receiving touch-based user inputs. Other visual, tactile, and auditory output components may also be provided (e.g., LED lights, a vibrating mechanism for tactile output, or a speaker for providing tonal, voice-generated, or recorded output), as may various different input components (e.g., keyboard 2114, physical buttons, trackballs, accelerometers, gyroscopes, and magnetometers).

Example visual output mechanism in the form of display device 2112 may take the form of a display with resistive or capacitive touch capabilities. The display device may be for displaying video, graphics, images, and text, and for coordinating user touch input locations with the location of displayed information so that the device 2110 can associate user contact at a location of a displayed item with the item. The mobile computing device 2110 may also take alternative forms, including as a laptop computer, a tablet or slate computer, a personal digital assistant, an embedded system (e.g., a car navigation system), a desktop personal computer, or a computerized workstation.

An example mechanism for receiving user-input includes keyboard 2114, which may be a full qwerty keyboard or a traditional keypad that includes keys for the digits '0-9', '*', and '#.' The keyboard 2114 receives input when a user physically contacts or depresses a keyboard key. User manipulation of a trackball 2116 or interaction with a track pad enables the user to supply directional and rate of movement information to the mobile computing device 2110 (e.g., to manipulate a position of a cursor on the display device 2112).

The mobile computing device 2110 may be able to determine a position of physical contact with the touchscreen display device 2112 (e.g., a position of contact by a finger or a stylus). Using the touchscreen 2112, various "virtual" input mechanisms may be produced, where a user interacts with a graphical user interface element depicted on the touchscreen 2112 by contacting the graphical user interface element. An example of a "virtual" input mechanism is a "software keyboard," where a keyboard is displayed on the touchscreen and a user selects keys by pressing a region of the touchscreen 2112 that corresponds to each key.

The mobile computing device 2110 may include mechanical or touch sensitive buttons 2118*a-d*. Additionally, the mobile computing device may include buttons for adjusting volume output by the one or more speakers 2120, and a button for turning the mobile computing device on or off. A microphone 2122 allows the mobile computing device 2110 to convert audible sounds into an electrical signal that may be digitally encoded and stored in computer-readable memory, or transmitted to another computing device. The mobile computing device 2110 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include ANDROID, CHROME OS, IOS, MAC OS X, WINDOWS 7, WINDOWS PHONE 7, SYMBIAN, BLACKBERRY, WEBOS, a variety of UNIX operating systems; or a proprietary operating system for computerized devices. The operating system may provide a platform for the execution of application programs that facilitate interaction between the computing device and a user.

The mobile computing device 2110 may present a graphical user interface with the touchscreen 2112. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 2104. User-selection of the button may invoke the pre-defined action.

In some examples, the operating system provides a "desktop" graphical user interface that is displayed after turning on the mobile computing device 2110, after activating the mobile computing device 2110 from a sleep state, after "unlocking" the mobile computing device 2110, or after receiving user-selection of the "home" button 2118c. The desktop graphical user interface may display several graphical interface elements that, when selected, invoke corresponding application programs. An invoked application program may present a graphical interface that replaces the desktop graphical user interface until the application program terminates or is hidden from view.

User-input may influence an executing sequence of mobile computing device 2110 operations. For example, a single-action user input (e.g., a single tap of the touchscreen, swipe across the touchscreen, contact with a button, or combination of these occurring at a same time) may invoke an operation that changes a display of the user interface. Without the user-input, the user interface may not have changed at a particular time. For example, a multi-touch user input with the touchscreen 2112 may invoke a mapping application to "zoom-in" on a location, even though the mapping application may have by default zoomed-in after several seconds.

The desktop graphical interface can also display "widgets." A widget is one or more graphical interface elements that are associated with an application program that is executing, and that display on the desktop content controlled by the executing application program. A widget's application program may launch as the mobile device turns on. Further, a widget may not take focus of the full display. Instead, a widget may only "own" a small portion of the desktop, displaying content and receiving touchscreen user-input within the portion of the desktop.

The mobile computing device 2110 may include one or more location-identification mechanisms. A location-identification mechanism may include a collection of hardware and software that provides the operating system and application programs an estimate of the mobile device's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by receiving user a "check in" to a location).

The mobile computing device 2110 may include other applications, computing sub-systems, and hardware. A call handling unit may receive an indication of an incoming telephone call and provide a user the capability to answer the incoming telephone call. A media player may allow a user to listen to music or play movies that are stored in local memory of the mobile computing device 2110. The mobile device 2110 may include a digital camera sensor, and corresponding image and video capture and editing software. An internet browser may enable the user to view content from a web page by typing in an addresses corresponding to the web page or selecting a link to the web page.

The mobile computing device 2110 may include an antenna to wirelessly communicate information with the base station 2140. The base station 2140 may be one of many base stations in a collection of base stations (e.g., a mobile telephone cellular network) that enables the mobile computing device 2110 to maintain communication with a network 2150 as the mobile computing device is geographically moved. The computing device 2110 may alternatively or additionally communicate with the network 2150 through a Wi-Fi router or a wired connection (e.g., ETHERNET, USB, or FIREWIRE). The computing device 2110 may also wirelessly communicate with other computing devices using BLUETOOTH protocols, or may employ an ad-hoc wireless network.

A service provider that operates the network of base stations may connect the mobile computing device 2110 to the network 2150 to enable communication between the mobile computing device 2110 and other computing systems that provide services 2160. Although the services 2160 may be provided over different networks (e.g., the service provider's internal network, the Public Switched Telephone Network, and the Internet), network 2150 is illustrated as a single network. The service provider may operate a server system 2152 that routes information packets and voice data between the mobile computing device 2110 and computing systems associated with the services 2160.

The network 2150 may connect the mobile computing device 2110 to the Public Switched Telephone Network (PSTN) 2162 in order to establish voice or fax communication between the mobile computing device 2110 and another computing device. For example, the service provider server system 2152 may receive an indication from the PSTN 2162 of an incoming call for the mobile computing device 2110. Conversely, the mobile computing device 2110 may send a communication to the service provider server system 2152 initiating a telephone call using a telephone number that is associated with a device accessible through the PSTN 2162.

The network 2150 may connect the mobile computing device 2110 with a Voice over Internet Protocol (VoIP) service 2164 that routes voice communications over an IP network, as opposed to the PSTN. For example, a user of the mobile computing device 2110 may invoke a VoIP application and initiate a call using the program. The service provider server system 2152 may forward voice data from the call to a VoIP service, which may route the call over the internet to a corresponding computing device, potentially using the PSTN for a final leg of the connection.

An application store 2166 may provide a user of the mobile computing device 2110 the ability to browse a list of remotely stored application programs that the user may download over the network 2150 and install on the mobile computing device 2110. The application store 2166 may serve as a repository of applications developed by third-party application developers. An application program that is installed on the mobile computing device 2110 may be able to communicate over the network 2150 with server systems that are designated for the application program. For example, a VoIP application program may be downloaded from the Application Store 2166, enabling the user to communicate with the VoIP service 2164.

The mobile computing device 2110 may access content on the internet 2168 through network 2150. For example, a user of the mobile computing device 2110 may invoke a web browser application that requests data from remote computing devices that are accessible at designated universal resource locations. In various examples, some of the services 2160 are accessible over the internet.

The mobile computing device may communicate with a personal computer 2170. For example, the personal computer 2170 may be the home computer for a user of the mobile computing device 2110. Thus, the user may be able to stream media from his personal computer 2170. The user may also view the file structure of his personal computer 2170, and transmit selected documents between the computerized devices.

A voice recognition service 2172 may receive voice communication data recorded with the mobile computing device's microphone 2122, and translate the voice communication into corresponding textual data. In some examples, the translated text is provided to a search engine as a web query, and responsive search engine search results are transmitted to the mobile computing device 2110.

The mobile computing device 2110 may communicate with a social network 2174. The social network may include numerous members, some of which have agreed to be related as acquaintances. Application programs on the mobile computing device 2110 may access the social network 2174 to retrieve information based on the acquaintances of the user of the mobile computing device. For example, an "address book" application program may retrieve telephone numbers for the user's acquaintances. In various examples, content may be delivered to the mobile computing device 2110 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 2110 may access a personal set of contacts 2176 through network 2150. Each contact may identify an individual and include information about that individual (e.g., a phone number, an email address, and a birthday). Because the set of contacts is hosted remotely to the mobile computing device 2110, the user may access and maintain the contacts 2176 across several devices as a common set of contacts.

The mobile computing device 2110 may access cloud-based application programs 2178. Cloud-computing provides application programs (e.g., a word processor or an email program) that are hosted remotely from the mobile computing device 2110, and may be accessed by the device 2110 using a web browser or a dedicated program. Example cloud-based application programs include GOOGLE DOCS word processor and spreadsheet service, GOOGLE GMAIL webmail service, and PICASA picture manager.

Mapping service 2180 can provide the mobile computing device 2110 with street maps, route planning information, and satellite images. An example mapping service is GOOGLE MAPS. The mapping service 2180 may also receive queries and return location-specific results. For example, the mobile computing device 2110 may send an estimated location of the mobile computing device and a user-entered query for "pizza places" to the mapping service 2180. The mapping service 2180 may return a street map with "markers" superimposed on the map that identify geographical locations of nearby "pizza places."

Turn-by-turn service 2182 may provide the mobile computing device 2110 with turn-by-turn directions to a user-supplied destination. For example, the turn-by-turn service 2182 may stream to device 2110 a street-level view of an estimated location of the device, along with data for providing audio commands and superimposing arrows that direct a user of the device 2110 to the destination.

Various forms of streaming media 2184 may be requested by the mobile computing device 2110. For example, computing device 2110 may request a stream for a pre-recorded video file, a live television program, or a live radio program. Example services that provide streaming media include YOUTUBE and PANDORA.

A micro-blogging service 2186 may receive from the mobile computing device 2110 a user-input post that does not identify recipients of the post. The micro-blogging service 2186 may disseminate the post to other members of the micro-blogging service 2186 that agreed to subscribe to the user.

A search engine 2188 may receive user-entered textual or verbal queries from the mobile computing device 2110, determine a set of internet-accessible documents that are responsive to the query, and provide to the device 2110 information to display a list of search results for the responsive documents. In examples where a verbal query is received, the voice recognition service 2172 may translate the received audio into a textual query that is sent to the search engine.

These and other services may be implemented in a server system 2190. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to," "as a result of," or "as a consequence of" another operation (e.g., a determination or an identification) are not performed if the prior operation is unsuccessful (e.g., if the determination was not performed). An operations that is performed "as a result of" another operation may have a "but for" causal relationship with the other operation, such that the operation may not have been performed "but for" performance of the other operation. Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Figure 22:
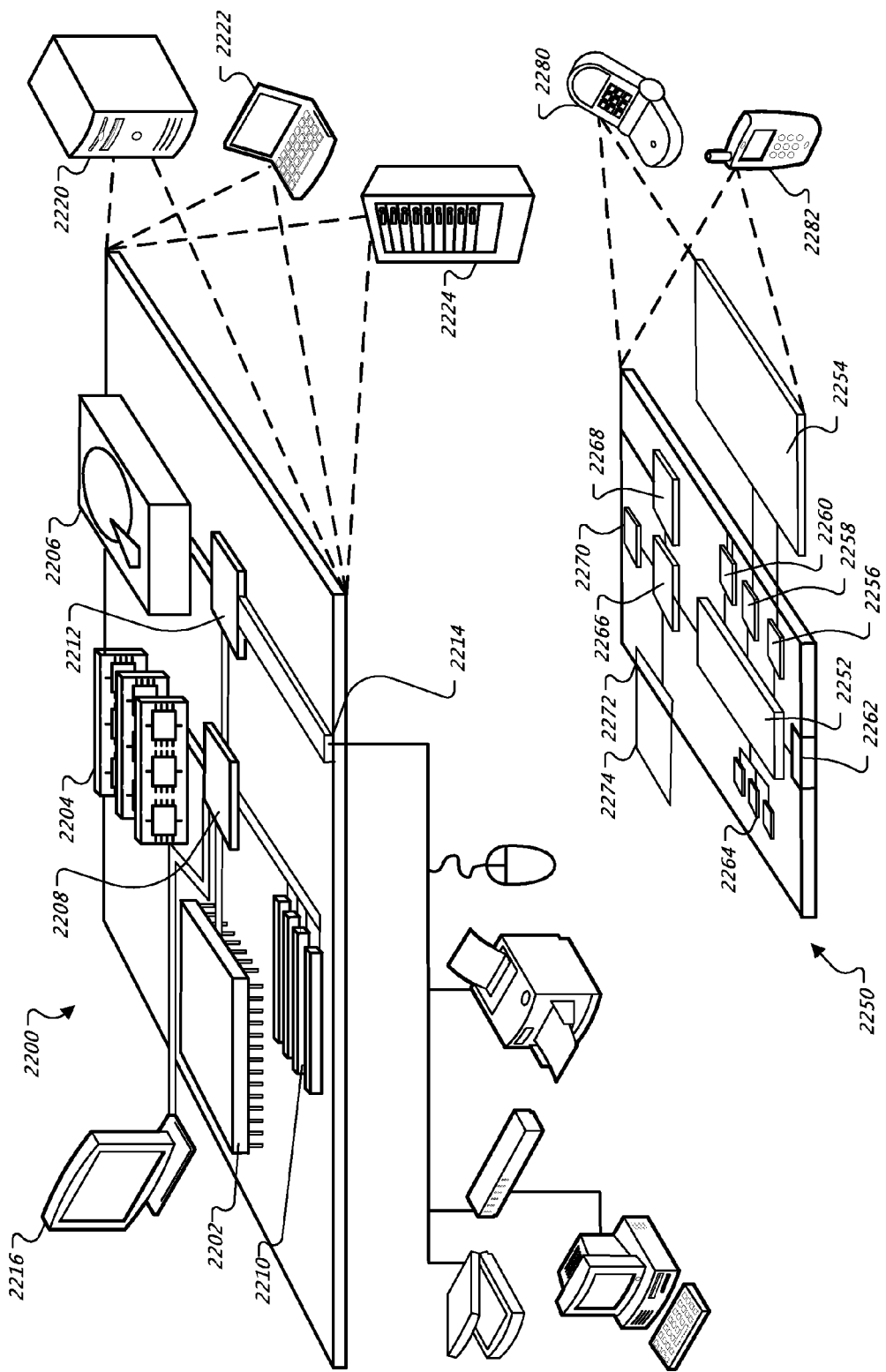
FIG. 22 is a block diagram of computing devices that may be used to implement the systems and methods described in this document, as either a client or as a server or plurality of servers.

FIG. 22 is a block diagram of computing devices 2200, 2250 that may be used to implement the systems and methods described in this document, as either a client or as a server or plurality of servers. Computing device 2200 is intended to represent various forms of digital computers, such as laptops, desktops, workstations, personal digital assistants, servers, blade servers, mainframes, and other appropriate computers. Computing device 2250 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 2200 includes a processor 2202, memory 2204, a storage device 2206, a high-speed interface 2208 connecting to memory 2204 and high-speed expansion ports 2210, and a low speed interface 2212 connecting to low speed bus 2214 and storage device 2206. Each of the components 2202, 2204, 2206, 2208, 2210, and 2212, are interconnected using various busses, and may be mounted on a common motherboard or in other manners as appropriate. The processor 2202 can process instructions for execution within the computing device 2200, including instructions stored in the memory 2204 or on the storage device 2206 to display graphical information for a GUI on an external input/output device, such as display 2216 coupled to high-speed interface 2208. In other implementations, multiple processors and/or multiple buses may be used, as appropriate, along with multiple memories and types of memory. Also, multiple computing devices 2200 may be connected, with each device providing portions of the necessary operations (e.g., as a server bank, a group of blade servers, or a multi-processor system).

The memory 2204 stores information within the computing device 2200. In one implementation, the memory 2204 is a volatile memory unit or units. In another implementation, the memory 2204 is a non-volatile memory unit or units. The memory 2204 may also be another form of computer-readable medium, such as a magnetic or optical disk.

The storage device 2206 is capable of providing mass storage for the computing device 2200. In one implementation, the storage device 2206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 2204, the storage device 2206, or memory on processor 2202.

The high-speed controller 2208 manages bandwidth-intensive operations for the computing device 2200, while the low speed controller 2212 manages lower bandwidth-intensive operations. Such allocation of functions is exemplary only. In one implementation, the high-speed controller 2208 is coupled to memory 2204, display 2216 (e.g., through a graphics processor or accelerator), and to high-speed expansion ports 2210, which may accept various expansion cards (not shown). In the implementation, low-speed controller 2212 is coupled to storage device 2206 and low-speed expansion port 2214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 2200 may be implemented in a number of different forms, as shown in the figure. For example, it may be implemented as a standard server 2220, or multiple times in a group of such servers. It may also be implemented as part of a rack server system 2224. In addition, it may be implemented in a personal computer such as a laptop computer 2222. Alternatively, components from computing device 2200 may be combined with other components in a mobile device (not shown), such as device 2250. Each of such devices may contain one or more of computing device 2200, 2250, and an entire system may be made up of multiple computing devices 2200, 2250 communicating with each other.

Computing device 2250 includes a processor 2252, memory 2264, an input/output device such as a display 2254, a communication interface 2266, and a transceiver 2268, among other components. The device 2250 may also be provided with a storage device, such as a microdrive or other device, to provide additional storage. Each of the components 2250, 2252, 2264, 2254, 2266, and 2268, are interconnected using various buses, and several of the components may be mounted on a common motherboard or in other manners as appropriate.

The processor 2252 can execute instructions within the computing device 2250, including instructions stored in the memory 2264. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 2250, such as control of user interfaces, applications run by device 2250, and wireless communication by device 2250.

Processor 2252 may communicate with a user through control interface 2258 and display interface 2256 coupled to a display 2254. The display 2254 may be, for example, a TFT (Thin-Film-Transistor Liquid Crystal Display) display or an OLED (Organic Light Emitting Diode) display, or other appropriate display technology. The display interface 2256 may comprise appropriate circuitry for driving the display 2254 to present graphical and other information to a user. The control interface 2258 may receive commands from a user and convert them for submission to the processor 2252. In addition, an external interface 2262 may be provide in communication with processor 2252, so as to enable near area communication of device 2250 with other devices. External interface 2262 may provide, for example, for wired communication in some implementations, or for wireless communication in other implementations, and multiple interfaces may also be used.

The memory 2264 stores information within the computing device 2250. The memory 2264 can be implemented as one or more of a computer-readable medium or media, a volatile memory unit or units, or a non-volatile memory unit or units. Expansion memory 2274 may also be provided and connected to device 2250 through expansion interface 2272, which may include, for example, a SIMM (Single In Line Memory Module) card interface. Such expansion memory 2274 may provide extra storage space for device 2250, or may also store applications or other information for device 2250. Specifically, expansion memory 2274 may include instructions to carry out or supplement the processes described above, and may include secure information also. Thus, for example, expansion memory 2274 may be provide as a security module for device 2250, and may be programmed with instructions that permit secure use of device 2250. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 2264, expansion memory 2274, or memory on processor 2252 that may be received, for example, over transceiver 2268 or external interface 2262.

Device 2250 may communicate wirelessly through communication interface 2266, which may include digital signal processing circuitry where necessary. Communication interface 2266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 2268. In addition, short-range communication may occur, such as using a Bluetooth, WiFi, or other such transceiver (not shown). In addition, GPS (Global Positioning System) receiver module 2270 may provide additional navigation- and location-related wireless data to device 2250, which may be used as appropriate by applications running on device 2250.

Device 2250 may also communicate audibly using audio codec 2260, which may receive spoken information from a user and convert it to usable digital information. Audio codec 2260 may likewise generate audible sound for a user, such as through a speaker, e.g., in a handset of device 2250. Such sound may include sound from voice telephone calls, may include recorded sound (e.g., voice messages, music files, etc.) and may also include sound generated by applications operating on device 2250.

The computing device 2250 may be implemented in a number of different forms, as shown in the figure. For example, it may be implemented as a cellular telephone 2280. It may also be implemented as part of a smartphone 2282, personal digital assistant, or other similar mobile device.

Additionally computing device 2200 or 2250 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

As additional description to the implementations described above, the present disclosure describes the following implementations.

Common Purchasing User Interface

Implementation 1 is a computer-implemented method. The method includes receiving, from a first third-party application program that is executing on a computing device and that was developed by a first entity, a first request to purchase a first product for use within the first third-party application program. The method includes, in response to receiving the first request, customizing a purchasing user interface to include first details that are specific to the first product, and displaying the purchasing user interface that includes the first details. The method includes receiving, from a second third-party application program that is executing on the computing device and that was developed by a second entity, a second request to purchase a second product for use within the second third-party application program. The method includes in response to receiving the second request, customizing the purchasing user interface to include second details that are specific to the second product, and displaying the purchasing user interface that includes the second details.

Implementation 2 is the method of implementation 1. The first request was initiated by a user of the computing device selecting an interface element provided by the first third-party application program. The second request was initiated by the user selecting an interface element provided by the second third-party application program.

Implementation 3 is the method of implementation 1. An application program other than the first third-party application program and the second third-party application program: (a) receives the first request; (b) customizes the purchasing user interface to include the first details; (c) displays the purchasing user interface that includes the first details; (d) receives the second request; (e) customizes the purchasing user interface to include the second details; and (f) displays the purchasing user interface that includes the second details.

Implementation 4 is the method of implementation 3. The other application program was developed by a third entity that is different than the first entity and the second entity.

Implementation 5 is the method of implementation 3. The other application program was developed by a third entity that manages an application program distribution platform through which the user downloaded the first third-party application program and the second third-party application program to the computing device.

Implementation 6 is the method of implementation 3. The other application program was developed by a third entity that operates a computerized service that (a) charges users of the first third-party application program and the second third-party application program for products purchased using the respective application programs, and (b) credits a financial account of a developer of the first third-party application program and a financial account of a developer of the second third-party application program for the products purchased using the respective application programs.

Implementation 7 is the method of implementation 1. The method further includes customizing the purchasing user interface to include the first details by: (i) sending a request for indications of the first details to a remote computing system and, in response, (ii) receiving the indications of the first details from the remote computing system, and (iii) accessing a template for the purchasing user interface and filling the template in with the first details. The first third-party application program does not receive the indications of the first details and does not include the indications of the first details. The method further includes customizing the purchasing user interface to include the second details by: (i) sending a request for indications of the second details to the remote computing system and, in response, (ii) receiving the indications of the second details from the remote computing system, and (iii) accessing the template for the purchasing user interface and filling the template in with the second details. The second third-party application program does not receive the indications of the second details and does not include the indications of the second details.

Implementation 8 is the method of implementation 7. The first details include one or more prices that correspond to one or more prices for purchase of the first product. The second details include one or more prices that correspond to one or more prices for purchase of the second product.

Implementation 9 is the method of implementation 7. The first details include a first description of the first product, the first description having been specified by a developer of the first third-party application program. The second details include a second description of the second product, the second description having been specified by a developer of the second third-party application program.

Implementation 10 is the method of implementation 7. Users of a computerized billing system are each assigned a security image that is specific to the individual user and that is not publicly distributed by the computerized billing system. The first details include a security image that is specific to a user of the computing device. The second details include the security image that is specific to the user of the computing device. The first third-party application program and the second third-party application program do not receive the security image and do not have access to the security image.

Implementation 11 is the method of implementation 7. The first third-party application program and the second third-party application program do not include the template and are not configured to access the template.

Implementation 12 is a computer-implemented method. The method includes receiving a first request to purchase a first product for use within a first third-party application program, the first third-party application program executing on a computing device and having been developed by a first entity, the first request received from the first third-party application program by a particular application program executing on the computing device. The method includes, in response to receiving the first request, the particular application program: (i) requesting, from a remote server system, first details associated with the first product, (ii) accessing a template of a purchasing user interface, and (iii) displaying the purchasing user interface by modifying the template to include the first details. The method includes receiving a second request to purchase a second product for use within a second third-party application program, the second third-party application program executing on the computing device and having been developed by a second entity, the second request received from the second third-party application program by the particular application program. The method includes, in response to receiving the second request, the particular application program: (i) requesting, from the remote server system, second details associated with the second product, (ii) accessing the template of the purchasing user interface, and (iii) displaying the purchasing user interface by modifying the template to include the second details.

Implementation 13 is the method of implementation 12. The remote server system is administered by an organization that developed the particular application program, the organization being different than the first entity and the second entity.

Implementation 14 is the method of implementation 12. The first details include a first price that corresponds to a price of the first product, the first price being unknown to the first third-party application program at a time that the first third-party application program sends the first request. The second details include a second price that corresponds to a price of the second product, the second price being unknown to the second third-party application program at a time that the second third-party application program sends the second request.

Implementation 15 is the method of implementation 12. The first details identify multiple purchasing instruments with which a user of the computing device may purchase the first product. The displayed purchasing user interface that includes the first details provides the user with an ability to select one of the multiple purchasing instruments with which to purchase the first product. The second details identify the multiple purchasing instruments. The displayed purchasing user interface that includes the second details provides the user with an ability to select one of the multiple purchasing instruments with which to purchase the second product.

Implementation 16 is the method of implementation 12. The displayed purchasing user interface that includes the first details provides a user of the computing device with an ability to provide input to confirm purchase of the first product, such that no further input from the user is required to complete purchase of the first product after the user provides input to confirm purchase of the first product. The displayed purchasing user interface that includes the first details provides the user with an ability to provide input to confirm purchase of the second product, such that no further input from the user is required to complete purchase of the second product after the user provides input to confirm purchase of the second product.

Implementation 17 is the method of implementation 12. The template is not accessible to the first third-party application program and is not accessible to the second third-party application.

Implementation 18 is the method of implementation 12. The first third-party application program and the second third-party application were downloaded to the computing device from an application distribution platform service that billed a user of the computing device for purchase of the first third-party application program and the second third-party application program. The purchasing user interface that includes the first details and the purchasing user interface that includes the second details provide the user with an ability to purchase the first product and second product, respectively, and as a result bill the user for purchase of the first product and the second product, respectively.

Implementation 19 is a computer-implemented method. The method includes displaying, by a first third-party application program that is executing on a computing device and that was developed by a first entity, a user interface that enables a user of the computing device to initiate purchase of a first product for use within the first third-party application program. The method includes receiving, by the first third-party application program, input from the user that that selects the first product for purchase. The method includes sending, by the first third-party application program and to a particular application program, a request to purchase the first product, so as to cause the particular application program to: (i) access, from a remote computing system, first details for the first product, (ii) modify a generic user interface for purchasing products to include the first details, the generic user interface modifiable by the particular application program to include second details for a second product in response to a request to purchase the second product being received by the particular application program from a second third-party application program developed by a second entity, (iii) display the modified user interface that includes the first details, and (iv) receive input from the user confirming purchase of the first product.

Transmission of Product Attribute with an Indication that Product has been Purchased Implementation 1 is a computer-implemented method. The method includes receiving, by particular application program executing on a computing system and as having been sent by a third-party application program executing on the computing system: (i) a first request to purchase a product for use by the third-party application program, and (ii) an attribute of the product. The method includes sending, by the particular application program and for receipt by a server system as a result of the particular application program receiving the first request and the attribute of the product: (i) a second request to purchase the product, and (ii) the attribute of the product. The method includes receiving, by the particular application program and as having been sent by the server system as a result of the particular application program sending the second request and the attribute of the product: (i) an indication that the product has been purchased, and (ii) the attribute of the product. The method includes sending, by the particular application program and for receipt by the third-party application program as a result of the particular application program receiving the indication and the attribute of the product: (i) the indication that the product has been purchased, and (ii) the attribute of the product.

Implementation 2 is the method of implementation 1. The first request includes the attribute of the product and an identifier for the product, the identifier for the product uniquely identifying the product from a collection of products that a user is able to purchase from a user interface that is provided by the third-party application program.

Implementation 3 is the method of implementation 2. The first request is received through the use of an application program that is adapted to receive the first request with the attribute of the product included in the first request, and is also adapted to receive the first request without the attribute of the product included in the first request.

Implementation 4 is the method of implementation 1. The attribute of the product specifies an index in a database at which information regarding the product is stored.

Implementation 5 is the method of implementation 1. The attribute of the product specifies a measure of the product. A price of the product is independent of the specified measure of the product.

Implementation 6 is the method of implementation 1. The attribute of the product specifies a variation of the product.

Implementation 7 is a computer-implemented method. The method includes providing, by a third-party application program executing on a computing device, a user interface with which a user of the computing device is able to request purchase of a product that is for use by the third-party application program; receiving, by the third-party application program, an indication that the user provided input requesting purchase of the product. The method includes sending, by the third-party application program and for receipt by a particular application program: (i) a request to purchase the product, and (ii) an attribute of the product. The method includes receiving, by the third-party application program and as having been sent by the particular application program as a result of sending the request and the attribute of the product: (i) an indication that the product has been purchased, and (ii) the attribute of the product.

Implementation 8 is the method of implementation 7. The particular application program is executing on the computing device.

Implementation 9 is the method of implementation 7. The request includes: (a) the attribute of the product, and (b) an identifier for the product, the identifier uniquely identifying the product from a collection of products that the user of the third-party application program is able to purchase from a user interface provided by the third-party application program.

Implementation 10 is the method of implementation 7. The attribute of the product specifies an index in a database at which information regarding the product is stored.

Implementation 11 is the method of implementation 7. The method further includes providing, by the third-party application program, a user interface with which the user is able to supply credentials for logging into each of multiple user accounts that are associated with the third-party application program. The attribute of the product identifies one of the multiple user accounts in which the user was logged in when the indication that the user provided the input was received.

Implementation 12 is the method of implementation 7. The method further includes receiving, by the third-party application program and as having been sent by the particular application program as a result of sending the request and the attribute of the product, a signature that was generated by applying a first cryptographic key to a hash of the indication that the product has been purchased and the attribute of the product. The method further includes using a second cryptographic key to decrypt the signature or requesting that another system use the second cryptographic key to decrypt the signature, the first cryptographic key and the second cryptographic key being keys in a pair of a public cryptographic key and a corresponding private cryptographic key.

Implementation 13 is a computer-implemented method. The method includes receiving, by a server system and as having been sent by a computing device that is different than the server system: (i) a request to purchase a product for use by a third-party application program that is executing on the computing device, and (ii) an attribute of the product. The method includes sending, by the server system and for receipt by the computing device: (i) an indication that the product has been purchased, and (ii) the attribute of the product.

Implementation 14 is the method implementation 13. The request and the attribute of the product were sent, for receipt by the server system, from a particular application program that is executing on the computing device and that is different than the third-party application program.

Implementation 15 is the method of implementation 13. The request includes the attribute of the product.

Implementation 16 is the method of implementation 13. The attribute of the product specifies an index in a database at which information regarding the product is stored.

Implementation 17 is the method of implementation 13. The attribute of the product specifies a measure of the product; and wherein the method further comprises requesting debiting of a user account for a cost that corresponds to a cost of the product as a result of receiving the request, the cost that corresponds to the cost of the product not depending on the specified measure of the product.

Implementation 18 is the method of implementation 13. The server system does not store, before the attribute of the product is received by the server system and in association with information relating to the product, information that identifies the attribute of the product.

Implementation 19 is the method of implementation 13. The method further includes identifying, by the server system, one or more additional computing devices that are associated with a user of the computing device. The method includes sending, by the server system and for receipt by each of the one or more additional computing devices: (i) an additional indication that the product has been purchased, and (ii) the attribute of the product.

Implementation 20 is the method of implementation 19. The server system did not receive an additional request to purchase the product as having been sent by any of the one or more additional computing devices.

Coordinating Multiple Devices in a Product Purchasing System

Implementation 1 is a computer-implemented method. The method includes receiving, by a server system and as having been sent by a first computing device, a request to purchase a product. The first computing device is one of multiple computing devices assigned to a user account. The method includes requesting, by the server system as a result of receiving the request to purchase the product, to charge an account associated with a user of the first computing device for a price that corresponds to a price of the product. The method includes receiving, by the server system as a result of requesting to charge the account, an indication that the account has been charged. The method includes sending, by the server system and for receipt by each of the multiple computing devices as a result of receiving the indication that the account has been charged, a notification that a purchasing event has occurred. The method includes receiving, by the server system and as having been sent by each of at least a subset of the multiple computing devices as a result of sending the notification for receipt by each of the multiple computing devices, a request for details of the purchasing event. The method includes sending, by the server system and for receipt by each of the at least subset of the multiple computing devices as a result of receiving the request for details of the purchasing event from each of the at least subset of the multiple computing device, an indication that the product has been purchased.

Implementation 2 is the method of implementation 1. The request to purchase the product was sent, by the first computing device for receipt by the server system, as a result of a user of the first computing device providing input in a user interface provided by a third-party application program to purchase a product for use by the first third-party application program.

Implementation 3 is the method of implementation 1. The notification that the purchasing event has occurred does not specify that the product has been purchased.

Implementation 4 is the method of implementation 1. The notification is sent for receipt by each of the multiple computing devices before the server system receives the request for details of the purchasing event as having been sent by any of the multiple computing devices.

Implementation 5 is the method of implementation 4. The server system does not receive a request to purchase the product from any of the multiple computing devices other than the first computing device.

Implementation 6 is the method of implementation 5. The request for details of the purchasing event that is received as having been sent by a first computing device from the at least subset of the multiple computing devices includes a first nonce. The indication that the product has been purchased that is sent for receipt by the first computing device includes the first nonce. The request for details of the purchasing event that is received as having been sent by a second computing device from the at least subset of the multiple computing devices includes a second nonce. The indication that the product has been purchased that is sent for receipt by the second computing device includes the second nonce, the second nonce being different than the first nonce.

Implementation 7 is the method of implementation 1. The method includes sending, by the server system and for receipt by each of the at least subset of the multiple computing devices as a result of receiving the request for details of the purchasing event from each of the at least subset of the multiple computing device, the product has been purchased.

Implementation 8 is a computer-implemented method. The method includes receiving, by a server system and as having been sent by a first computing device, a request to purchase a product. The first computing device is one of multiple computing devices that are assigned to a user account. The received request to purchase the product was sent by the first computing device as a result of a user of the first computing device providing input to purchase the product from an interface that is provided by a third-party application program. The product is for use by the third-party application program. The method includes requesting, by the server system as a result of receiving the request to purchase the product, purchase of the product. The method includes receiving, by the server system as a result of requesting the purchase of the product, an indication that the product has been purchased. The method includes sending, by the server system and for receipt by the first computing device subsequent to receiving the indication that the product has been purchased, a first indication that the product has been purchased. The method includes identifying, by the server system, that a second computing device is another of the multiple computing devices that are assigned to the user account; and sending, by the server system and for receipt by the second computing device subsequent to receiving the indication that the product has been purchased, a second indication that the product has been purchased.

Implementation 9 is the method of implementation 8. The second indication that the product has been purchased is not sent for receipt by the second computing device in response to a request to purchase the product being sent by the second computing device for receipt by the server system.

Implementation 10 is the method of implementation 8. The server system sent the second indication that the product has been purchased for receipt by the second computing device without the server system receiving, after the request to purchase the product is received by the server system, any communication that was sent by the second computing device.

Implementation 11 is the method of implementation 8. The method further includes sending, by the server system and for receipt by the first computing device as a result of receiving the indication that the product has been purchased, a first notification that a purchasing event has occurred. The method further includes receiving, by the server system and as having been sent by the first computing device, a first request for details of the purchasing event. Sending the first indication that the product has been purchased is performed as a result of receiving the first request for details of the purchasing event. The method further includes sending, by the server system and for receipt by the second computing device as a result of receiving the indication that the product has been purchased, a second notification that the purchasing event has occurred. The method further includes receiving, by the server system and as having been sent by the second computing device, a second request for details of the purchasing event. Sending the second indication that the product has been purchased is performed subsequent to receiving the second request for details of the purchasing event.

Implementation 12 is the method of implementation 11. The method further includes determining that the server system has not received a confirmation that the second computing device received the second notification that the product that the purchasing event has occurred, and in response, sending, by the server system and for receipt by the second computing device, an additional second notification that the purchasing event has occurred. Receiving the second request for details of the purchasing event is performed as a result of sending the additional second notification that the purchasing event has occurred.

Implementation 13 is the method of implementation 11. The first request for details includes a first nonce. The second request for details includes a second nonce. The first indication that the product has been purchased includes the first nonce. The second indication that the product has been purchased includes the second nonce.

Implementation 14 is a computer-implemented method. The method includes providing, by a first computing device, a user interface that is specified by a third-party application program executing on the first computing device, the user interface including a user interface element with which a user of the first computing device is able to initiate purchase of a product that is for use by the third-party application program. The method includes receiving, by the first computing device, user input that selects the user interface element. The method includes sending, by the first computing device and for receipt by a server system, a request to purchase the product. The method includes receiving, by the first computing device and as having been sent by the server system subsequent to the first computing device sending the request to purchase the product, a first indication that the product has been purchased. The method includes receiving, by a second computing device and as having been sent by the server system subsequent to the first computing device sending the request to purchase the product, a second indication that the product has been purchased, wherein the first computing device and the second computing device are both assigned to a user account.

Implementation 15 is the method of implementation 14. The second indication that the product has been purchased is received by the second computing device without the second computing device having sent any communication for receipt by the server system after the first computing device sent the request to purchase the product.

Implementation 16 is the method of implementation 14. The method further includes receiving, by the first computing device and as having been sent by the server system as a result of the first computing device sending the request to purchase the product, a first notification that a purchasing event has occurred. The method further includes sending, by the first computing device and for receipt by the server system as a result of receiving the first notification, a first request for details of the purchasing event. The first computing device receives the first indication that the product has been purchased as a result of sending the first request for details; receiving, by the second computing device and as having been sent by the server system as a result of the first computing device sending the request to purchase the product, a second notification that the purchasing event has occurred. The method further includes sending, by the second computing device and for receipt by the server system as a result of receiving the second notification, a second request for details of the purchasing event. The second computing device receives the second indication that the product has been purchased as a result of sending the second request for details.

Implementation 17 is the method of implementation 16. The second computing device receives the second notification that the purchasing event has occurred before the first computing device receives the first notification that the purchasing event has occurred.

Implementation 18 is the method of implementation 16. The first notification is same as the second notification. The second computing device processes receipt of the second notification same as if the second computing device had previously sent a request to purchase the product for receipt by the server system.

Implementation 19 is the method of implementation 16. The first request for details includes a first nonce. The first indication that the product has been purchased includes the first nonce. The second request for details includes a second nonce. The second indication that the product has been purchased includes the second nonce.

Implementation 20 is the method of implementation 14. The second computing device receives the second indication that the product has been purchased before the first computing device receives the first indication that the product has been purchased.

Implementation 21 is the method of implementation 14. The method further includes requesting, by the first computing device as a result of receiving the first indication that the product has been purchased, the product from a second server system. The method further includes receiving, by the first computing device and as having been sent by the second server system as a result of the first computing device requesting the product from the second server system, the product. The method further includes changing, by the first computing device as a result of receiving the product, the user interface to identify the product as being purchased. The method further includes requesting, by the second computing device as a result of receiving the second indication that the product has been purchased, the product from the second server system. The method further includes receiving, by the second computing device and as having been sent by the second server system as a result of the second computing device requesting the product from the second server system, the product. The method further includes presenting, by the second computing device as a result of receiving the product, a second user interface according to instructions specified by a copy of the third-party application program that executing at the second computing device, the user interface to identify the product as being purchased.

Cancelling a Purchasing Request

Implementation 1 is a computer-implemented method. The method includes receiving, by a server system and as having been sent by a computing device, a request to purchase a product, the request having been initiated by user selection of an interface element that is provided for display by a third-party application program executing on the computing device, the product being for use by the third-party application program. The method includes sending, by the server system and for receipt by a transaction processing system, a charge request to charge an account of a user of the computing device for purchase of the product; determining, by the server system and after the charge request has been sent for receipt by the transaction processing system, to cancel the charge request; sending, by the server system and for receipt by the transaction processing system, a request to cancel the charge request. The method includes sending, by the server system and for receipt by the computing device, an indication that purchase of the product has been cancelled.

Implementation 2 is the method of implementation 1. The method includes instituting, by the server system and as a result of determining to cancel the charge request, a delay. The method further includes receiving, by the server system and as having been sent by the transaction processing system after the request to cancel the charge request has been sent for receipt by the server system and during the delay or after the delay, an indication that the charge request has been cancelled. Sending the indication that purchase of the product has been cancelled is performed as a result of receiving the indication that the charge request has been cancelled.

Implementation 3 is the method of implementation 2. Instituting the delay includes: (i) sending, by the server system and for receipt by the computing device, a request that specifies a length of time, so as to cause the computing device to delay for the length of time, and (ii) receiving, by the server system and as having been sent by the computing device after an expiration of the delay for the length of time as monitored by the computing device, a communication that indicates that the delay has expired.

Implementation 4 is the method of implementation 1. Determining to cancel the charge request includes determining that a measure of time associated with purchase of the product has exceeded a threshold level of time.

Implementation 5 is the method of implementation 4. The measure of time associated with purchase of the product includes: (i) a measure of time since the user selection of the interface element, (ii) a measure of time since the request to purchase the product was sent by the computing device, (iii) a measure of time since the request to purchase the product was received by the server system, (iv) a measure of time since the charge request was sent by the server system, or (v) a measure of time since the charge request was received by the transaction processing system.

Implementation 6 is the method of implementation 1. The method includes determining, by the server system and as a result of receiving the request to purchase the product, a length of time for which to delay. The method includes sending, by the server system and for receipt by the computing device, an indication of the determined length of time. The method includes receiving, by the server system and as having been sent by the computing device, a communication that indicates that a delay for the length of time as measured by the computing device has expired. Sending the indication that purchase of the product has been cancelled is performed in response to the server system receiving the communication.

Implementation 7 is the method of implementation 6. The method includes determining, by the server system and as a result of receiving the communication that indicates that the delay has expired, whether the server system has received, as having been sent by the transaction processing system, an indication that the charge request has been cancelled.

Implementation 8 is the method of implementation 7. The indication that the charge request has been cancelled is received in response to the server system sending the request to cancel the charge request.

Implementation 9 is the method of implementation 8. Determining to cancel the charge request includes analyzing a length of time since the account of the user was created.

Implementation 10 is the method of implementation 8. Determining to cancel the charge request includes analyzing previous requests to purchase products, the previous requests having been sent by the computing device for receipt by the server system.

Implementation 11 is a computer-implemented method. The method includes receiving, by a server system and as having been sent by a computing device, a request to purchase a product, the request having been initiated by user selection of an interface element that is provided for display by a third-party application program executing on the computing device, the product being for use by the third-party application program. The method includes sending, by the server system and for receipt by a transaction processing system, a charge request to charge an account of a user of the computing device for purchase of the product; determining, by the server system and as a result of receiving the request to purchase the product; a first length of time for which to delay. The method includes sending, by the server system and for receipt by the computing device, an indication of the first length of time so as to cause the computing device to delay for the first length of time. The method includes receiving, by the server system and as having been sent by the remote computing device, a communication that indicates that the delay for the first length of time has expired. The method includes determining, by the server system and as a result of receiving the communication that indicates that the delay for the first length of time has expired, whether the server system has received, as having been sent by the transaction processing system, an indication that the charge request has been successful or has been cancelled.

Implementation 12 is the method of implementation 11. The method further includes sending, by the server system and for receipt by the computing device as a result of determining that the server system has received the indication that the charge request has been successful or has been cancelled, an indication that purchase of the product has been successful or has been cancelled.

Implementation 13 is the method of implementation 11. The method further includes sending, by the server system and for receipt by the transaction processing system as a result of determining that the server system has not received the indication that the charge request has been successful or has been cancelled, a request to cancel the charge request. The method further includes sending, by the server system and for receipt by the computing device an indication that purchase of the product has been successful or has been cancelled.

Implementation 14 is the method of implementation 11. The method further includes sending, by the server system and for receipt by the computing device as a result of determining that the server system has not received the indication that the charge request has been successful or has been cancelled, an indication of a second length of time so as to cause the computing device to delay for the second length of time, the second length of time being different than the first length of time. The method further includes receiving, by the server system and as having been sent by the remote computing device, a second communication that indicates that the delay for the second length of time has expired. The method further includes determining, by the server system and as a result of receiving the second communication that indicates that the delay for the second length of time has expired, whether the server system has received, as having been sent by the transaction processing system, the indication that the charge request has been successful or has been cancelled. The method further includes sending, by the server system and for receipt by the computing device as a result of determining that the server system has received the indication that the charge request has been successful or has been cancelled, an indication that purchase of the product has been successful or has been cancelled.

Implementation 15 is a computer-implemented method. The method includes providing, by a computing device, a display of an interface element according to instructions of a third-party application program executing on the computing device, the interface element being for initiating purchase of a product, the product being for use by the third-party application program. The method includes receiving, by the computing device, an indication of user selection of the interface element. The method includes sending, by the computing device and for receipt by a server system as a result of receiving the indication of user selection of the interface element, a request to purchase a product so as to prompt the server system to charge an account of a user of the computing device for the product; receiving, by the computing device and as having been sent by the server system as a result of sending the request to purchase the product, an indication of a first length of time for which to delay. The method includes instituting, by the computing device and as a result of receiving the indication of the first length of time for which to delay, a delay for the first length of time. The method includes sending, by the computing device and for receipt by the server system, an indication that the delay for the first length of time has expired so as to prompt the server system to determine whether the account of the user has been charged for the product.

Implementation 16 is the method of implementation 15. The method includes receiving, by the computing device and as having been sent by the server system as a result of the computing device sending the indication that the delay for the first length of time has expired, an indication that purchase of the product has been cancelled.

Implementation 17 is the method of implementation 15. The method includes receiving, by the computing device and as having been sent by the server system as a result of the computing device sending the indication that the delay for the first length of time has expired, an indication of a second length of time for which to delay. The method includes instituting, by the computing device and as a result of receiving the indication of the second length of time for which to delay, a delay for the second length of time. The method includes sending, by the computing device and for receipt by the server system, an indication that the delay for the second length of time has expired so as to prompt the server system to determine, for a second time after the request to purchase the product was sent to the server system, whether the account of the user has been charged for the product.

Implementation 18 is the method of implementation 17. The method includes receiving, by the computing device and as having been sent by the server system in response to sending the indication that the delay for the second length of time has expired, an indication that purchase of the product has been cancelled.

Implementation 19 is the method of implementation 17. The first length of time is different than the second length of time.

Verifying that a Purchasing Request is Legitimate

Implementation 1 is a computer-implemented method. The method includes providing, by a computing device, a user interface that is specified by instructions of a third-party application program, the user interface including an interface element that, when selected by a user, causes the computing device to initiate purchase of a product. The method includes receiving, by the computing device, an indication that the user has selected the interface element. The method includes identifying, by the computing device, a first identity certificate that is assigned to the third-party application program from among multiple identity certificates that are assigned to multiple respective third-party application programs. The method includes sending, by the computing device, the first identity certificate for receipt by a server system so as to cause the server system to determine whether the first identity certificate matches a second identity certificate. The method includes receiving, by the computing device and as a result of sending the first identity certificate for receipt by the server system and the server system having determined that the first identity certificate matches the second identity certificate, an indication that the third-party application program is able to legitimately purchase the product. The method includes sending, by the computing device and for receipt by the server system as a result of receiving the indication that the user has selected the interface element, a request for purchasing the product.

Implementation 2 is the method of implementation 1. The product is a digital product for use by the third-party application program in another user interface specified by instructions of the third-party application program.

Implementation 3 is the method of implementation 1. Sending the first identity certificate for receipt by the server system is performed (i) as a result of receiving the indication that the user has selected the interface element, and (ii) before the computing device receives an indication that the product has been purchased.

Implementation 4 is the method of implementation 1. The request for purchasing the product includes the first identity certificate.

Implementation 5 is the method of implementation 1. The indication that the third-party application program is able to legitimately purchase the product includes a receipt of details regarding the product, the details not having been previously stored by the computing device.

Implementation 6 is the method of implementation 1. The details include (i) one or more prices for the product, (ii) a title of the product, or (iii) a description of the product.

Implementation 7 is the method of implementation 1. The indication that the third-party application program is able to legitimately purchase the product includes a receipt of an indication that the product was successfully purchased.

Implementation 8 is the method of implementation 1. The method includes receiving, by the computing device and as having been sent by a remote computing system as a result of the computing device sending a request to download the third-party application program: (i) the third-party application program, and (ii) the first identity certificate; wherein the first identity certificate includes a first cryptographic hash value generated from the third-party application program.

Implementation 9 is the method of implementation 8. The method includes generating, by the computing device, a second cryptographic hash value from the third-party application program. The method includes comparing, by the computing device, the first cryptographic hash value to the second cryptographic hash value.

Implementation 10 is the method of implementation 9. The method includes applying a public cryptographic key to the first identity certificate to unlock the first identity certificate and extract the first cryptographic hash value from the first identity certificate.

Implementation 11 is the method of implementation 10. The first identity certificate was locked with a private key by a developer of the third-party application program.

Implementation 12 a computer-implemented method. The method includes receiving, by a computing device and as a result of the computing device sending a request to download a third-party application program, (i) the third-party application program, and (ii) a first identity certificate for the third-party application program, wherein the first identity certificate includes a first cryptographic hash value generated from the third-party application program by a computing system that is different than the computing device. The method includes generating, by the computing device, a second cryptographic hash value from the third-party application program. The method includes determining, by the computing device, whether the first cryptographic hash value matches the second cryptographic hash value. The method includes installing, by the computing device, the third-party application program. The method includes providing, by the computing device, a user interface that is specified by instructions of the third-party application program, the user interface including an interface element that initiates purchase of a product when selected by a user, wherein the product is a digital product for use by the third-party application program in another user interface specified by instructions of the third-party application program. The method includes sending, by the computing device and for receipt by a server system, a request for purchasing the product, the request including the first identity certificate, so as to cause the server system to determine whether the first identity certificate matches a second identity certificate that the server system has assigned to the third-party application program; and receiving, by the computing device, an indication that the third-party application program is able to legitimately purchase the product.

Implementation 13 is the method of implementation 12. The indication that the third-party application program is able to legitimately purchase the product includes a receipt of details regarding the product, the details not having been previously stored by the computing device.

Implementation 14 is the method of implementation 12. The computing device is configured so that the third-party application program is prevented reinstalling the third-party application program without updating the first identity certificate.

Implementation 15 is a computer-implemented method. The method includes receiving, by a server system and as having been sent by computing device as a result of a user of the computing device selecting an interface element provided for display at request of a third-party application program, a request that specifies a first identity certificate that the computing device assigned to the third-party application program. The selection of the interface element initiates purchase of a product. The method includes accessing, by the server system, a second identity certificate that the server system assigned to the third-party application program before the server system received the request that specifies the first identity certificate. The method includes determining, by the server system, whether the first identity certificate matches the second identity certificate. The method includes, in response to a determination that the first identity certificate matches the second identity certificate, sending for receipt by the computing device an indication that the third-party application program is able to legitimately purchase the product.

Implementation 16 is the method of implementation 15. The product is a digital product for use by the third-party application program in another user interface specified by instructions of the third-party application program.

Implementation 17 is the method of implementation 15. The request that specifies the first identity certificate is a request for purchasing the product.

Implementation 18 is the method of implementation 15. The first identity certificate matches the second identity certificate by being identical identity certificates.

Implementation 19 is the method of implementation 15. The method includes receiving, by the server system, the third-party application program and the second identity certificate as having been sent by a device of a developer of the third-party application program. The method includes storing, by the server system, the second identity certificate for subsequent access and assigning the second identity certificate to the third-party application program. The method includes receiving, by the server system and as having been sent by the computing device, a request to download the third-party application program. The method includes initiating, by the server system, sending of the third-party application program for receipt by the computing device.

Processing Purchase Requests by Third-Party Applications

Implementation 1 is computerized device. The device includes one or more computer processors. The device includes a particular application program, executable by the one or more computer processors. The particular application program is configured to (i) provide a common interface to which multiple third-party application programs are able to send product purchase requests, (ii) request, from a remote server system in response to receiving a particular one of the product purchase requests, particular details regarding a particular product specified by the particular product purchase request, and (iii) send, to the remote server system after the particular application program receives a response to the request for the particular details, a confirming product purchase request, the confirming product purchase request causing the remote server system to request that an account of a user of the computerized device be debited for a price that corresponds to a price of the particular product. The device includes a first third-party application program. The first third-party application program is executable by the one or more computer processors. The first third-party application program is configured to receive an indication that the user supplied input selecting a first product for purchase, and, in response, send to the particular application program a first product purchase request that specifies the first product. The device includes a second third-party application program. The second third-party application program is executable by the one or more computer processors. The second third-party application program is configured to receive an indication that the user supplied input selecting a second product for purchase, and, in response, send to the particular application program a second product purchase request that specifies the second product.

Implementation 2 is the device of implementation 1. The particular application program is further configured to: (iv) receive, from the remote server system, an indication that the account of the user has been debited for the price that corresponds to the price of the particular product, and, in response, send to the particular third-party application program an indication that the particular product has been purchased.

Implementation 3 is the device of implementation 2. The particular application program is further configured to, after sending the confirming product purchase request and before receiving the indication that the account of the user has been debited: receive a second particular one of the product purchase requests, and send, to the remote server system, a second confirming product purchase request.

Implementation 4 is the device of implementation 1. The particular details specify multiple different prices for the particular product. The confirming product purchase request specifies one of the multiple different prices at which to purchase the particular product.

Implementation 5 is the device of implementation 1. The particular details specify multiple purchasing instruments with which the user is able to purchase the particular product. The confirming product purchase request specifies one of the multiple purchasing instruments with which to purchase the particular product.

Implementation 6 is the device of implementation 1. The particular application program is configured to display a confirming user interface with which the user is able to provide input to cancel and confirm purchase of products, the confirming user interface being a same user interface that is displayed in response to each of the product purchase requests except that the confirming user interface is customized to display one or more features specific to a product being purchased.

Implementation 7 is the device of implementation 1. The particular application program is configured to receive an indication that the user provided input to cancel the particular product purchase request, and, in response, send to a particular one of the third-party application programs an indication that the user cancelled the particular product purchase request.

Implementation 8 is the device of implementation 1. The first third-party application program is not configured to communicate with the remote server system. The second third-party application program is not configured to communicate with the remote server system.

Implementation 9 is the device of implementation 1. The first product purchase request does not specify a price of the first product. The particular application program, in response to receiving the first product purchase request: identifies a user selected price from multiple prices for the first product, and sends, to the remote server system, a first confirming product purchase request that specifies the first product and an indication of the user selected price.

Implementation 10 is the device of implementation 1. The first product purchase request does not specify a description of the first product. The particular application program, in response to receiving the first product purchase request: identifies a description for the first product, and displays the description for the first product.

Implementation 11 is the device of implementation 1. The first third-party application program, in response to sending the first product purchase request: receives, from the particular application program, an indication that the first product has been purchased, requests, from a server system that is managed by an entity that developed the first third-party application program, the first product, and receives, from the server system that is managed by the entity that developed the first third-party application program, the first product.

Implementation 12 is the device of implementation 1. The first third-party application program, in response to sending the first product purchase request: receives, from the particular application program, an indication that the first product has been purchased, and provides the user with access to the first product, the first product having been stored by the first third-party application program at a time that the first third-party application program sent the first product purchase request.

Implementation 13 is the device of implementation 1. The first third-party application program was downloaded to the computing device from an application distribution platform. The second third-party application program was downloaded to the computing device from the application distribution platform. The particular application program was developed by a same organization that developed an operating system on which the particular application program, the first third-party application program, and the second third-party application program are executing.

Implementation 14 is a computerized server system. The server system includes one or more computer processors. The server system includes one or more computer readable media encoding instructions that, when executed by the one or more computer processors, cause the one or more computer processors to perform operations. The operations include receiving, as having been sent by a particular application program that is executable at a remote computing device, a request for details regarding a product that a user of the remote computing device selected for purchase from a user interface provided by a third-party application program executable at the remote computing device, the received request specifying the product. The operations include using an indication of the product to identify details that are specific to the product. The operations include sending, for receipt by the particular application program, the details. The operations include receiving, from the particular application program and after sending the details, confirmation to purchase the product, and, in response, sending a charge request to charge the user for the product to a transaction processing system.

Implementation 15 is the computerized server system of implementation 14. The details were specified by a developer of the third-party application program.

Implementation 16 is the computerized server system of implementation 14. The details include multiple prices that correspond to prices for the product. The received confirmation specifies one of the multiple prices that correspond to the prices for the product. The request to the transaction processing system specifies the one of the multiple prices.

Implementation 17 is the computerized server system of implementation 16. The received request specifies the user. Identifying the details that are specific to the product includes identifying multiple currencies assigned to the user and identifying the multiple prices as being prices that correspond to prices for the product in the multiple currencies.

Implementation 18 is the computerized server system of implementation 17. Identifying the multiple currencies includes identifying multiple purchasing instruments that are associated with the user and identifying default currencies for the multiple purchasing instruments.

Implementation 19 is the computerized server system of implementation 14. The details include multiple purchasing instruments with which the user is able to purchase the product. The received confirmation specifies one of the multiple purchasing instruments. The request to the transaction processing system specifies the one of the multiple purchasing instruments.

Providing Multiple Purchase Prices for a Product

Implementation 1 is a computer-implemented method for providing multiple prices for a product. The method includes providing data for generating a user interface that includes elements with which a developer of an application program can specify multiple prices in multiple respective currencies for which a product is to be offered for purchase. The application program being configured to permit a user of the application program to initiate purchase of the product from an interface that is provided by the application program. The method includes receiving an indication of user input by the developer that specifies a first price of the multiple prices, the first price being for a first currency. The method includes determining a second price of the multiple prices, the second price being for a second currency. The method includes storing the first price and the second price for subsequent presentation to a prospective purchaser of the product as alternative prices.

Implementation 2 is the method of implementation 1. The product is a product that was developed by the developer.

Implementation 3 is the method of implementation 1. The user input that specifies the first price includes typing the first price.

Implementation 4 is the method of implementation 1. Determining the second price includes receiving an indication of user input by the developer that specifies the second price.

Implementation 5 is the method of implementation 1. The method further includes, as a result of receiving the indication of user input by the developer that specifies the first price: (i) identifying an exchange rate between the first currency and the second currency; (ii) determining the second price by applying the exchange rate to the first price, without receiving an indication of user input by the developer that specifies the second price; and (iii) presenting the second price in the user interface.

Implementation 6 is the method of implementation 5. The first price is presented in a first user-editable field. Presenting the second price includes presenting the second price in a second user-editable field without receiving an indication of user input by the developer that specifies the second price in the second user-editable field. Storing the first price and the second price includes storing a value that has been presented in the first user-editable field and storing a value that has been presented in the second user-editable field.

Implementation 7 is the method of implementation 1. The method further includes, as a result of receiving the indication of user input by the developer that specifies the first price: (i) identifying an exchange rate between the first currency and the second currency; (ii) determining a second currency exchange price by applying the exchange rate to the first price; (iii) presenting the second currency exchange price in the user interface; and (iv) determining the second price includes receiving an indication of user input by the developer that specifies the second price while the exchange price was concurrently displayed in the user interface.

Implementation 8 is the method of implementation 1. The method further includes receiving an indication of user input by the developer that specifies that the second price is to occasionally change as an exchange rate of the first currency to the second currency changes.

Implementation 9 is the method of implementation 8. The method further includes providing the second price for presentation to the prospective purchaser of the product. The method further includes identifying that the exchange rate of the first currency to the second currency has changed and, subsequently, re-determining the second price based on the exchange rate having changed, without receipt of user input from the developer that specifies or confirms the second price that has been re-determined, the second price that has been re-determined being different than the second price before the re-determining. The method further includes providing the second price that has been re-determined to a second prospective purchaser of the product.

Implementation 10 is the method of implementation 1. The method further includes receiving an indication of user input by the developer that specifies one of multiple different increments of the second currency to which the second price is to change over time as an exchange rate of the first currency to the second currency changes.

Implementation 11 is the method of implementation 1. The method further includes providing the second price for presentation to the prospective purchaser of the product. The method further includes identifying that the exchange rate of the first currency to the second currency has changed and, subsequently, re-determining the second price based on the exchange rate having changed and rounding the second price that has been re-determined to the increment of the second currency specified by the developer. The method further includes providing the second price that has been re-determined to a second prospective purchaser of the product.

Implementation 12 is the method of implementation 1. The method further includes receiving an indication of user input by the developer that specifies a minimum value that the second price may not fall to or beneath as an exchange rate of the first currency to the second currency changes.

Implementation 13 is the method of implementation 1. The method further includes providing the first price and the second price to a remote computing device for display to the prospective purchaser of the product, such that the prospective purchaser is presented with the first price upon selection by the prospective purchaser of a first purchasing instrument and is presented with the second price upon selection by the prospective purchaser of a second purchasing instrument.

Implementation 14 is the method of implementation 1. The second price replaces presentation of the first price.

Implementation 15 is a computer-implemented method for providing multiple prices for a product. The method includes receiving, by a computing system, a request to purchase a product, the request initiated by a user of an application program from a user interface provided by the application program; identifying, by the computing system, multiple different purchasing instruments of the user, a first of the purchasing instruments having been assigned a first currency as a primary currency and a second of the purchasing instruments having been assigned a second currency as a primary currency. The method includes identifying, by the computing system, a first price for the product in the first currency and a second price for the product in the second currency. The method includes presenting, by the computing system, a user interface for purchasing the product, the user interface presenting the first price in association with an indication that the user has selected the first purchasing instrument and presenting the second price in association with an indication that the user has selected the second purchasing instrument.

Implementation 16 is the method of implementation 15. The first purchasing instrument and the second purchasing instrument are different credit cards.

Implementation 17 is the method of implementation 15. Presenting the user interface includes: receiving, by the computing system, input from the user causing a change in a selected purchasing instrument from the first purchasing instrument to the second purchasing instrument; and as a result of receiving the input from the user causing the change in the selected purchasing instrument, replacing the presentation of the first price with the presentation of the second price.

Implementation 18 is the method of implementation 15. A developer of the application program provided user input that specified the first price.

Implementation 19 is the method of implementation 18. The developer provided user input specifying that the second price is to change as a rate of exchange between the first currency and the second currency change, the second price not having been specified by the developer.

Implementation 20 is the method of implementation 18. The second price has been generated based on a rate of exchange between the first currency and the second currency, the second price having been rounded to an increment of the second currency that was specified by the developer from among multiple increments available for specification by the developer.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:
   receiving a first request to purchase a first product for use within a first third-party application program, the first third-party application program executing on a computing device and having been developed by a first entity, the first request received from the first third-party application program by a particular application program executing on the computing device;
   in response to receiving the first request, the particular application program:
     (i) requesting, from a remote server system, first details associated with the first product,
     (ii) accessing a template of a purchasing user interface, and
     (iii) displaying the purchasing user interface by modifying the template to include the first details;
   receiving a second request to purchase a second product for use within a second third-party application program, the second third-party application program executing on the computing device and having been developed by a second entity, the second request received from the second third-party application program by the particular application program; and
   in response to receiving the second request, the particular application program:
     (i) requesting, from the remote server system, second details associated with the second product,
     (ii) accessing the template of the purchasing user interface, and
     (iii) displaying the purchasing user interface by modifying the template to include the second details.

2. The method of claim 1, wherein the remote server system is administered by an organization that developed the particular application program, the organization being different than the first entity and the second entity.

3. The method of claim 1, wherein:
   the first details include a first price that corresponds to a price of the first product, the first price being unknown to the first third-party application program at a time that the first third-party application program sends the first request; and
   the second details include a second price that corresponds to a price of the second product, the second price being unknown to the second third-party application program at a time that the second third-party application program sends the second request.

4. The method of claim 1, wherein:
   the first details identify multiple purchasing instruments with which a user of the computing device may purchase the first product;
   the displayed purchasing user interface that includes the first details provides the user with an ability to select one of the multiple purchasing instruments with which to purchase the first product;
   the second details identify the multiple purchasing instruments; and
   the displayed purchasing user interface that includes the second details provides the user with an ability to select one of the multiple purchasing instruments with which to purchase the second product.

5. The method of claim 1, wherein:
   the displayed purchasing user interface that includes the first details provides a user of the computing device with an ability to provide input to confirm purchase of the first product, such that no further input from the user is required to complete purchase of the first product after the user provides the input to confirm purchase of the first product; and
   the displayed purchasing user interface that includes the first details provides the user with an ability to provide input to confirm purchase of the second product, such that no further input from the user is required to complete purchase of the second product after the user provides the input to confirm purchase of the second product.

6. The method of claim 1, wherein the template is not accessible to the first third-party application program and is not accessible to the second third-party application.

7. The method of claim 1, wherein:
the first third-party application program and the second third-party application were downloaded to the computing device from an application distribution platform service that billed a user of the computing device for purchase of the first third-party application program and the second third-party application program; and
wherein the purchasing user interface that includes the first details and the purchasing user interface that includes the second details provide the user with an ability to purchase the first product and second product, respectively, and as a result bill the user for purchase of the first product and the second product, respectively.

8. The method of claim 1, wherein:
the first request was initiated by a user of the computing device selecting an interface element provided by the first third-party application program; and
the second request was initiated by the user selecting an interface element provided by the second third-party application program.

9. The method of claim 1, wherein the particular application program was developed by a third entity that manages an application program distribution platform through which the user downloaded the first third-party application program and the second third-party application program to the computing device.

10. The method of claim 1, wherein the particular application program was developed by a third entity that operates a computerized service that (a) charges users of the first third-party application program and the second third-party application program for products purchased using the respective application programs, and (b) credits a financial account of a developer of the first third-party application program and a financial account of a developer of the second third-party application program for the products purchased using the respective application programs.

11. The method of claim 1, wherein:
the first details include a first description of the first product, the first description having been specified by the first entity; and
the second details include a second description of the second product, the second description having been specified by the second entity.

12. A computer-readable device including instructions that, when executed by one or more computer processors, cause performance of a method that comprises:
receiving a first request to purchase a first product for use within a first third-party application program, the first third-party application program executing on a computing device and having been developed by a first entity, the first request received from the first third-party application program by a particular application program executing on the computing device;
in response to receiving the first request, the particular application program:
(i) requesting, from a remote server system, first details associated with the first product,
(ii) accessing a template of a purchasing user interface, and
(iii) displaying the purchasing user interface by modifying the template to include the first details;
receiving a second request to purchase a second product for use within a second third-party application program, the second third-party application program executing on the computing device and having been developed by a second entity, the second request received from the second third-party application program by the particular application program; and
in response to receiving the second request, the particular application program:
(i) requesting, from the remote server system, second details associated with the second product,
(ii) accessing the template of the purchasing user interface, and
(iii) displaying the purchasing user interface by modifying the template to include the second details.

13. The computer-readable device of claim 12, wherein the remote server system is administered by an organization that developed the particular application program, the organization being different than the first entity and the second entity.

14. The computer-readable device of claim 12, wherein:
the first details include a first price that corresponds to a price of the first product, the first price being unknown to the first third-party application program at a time that the first third-party application program sends the first request; and
the second details include a second price that corresponds to a price of the second product, the second price being unknown to the second third-party application program at a time that the second third-party application program sends the second request.

15. The computer-readable device of claim 12, wherein:
the first details identify multiple purchasing instruments with which a user of the computing device may purchase the first product;
the displayed purchasing user interface that includes the first details provides the user with an ability to select one of the multiple purchasing instruments with which to purchase the first product;
the second details identify the multiple purchasing instruments; and
the displayed purchasing user interface that includes the second details provides the user with an ability to select one of the multiple purchasing instruments with which to purchase the second product.

16. The computer-readable device of claim 12, wherein:
the displayed purchasing user interface that includes the first details provides a user of the computing device with an ability to provide input to confirm purchase of the first product, such that no further input from the user is required to complete purchase of the first product after the user provides the input to confirm purchase of the first product; and
the displayed purchasing user interface that includes the first details provides the user with an ability to provide input to confirm purchase of the second product, such that no further input from the user is required to complete purchase of the second product after the user provides the input to confirm purchase of the second product.

17. The computer-readable device of claim 12, wherein the template is not accessible to the first third-party application program and is not accessible to the second third-party application.

18. The computer-readable device of claim 12, wherein:
the first third-party application program and the second third-party application were downloaded to the computing device from an application distribution platform service that billed a user of the computing device for purchase of the first third-party application program and the second third-party application program; and wherein the purchasing user interface that includes the first details and the purchasing user interface that includes the second details provide the user with an ability to purchase the first product and second product, respectively, and as a result bill the user for purchase of the first product and the second product, respectively.

19. The computer-readable device of claim 12, wherein:
the first request was initiated by a user of the computing device selecting an interface element provided by the first third-party application program; and
the second request was initiated by the user selecting an interface element provided by the second third-party application program.

20. The computer-readable device of claim 12, wherein the particular application program was developed by a third entity that manages an application program distribution platform through which the user downloaded the first third-party application program and the second third-party application program to the computing device.

21. The computer-readable device of claim 12, wherein the particular application program was developed by a third entity that operates a computerized service that (a) charges users of the first third-party application program and the second third-party application program for products purchased using the respective application programs, and (b) credits a financial account of a developer of the first third-party application program and a financial account of a developer of the second third-party application program for the products purchased using the respective application programs.

22. The computer-readable device of claim 12, wherein:
the first details include a first description of the first product, the first description having been specified by the first entity; and
the second details include a second description of the second product, the second description having been specified by the second entity.

* * * * *